US012688247B1

(12) United States Patent
Mimassi et al.

(10) Patent No.: US 12,688,247 B1
(45) Date of Patent: **\*Jul. 21, 2026**

(54) MULTI-SCALE TEMPORAL PROCESSING SYSTEM WITH CULINARY CONTEXT EMBEDDINGS

(71) Applicant: RockSpoon, Inc., San Jose, CA (US)

(72) Inventors: Nagib Georges Mimassi, Palo Alto, CA (US); Brian Galvin, Silverdale, WA (US)

(73) Assignee: ROCKSPOON, INC., San Jose, CA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 19/218,208

(22) Filed: May 23, 2025

Related U.S. Application Data

(63) Continuation-in-part of application No. 19/177,614, filed on Apr. 13, 2025.

(51) Int. Cl.
　　*G06F 16/9537* 　　(2019.01)
　　*G06F 16/2457* 　　(2019.01)
　　*G06Q 50/12* 　　(2012.01)

(52) U.S. Cl.
　　CPC .... *G06F 16/9537* (2019.01); *G06F 16/24575* (2019.01); *G06Q 50/12* (2013.01)

(58) Field of Classification Search
　　CPC .......... G06F 16/9537; G06F 16/24575; G06Q 50/12
　　See application file for complete search history.

(56) References Cited

U.S. PATENT DOCUMENTS

| | | | | |
|---|---|---|---|---|
| 8,978,034 | B1 * | 3/2015 | Goodson | ........... G06F 16/24544 |
| | | | | 718/101 |
| 2007/0118498 | A1 * | 5/2007 | Song | ........................ G06F 16/34 |
| | | | | 707/E17.093 |
| 2013/0216982 | A1 * | 8/2013 | Bennett | ................ A61B 5/4866 |
| | | | | 434/127 |
| 2022/0399098 | A1 * | 12/2022 | Zhang | ..................... G06F 16/36 |
| 2025/0124105 | A1 * | 4/2025 | Jha | ........................... G06F 17/16 |

* cited by examiner

*Primary Examiner* — Charles Rones
*Assistant Examiner* — Xiaoqin Hu
(74) *Attorney, Agent, or Firm* — GALVIN PATENT LAW LLC; Brian R. Galvin; Erin L. Johnston

(57) ABSTRACT

A computer system processes dining context data across multiple time scales to generate personalized dining recommendations. The system includes a temporal processing engine that simultaneously analyzes both immediate and historical dining data using multiple time-scale processors while maintaining temporal coherence. A dining context integration engine extracts and organizes features related to individual preferences and group dining dynamics, ensuring state continuity. A fusion engine combines outputs from the temporal processors with contextual representations to generate informed dining recommendations. These components work cooperatively to integrate real-time and historical dining patterns, enhancing dining experiences through adaptive and context-aware recommendations.

14 Claims, 33 Drawing Sheets

Multi-Scale Temporal Context Integration System Architecture
100

FIG. 1

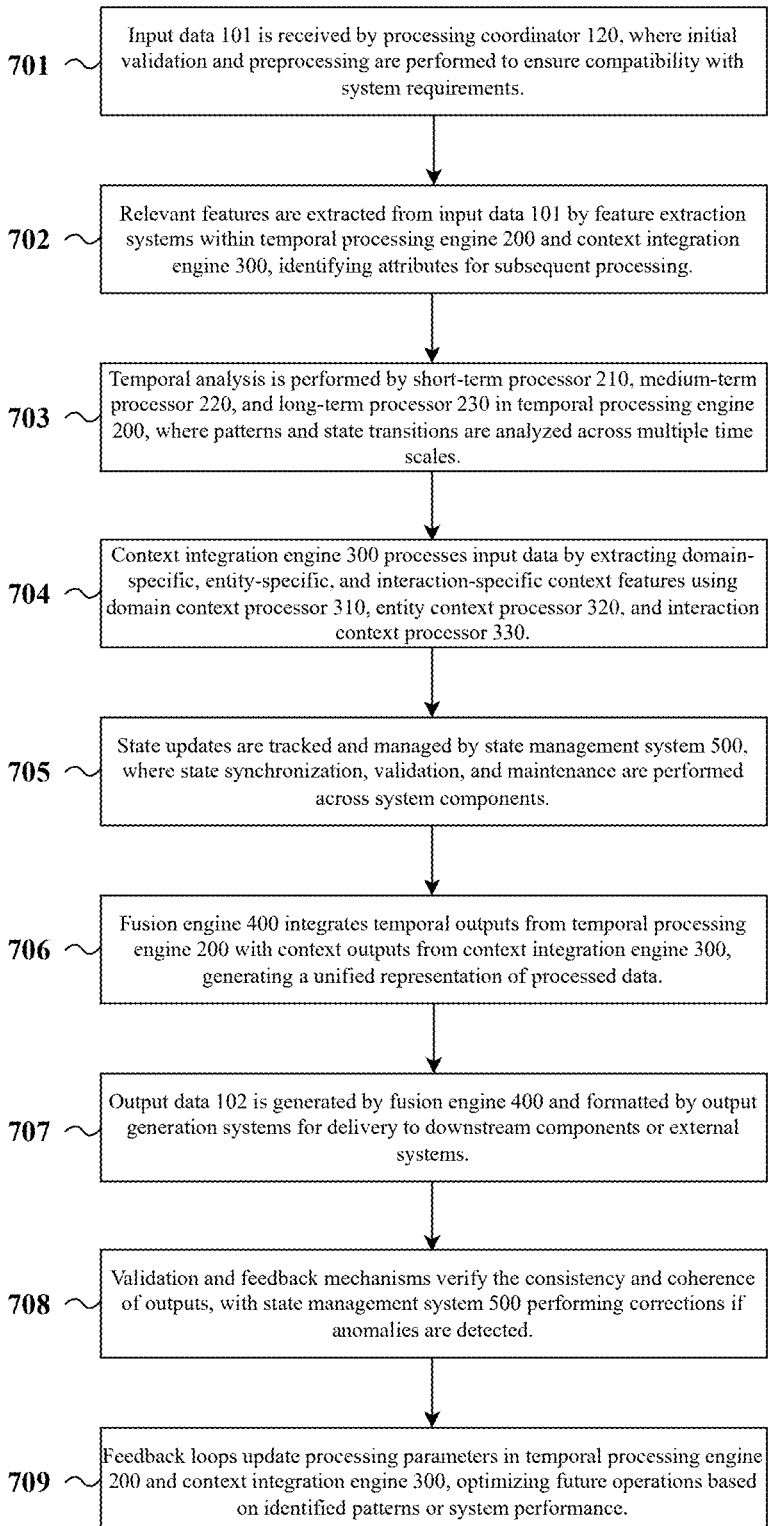

701 — Input data 101 is received by processing coordinator 120, where initial validation and preprocessing are performed to ensure compatibility with system requirements.

702 — Relevant features are extracted from input data 101 by feature extraction systems within temporal processing engine 200 and context integration engine 300, identifying attributes for subsequent processing.

703 — Temporal analysis is performed by short-term processor 210, medium-term processor 220, and long-term processor 230 in temporal processing engine 200, where patterns and state transitions are analyzed across multiple time scales.

704 — Context integration engine 300 processes input data by extracting domain-specific, entity-specific, and interaction-specific context features using domain context processor 310, entity context processor 320, and interaction context processor 330.

705 — State updates are tracked and managed by state management system 500, where state synchronization, validation, and maintenance are performed across system components.

706 — Fusion engine 400 integrates temporal outputs from temporal processing engine 200 with context outputs from context integration engine 300, generating a unified representation of processed data.

707 — Output data 102 is generated by fusion engine 400 and formatted by output generation systems for delivery to downstream components or external systems.

708 — Validation and feedback mechanisms verify the consistency and coherence of outputs, with state management system 500 performing corrections if anomalies are detected.

709 — Feedback loops update processing parameters in temporal processing engine 200 and context integration engine 300, optimizing future operations based on identified patterns or system performance.

FIG. 7

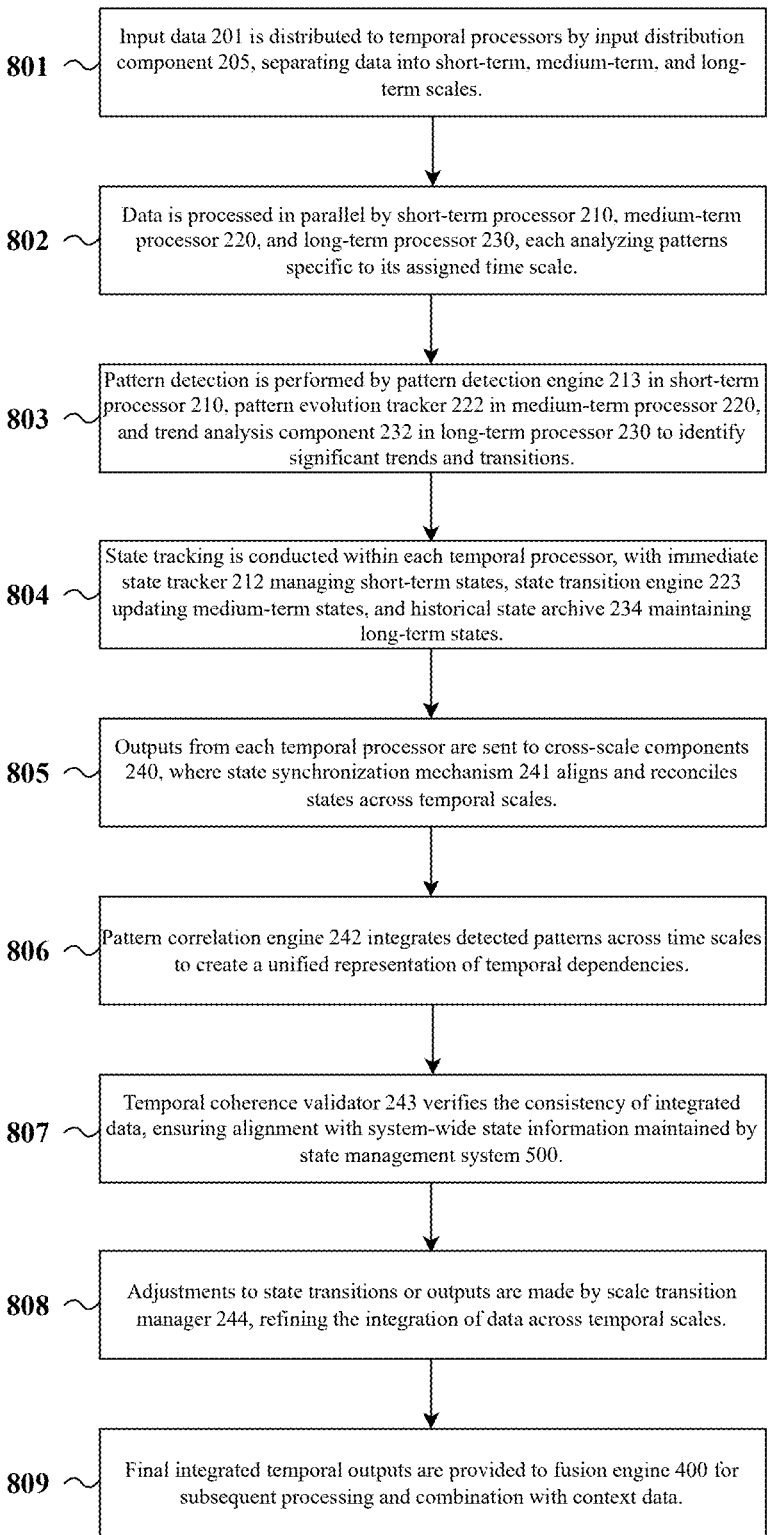

801 — Input data 201 is distributed to temporal processors by input distribution component 205, separating data into short-term, medium-term, and long-term scales.

802 — Data is processed in parallel by short-term processor 210, medium-term processor 220, and long-term processor 230, each analyzing patterns specific to its assigned time scale.

803 — Pattern detection is performed by pattern detection engine 213 in short-term processor 210, pattern evolution tracker 222 in medium-term processor 220, and trend analysis component 232 in long-term processor 230 to identify significant trends and transitions.

804 — State tracking is conducted within each temporal processor, with immediate state tracker 212 managing short-term states, state transition engine 223 updating medium-term states, and historical state archive 234 maintaining long-term states.

805 — Outputs from each temporal processor are sent to cross-scale components 240, where state synchronization mechanism 241 aligns and reconciles states across temporal scales.

806 — Pattern correlation engine 242 integrates detected patterns across time scales to create a unified representation of temporal dependencies.

807 — Temporal coherence validator 243 verifies the consistency of integrated data, ensuring alignment with system-wide state information maintained by state management system 500.

808 — Adjustments to state transitions or outputs are made by scale transition manager 244, refining the integration of data across temporal scales.

809 — Final integrated temporal outputs are provided to fusion engine 400 for subsequent processing and combination with context data.

FIG. 8

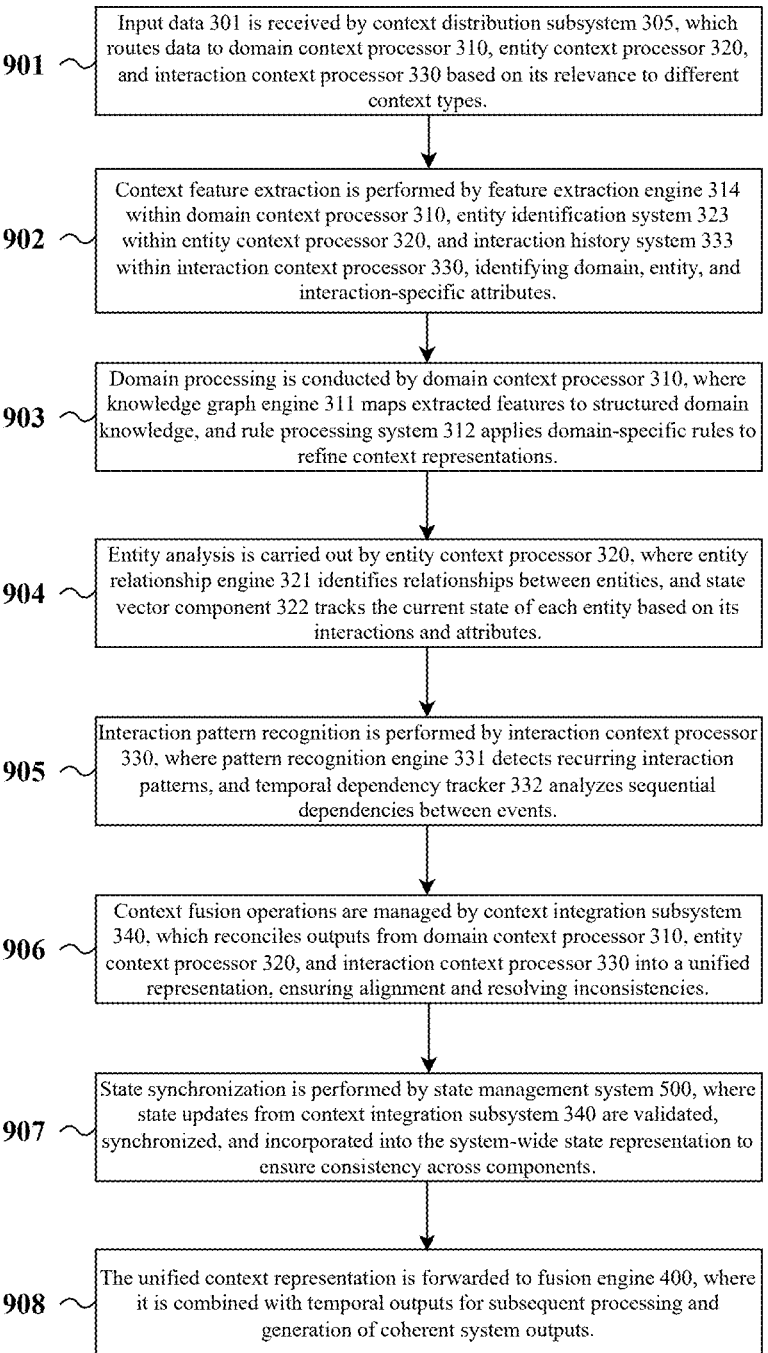

901 — Input data 301 is received by context distribution subsystem 305, which routes data to domain context processor 310, entity context processor 320, and interaction context processor 330 based on its relevance to different context types.

902 — Context feature extraction is performed by feature extraction engine 314 within domain context processor 310, entity identification system 323 within entity context processor 320, and interaction history system 333 within interaction context processor 330, identifying domain, entity, and interaction-specific attributes.

903 — Domain processing is conducted by domain context processor 310, where knowledge graph engine 311 maps extracted features to structured domain knowledge, and rule processing system 312 applies domain-specific rules to refine context representations.

904 — Entity analysis is carried out by entity context processor 320, where entity relationship engine 321 identifies relationships between entities, and state vector component 322 tracks the current state of each entity based on its interactions and attributes.

905 — Interaction pattern recognition is performed by interaction context processor 330, where pattern recognition engine 331 detects recurring interaction patterns, and temporal dependency tracker 332 analyzes sequential dependencies between events.

906 — Context fusion operations are managed by context integration subsystem 340, which reconciles outputs from domain context processor 310, entity context processor 320, and interaction context processor 330 into a unified representation, ensuring alignment and resolving inconsistencies.

907 — State synchronization is performed by state management system 500, where state updates from context integration subsystem 340 are validated, synchronized, and incorporated into the system-wide state representation to ensure consistency across components.

908 — The unified context representation is forwarded to fusion engine 400, where it is combined with temporal outputs for subsequent processing and generation of coherent system outputs.

FIG. 9

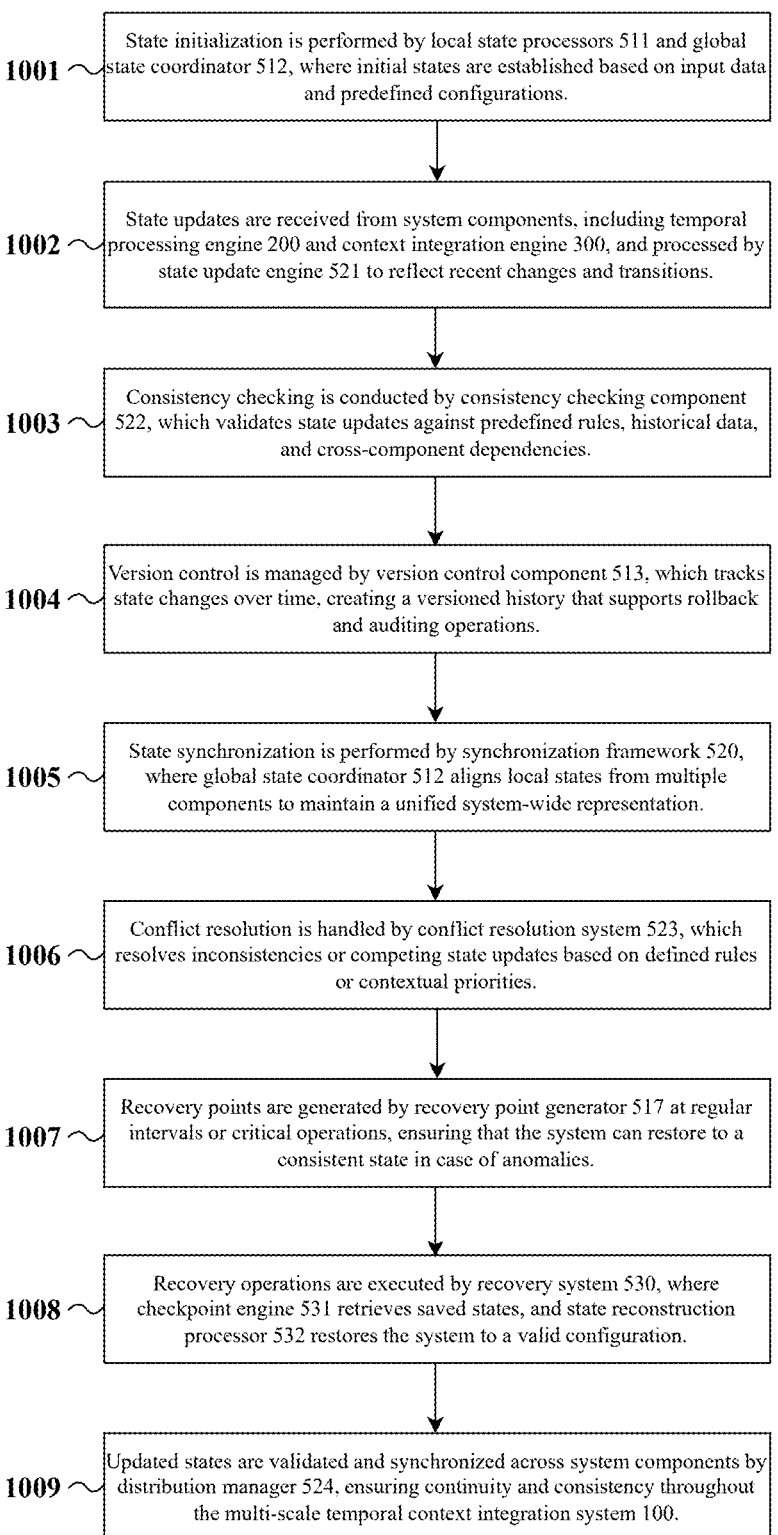

1001 — State initialization is performed by local state processors 511 and global state coordinator 512, where initial states are established based on input data and predefined configurations.

1002 — State updates are received from system components, including temporal processing engine 200 and context integration engine 300, and processed by state update engine 521 to reflect recent changes and transitions.

1003 — Consistency checking is conducted by consistency checking component 522, which validates state updates against predefined rules, historical data, and cross-component dependencies.

1004 — Version control is managed by version control component 513, which tracks state changes over time, creating a versioned history that supports rollback and auditing operations.

1005 — State synchronization is performed by synchronization framework 520, where global state coordinator 512 aligns local states from multiple components to maintain a unified system-wide representation.

1006 — Conflict resolution is handled by conflict resolution system 523, which resolves inconsistencies or competing state updates based on defined rules or contextual priorities.

1007 — Recovery points are generated by recovery point generator 517 at regular intervals or critical operations, ensuring that the system can restore to a consistent state in case of anomalies.

1008 — Recovery operations are executed by recovery system 530, where checkpoint engine 531 retrieves saved states, and state reconstruction processor 532 restores the system to a valid configuration.

1009 — Updated states are validated and synchronized across system components by distribution manager 524, ensuring continuity and consistency throughout the multi-scale temporal context integration system 100.

FIG. 10

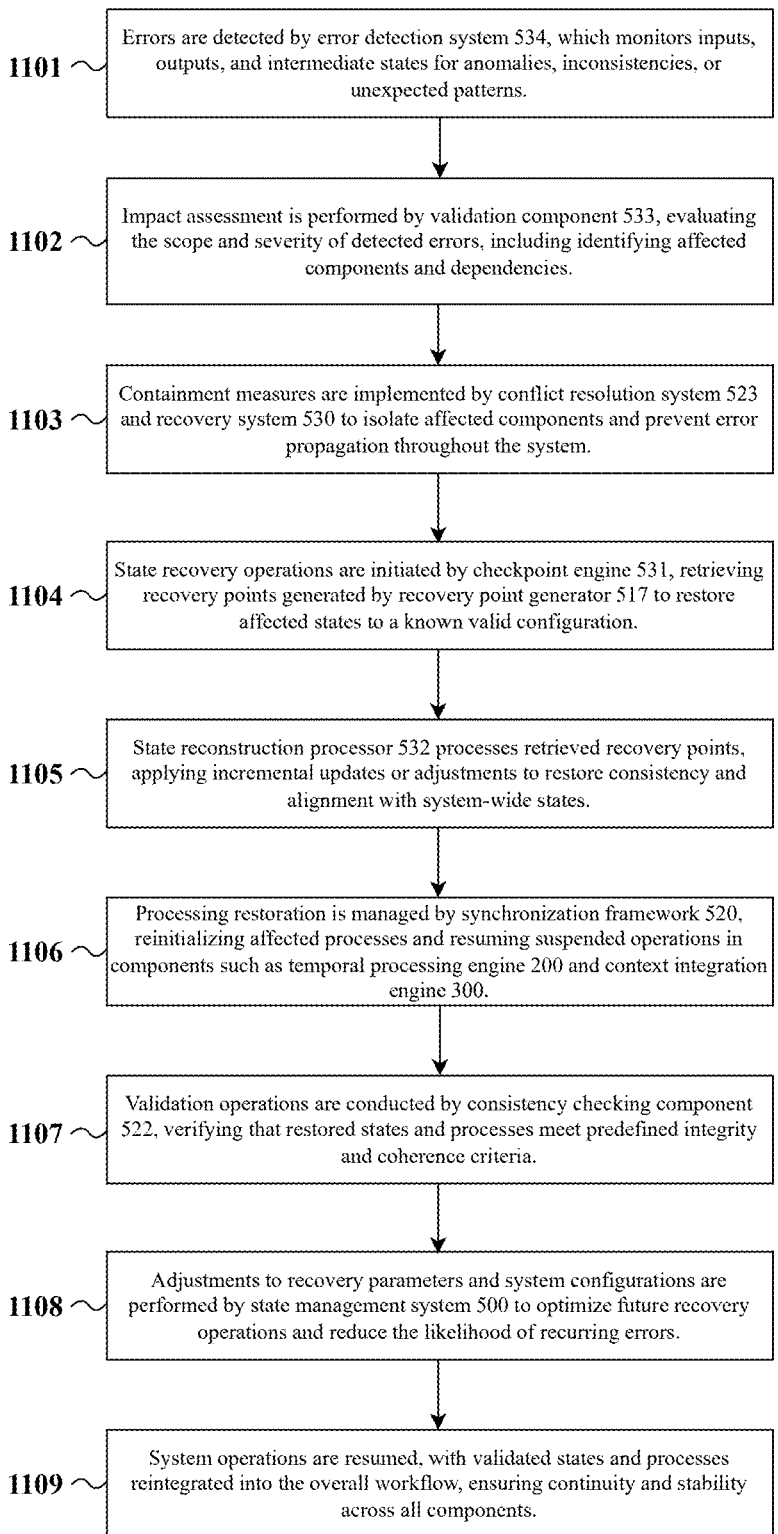

1101 — Errors are detected by error detection system 534, which monitors inputs, outputs, and intermediate states for anomalies, inconsistencies, or unexpected patterns.

1102 — Impact assessment is performed by validation component 533, evaluating the scope and severity of detected errors, including identifying affected components and dependencies.

1103 — Containment measures are implemented by conflict resolution system 523 and recovery system 530 to isolate affected components and prevent error propagation throughout the system.

1104 — State recovery operations are initiated by checkpoint engine 531, retrieving recovery points generated by recovery point generator 517 to restore affected states to a known valid configuration.

1105 — State reconstruction processor 532 processes retrieved recovery points, applying incremental updates or adjustments to restore consistency and alignment with system-wide states.

1106 — Processing restoration is managed by synchronization framework 520, reinitializing affected processes and resuming suspended operations in components such as temporal processing engine 200 and context integration engine 300.

1107 — Validation operations are conducted by consistency checking component 522, verifying that restored states and processes meet predefined integrity and coherence criteria.

1108 — Adjustments to recovery parameters and system configurations are performed by state management system 500 to optimize future recovery operations and reduce the likelihood of recurring errors.

1109 — System operations are resumed, with validated states and processes reintegrated into the overall workflow, ensuring continuity and stability across all components.

FIG. 11

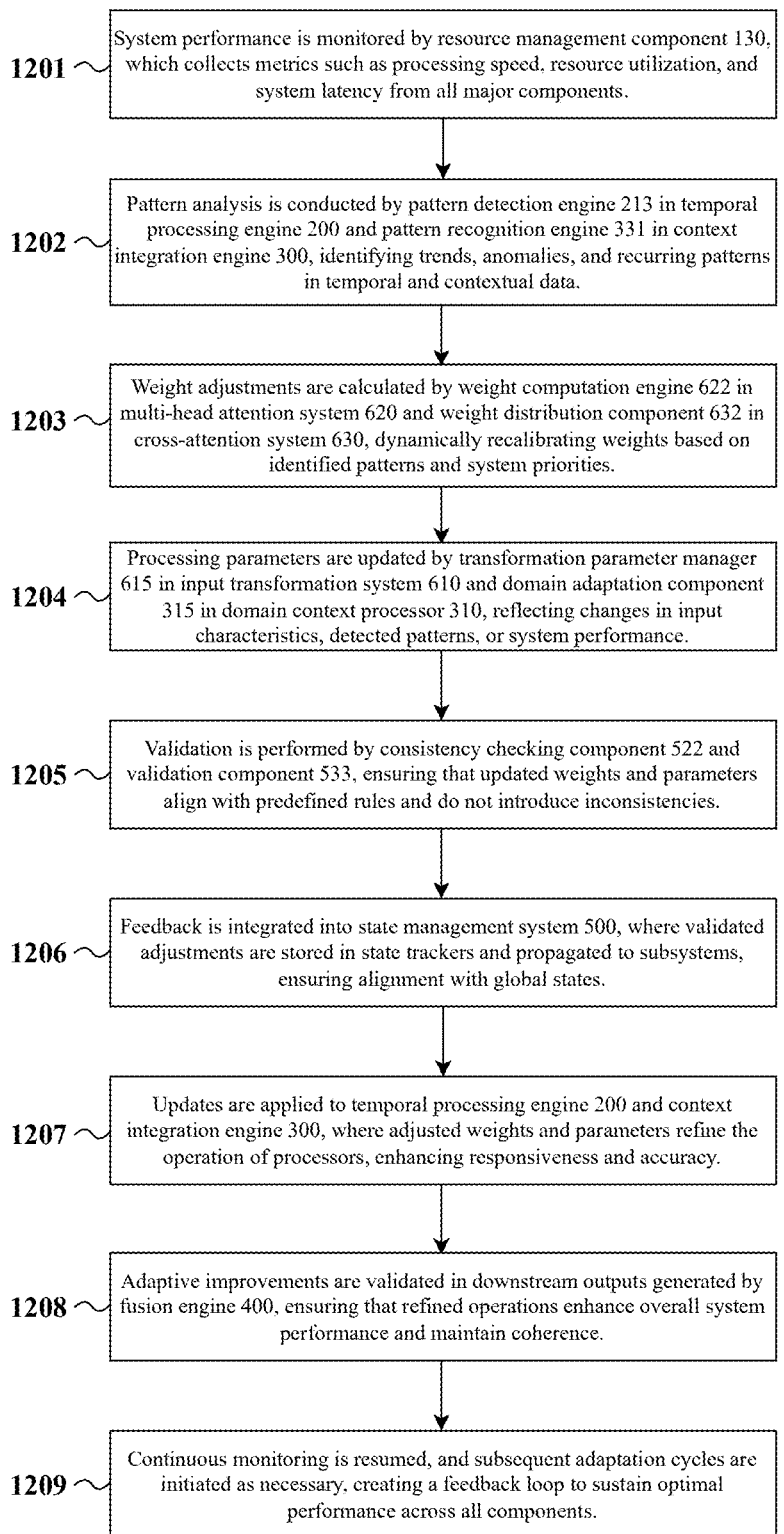

1201 — System performance is monitored by resource management component 130, which collects metrics such as processing speed, resource utilization, and system latency from all major components.

1202 — Pattern analysis is conducted by pattern detection engine 213 in temporal processing engine 200 and pattern recognition engine 331 in context integration engine 300, identifying trends, anomalies, and recurring patterns in temporal and contextual data.

1203 — Weight adjustments are calculated by weight computation engine 622 in multi-head attention system 620 and weight distribution component 632 in cross-attention system 630, dynamically recalibrating weights based on identified patterns and system priorities.

1204 — Processing parameters are updated by transformation parameter manager 615 in input transformation system 610 and domain adaptation component 315 in domain context processor 310, reflecting changes in input characteristics, detected patterns, or system performance.

1205 — Validation is performed by consistency checking component 522 and validation component 533, ensuring that updated weights and parameters align with predefined rules and do not introduce inconsistencies.

1206 — Feedback is integrated into state management system 500, where validated adjustments are stored in state trackers and propagated to subsystems, ensuring alignment with global states.

1207 — Updates are applied to temporal processing engine 200 and context integration engine 300, where adjusted weights and parameters refine the operation of processors, enhancing responsiveness and accuracy.

1208 — Adaptive improvements are validated in downstream outputs generated by fusion engine 400, ensuring that refined operations enhance overall system performance and maintain coherence.

1209 — Continuous monitoring is resumed, and subsequent adaptation cycles are initiated as necessary, creating a feedback loop to sustain optimal performance across all components.

FIG. 12

Multi-Scale Temporal Processing System with Culinary Context Embeddings Architecture
100

Base Transformer Unit
1441

Input Layers(s)
1441A

Multi-Head Attention
Layer(s)
1441B

Feed Forward
Network(s)
1441C

Layer Normalizer(s)
1441D

Output
Generation
1441E

Parallel Latent Transformer Unit

1442

Main Path Processor
1442A

Latent Space Projector
1442B

Latent Processing Engine
1442C

Reconstruction Processor
1442D

Cross-Path Integration
1442E

Culinary-Temporal Transformer Unit 1443

Temporal Stream Processor 1443A

Culinary Stream Processor 1443B

Cross-Attention Processor 1443C

Domain Integration Layer 1443D

Combined Output Generation 1443E

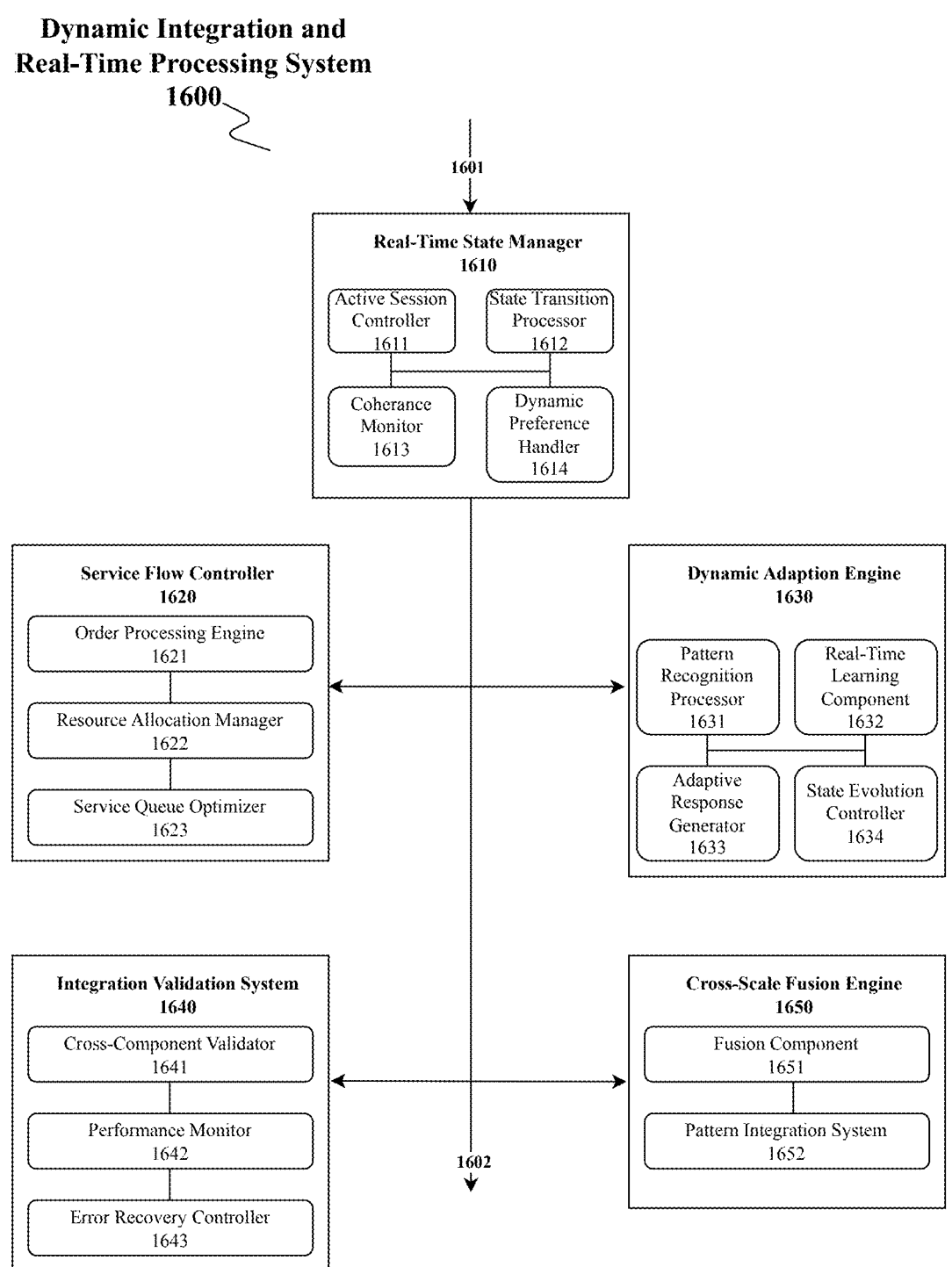

Dynamic Integration and Real-Time Processing System 1600

1601

Real-Time State Manager 1610

Active Session Controller 1611

State Transition Processor 1612

Coherance Monitor 1613

Dynamic Preference Handler 1614

Service Flow Controller 1620

Order Processing Engine 1621

Resource Allocation Manager 1622

Service Queue Optimizer 1623

Dynamic Adaption Engine 1630

Pattern Recognition Processor 1631

Real-Time Learning Component 1632

Adaptive Response Generator 1633

State Evolution Controller 1634

Integration Validation System 1640

Cross-Component Validator 1641

Performance Monitor 1642

Error Recovery Controller 1643

1602

Cross-Scale Fusion Engine 1650

Fusion Component 1651

Pattern Integration System 1652

FIG. 16

Figure 17:
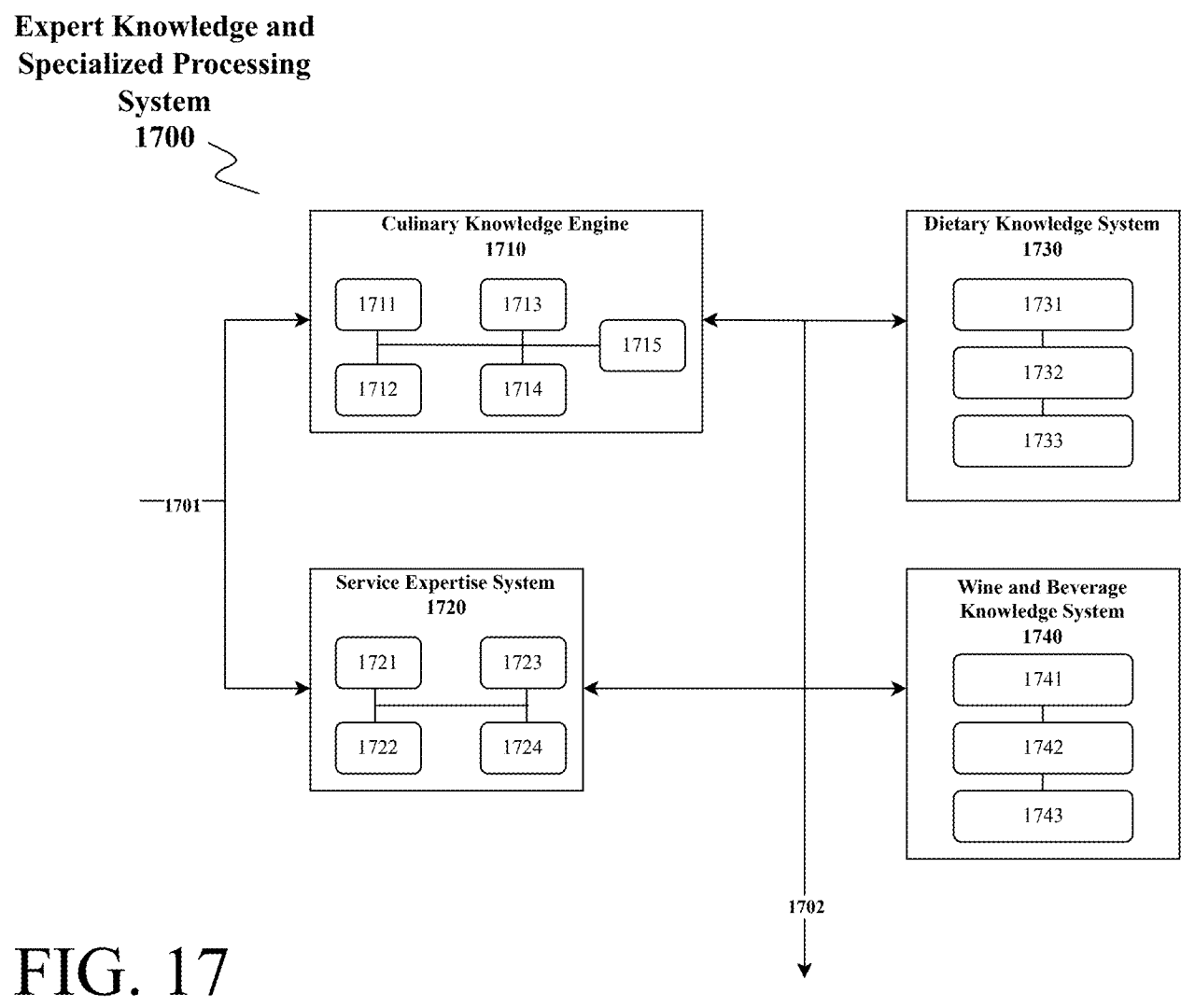

Expert Knowledge and Specialized Processing System 1700

Culinary Knowledge Engine 1710
- 1711
- 1712
- 1713
- 1714
- 1715

Service Expertise System 1720
- 1721
- 1722
- 1723
- 1724

Dietary Knowledge System 1730
- 1731
- 1732
- 1733

Wine and Beverage Knowledge System 1740
- 1741
- 1742
- 1743

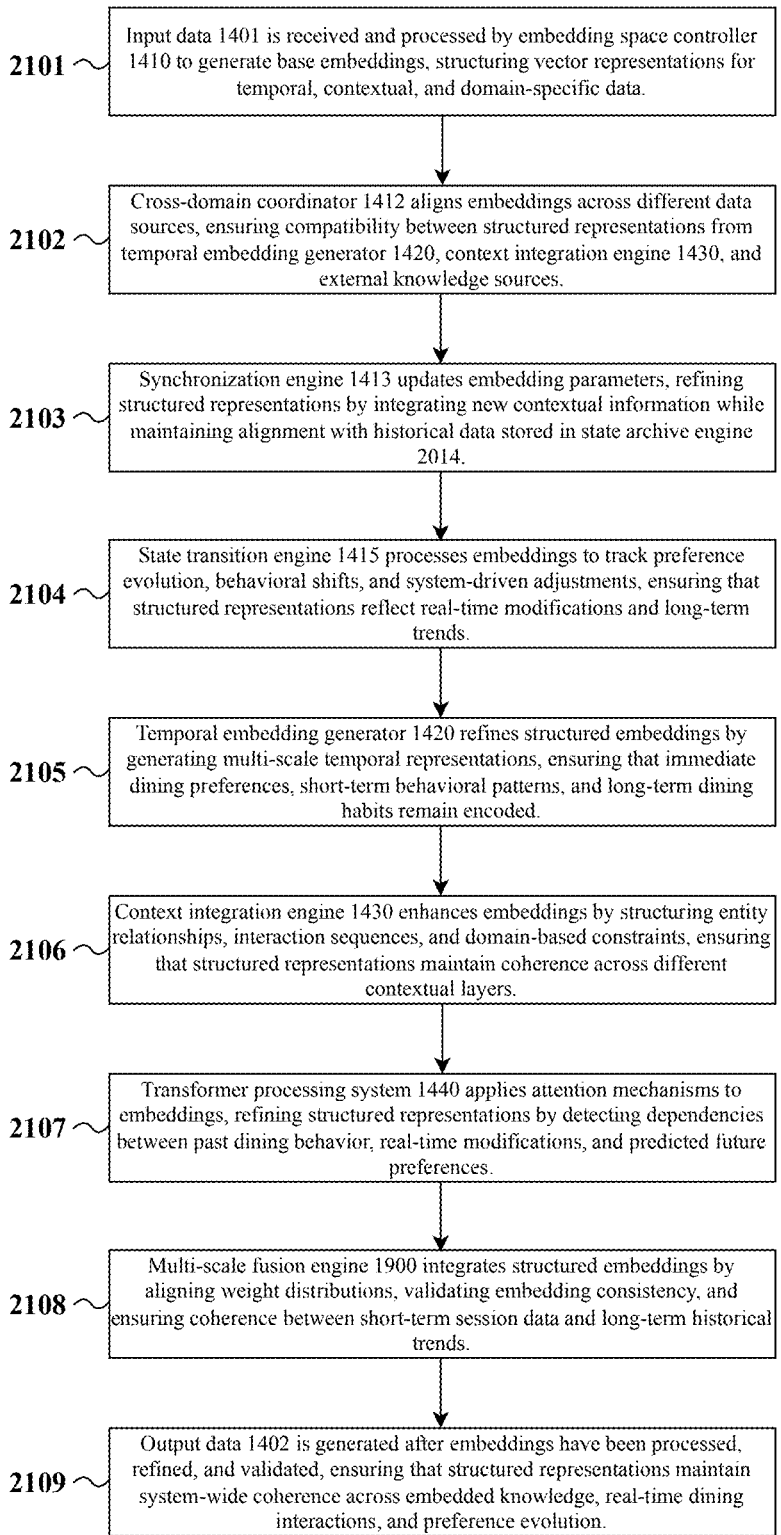

2101 — Input data 1401 is received and processed by embedding space controller 1410 to generate base embeddings, structuring vector representations for temporal, contextual, and domain-specific data.

2102 — Cross-domain coordinator 1412 aligns embeddings across different data sources, ensuring compatibility between structured representations from temporal embedding generator 1420, context integration engine 1430, and external knowledge sources.

2103 — Synchronization engine 1413 updates embedding parameters, refining structured representations by integrating new contextual information while maintaining alignment with historical data stored in state archive engine 2014.

2104 — State transition engine 1415 processes embeddings to track preference evolution, behavioral shifts, and system-driven adjustments, ensuring that structured representations reflect real-time modifications and long-term trends.

2105 — Temporal embedding generator 1420 refines structured embeddings by generating multi-scale temporal representations, ensuring that immediate dining preferences, short-term behavioral patterns, and long-term dining habits remain encoded.

2106 — Context integration engine 1430 enhances embeddings by structuring entity relationships, interaction sequences, and domain-based constraints, ensuring that structured representations maintain coherence across different contextual layers.

2107 — Transformer processing system 1440 applies attention mechanisms to embeddings, refining structured representations by detecting dependencies between past dining behavior, real-time modifications, and predicted future preferences.

2108 — Multi-scale fusion engine 1900 integrates structured embeddings by aligning weight distributions, validating embedding consistency, and ensuring coherence between short-term session data and long-term historical trends.

2109 — Output data 1402 is generated after embeddings have been processed, refined, and validated, ensuring that structured representations maintain system-wide coherence across embedded knowledge, real-time dining interactions, and preference evolution.

FIG. 21

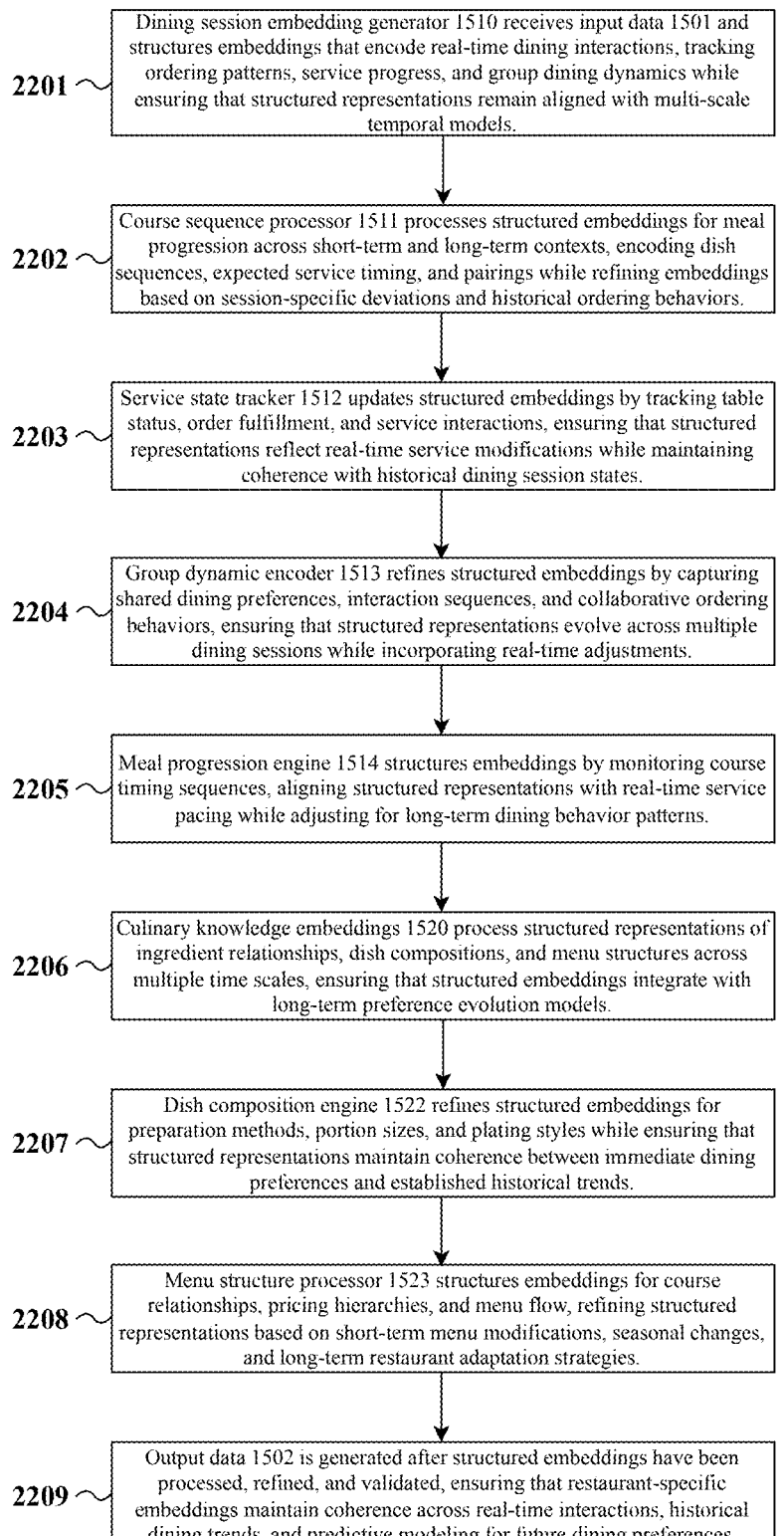

2201 — Dining session embedding generator 1510 receives input data 1501 and structures embeddings that encode real-time dining interactions, tracking ordering patterns, service progress, and group dining dynamics while ensuring that structured representations remain aligned with multi-scale temporal models.

2202 — Course sequence processor 1511 processes structured embeddings for meal progression across short-term and long-term contexts, encoding dish sequences, expected service timing, and pairings while refining embeddings based on session-specific deviations and historical ordering behaviors.

2203 — Service state tracker 1512 updates structured embeddings by tracking table status, order fulfillment, and service interactions, ensuring that structured representations reflect real-time service modifications while maintaining coherence with historical dining session states.

2204 — Group dynamic encoder 1513 refines structured embeddings by capturing shared dining preferences, interaction sequences, and collaborative ordering behaviors, ensuring that structured representations evolve across multiple dining sessions while incorporating real-time adjustments.

2205 — Meal progression engine 1514 structures embeddings by monitoring course timing sequences, aligning structured representations with real-time service pacing while adjusting for long-term dining behavior patterns.

2206 — Culinary knowledge embeddings 1520 process structured representations of ingredient relationships, dish compositions, and menu structures across multiple time scales, ensuring that structured embeddings integrate with long-term preference evolution models.

2207 — Dish composition engine 1522 refines structured embeddings for preparation methods, portion sizes, and plating styles while ensuring that structured representations maintain coherence between immediate dining preferences and established historical trends.

2208 — Menu structure processor 1523 structures embeddings for course relationships, pricing hierarchies, and menu flow, refining structured representations based on short-term menu modifications, seasonal changes, and long-term restaurant adaptation strategies.

2209 — Output data 1502 is generated after structured embeddings have been processed, refined, and validated, ensuring that restaurant-specific embeddings maintain coherence across real-time interactions, historical dining trends, and predictive modeling for future dining preferences.

FIG. 22

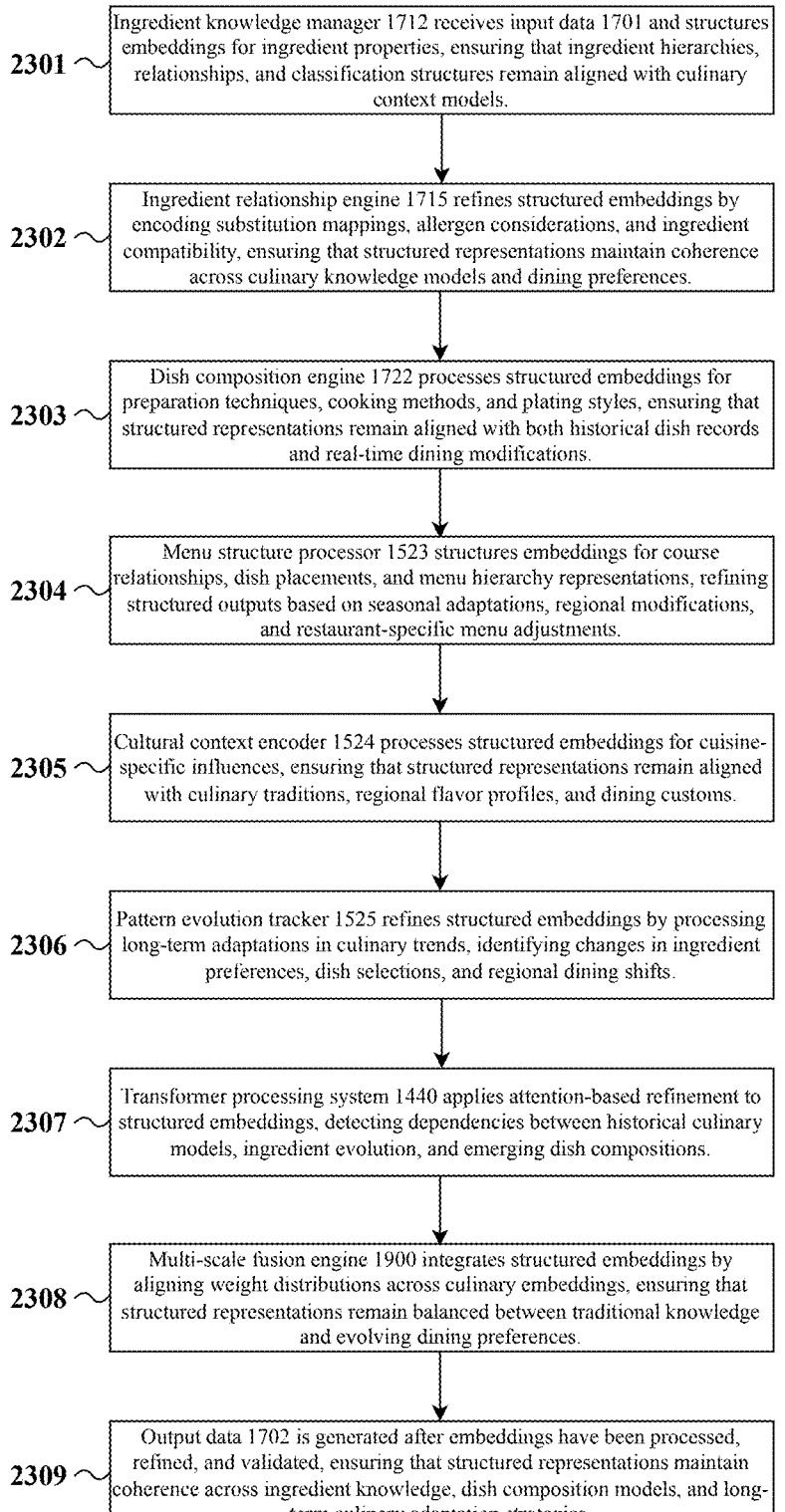

2301 — Ingredient knowledge manager 1712 receives input data 1701 and structures embeddings for ingredient properties, ensuring that ingredient hierarchies, relationships, and classification structures remain aligned with culinary context models.

2302 — Ingredient relationship engine 1715 refines structured embeddings by encoding substitution mappings, allergen considerations, and ingredient compatibility, ensuring that structured representations maintain coherence across culinary knowledge models and dining preferences.

2303 — Dish composition engine 1722 processes structured embeddings for preparation techniques, cooking methods, and plating styles, ensuring that structured representations remain aligned with both historical dish records and real-time dining modifications.

2304 — Menu structure processor 1523 structures embeddings for course relationships, dish placements, and menu hierarchy representations, refining structured outputs based on seasonal adaptations, regional modifications, and restaurant-specific menu adjustments.

2305 — Cultural context encoder 1524 processes structured embeddings for cuisine-specific influences, ensuring that structured representations remain aligned with culinary traditions, regional flavor profiles, and dining customs.

2306 — Pattern evolution tracker 1525 refines structured embeddings by processing long-term adaptations in culinary trends, identifying changes in ingredient preferences, dish selections, and regional dining shifts.

2307 — Transformer processing system 1440 applies attention-based refinement to structured embeddings, detecting dependencies between historical culinary models, ingredient evolution, and emerging dish compositions.

2308 — Multi-scale fusion engine 1900 integrates structured embeddings by aligning weight distributions across culinary embeddings, ensuring that structured representations remain balanced between traditional knowledge and evolving dining preferences.

2309 — Output data 1702 is generated after embeddings have been processed, refined, and validated, ensuring that structured representations maintain coherence across ingredient knowledge, dish composition models, and long-term culinary adaptation strategies.

FIG. 23

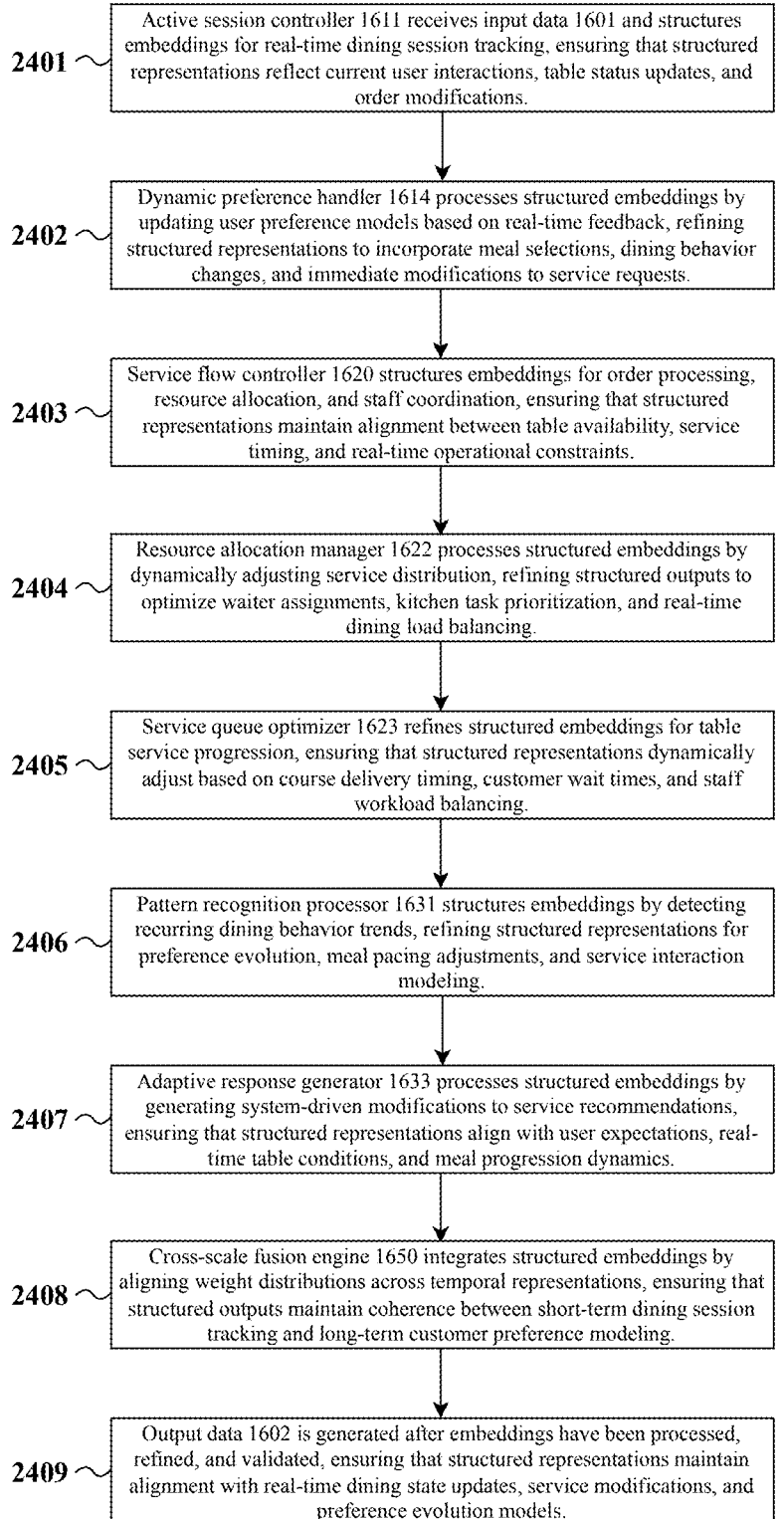

2401 — Active session controller 1611 receives input data 1601 and structures embeddings for real-time dining session tracking, ensuring that structured representations reflect current user interactions, table status updates, and order modifications.

2402 — Dynamic preference handler 1614 processes structured embeddings by updating user preference models based on real-time feedback, refining structured representations to incorporate meal selections, dining behavior changes, and immediate modifications to service requests.

2403 — Service flow controller 1620 structures embeddings for order processing, resource allocation, and staff coordination, ensuring that structured representations maintain alignment between table availability, service timing, and real-time operational constraints.

2404 — Resource allocation manager 1622 processes structured embeddings by dynamically adjusting service distribution, refining structured outputs to optimize waiter assignments, kitchen task prioritization, and real-time dining load balancing.

2405 — Service queue optimizer 1623 refines structured embeddings for table service progression, ensuring that structured representations dynamically adjust based on course delivery timing, customer wait times, and staff workload balancing.

2406 — Pattern recognition processor 1631 structures embeddings by detecting recurring dining behavior trends, refining structured representations for preference evolution, meal pacing adjustments, and service interaction modeling.

2407 — Adaptive response generator 1633 processes structured embeddings by generating system-driven modifications to service recommendations, ensuring that structured representations align with user expectations, real-time table conditions, and meal progression dynamics.

2408 — Cross-scale fusion engine 1650 integrates structured embeddings by aligning weight distributions across temporal representations, ensuring that structured outputs maintain coherence between short-term dining session tracking and long-term customer preference modeling.

2409 — Output data 1602 is generated after embeddings have been processed, refined, and validated, ensuring that structured representations maintain alignment with real-time dining state updates, service modifications, and preference evolution models.

FIG. 24

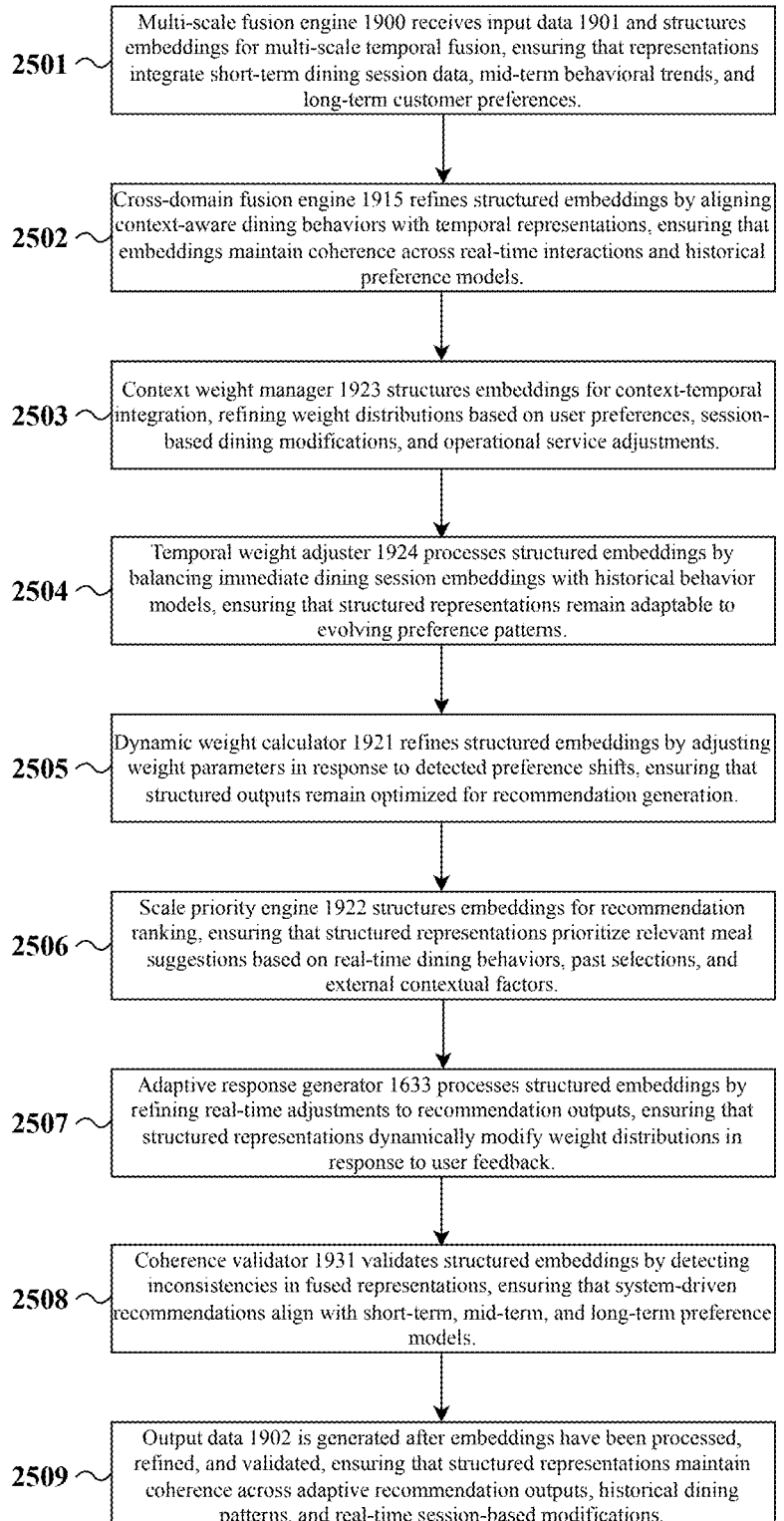

2501 — Multi-scale fusion engine 1900 receives input data 1901 and structures embeddings for multi-scale temporal fusion, ensuring that representations integrate short-term dining session data, mid-term behavioral trends, and long-term customer preferences.

2502 — Cross-domain fusion engine 1915 refines structured embeddings by aligning context-aware dining behaviors with temporal representations, ensuring that embeddings maintain coherence across real-time interactions and historical preference models.

2503 — Context weight manager 1923 structures embeddings for context-temporal integration, refining weight distributions based on user preferences, session-based dining modifications, and operational service adjustments.

2504 — Temporal weight adjuster 1924 processes structured embeddings by balancing immediate dining session embeddings with historical behavior models, ensuring that structured representations remain adaptable to evolving preference patterns.

2505 — Dynamic weight calculator 1921 refines structured embeddings by adjusting weight parameters in response to detected preference shifts, ensuring that structured outputs remain optimized for recommendation generation.

2506 — Scale priority engine 1922 structures embeddings for recommendation ranking, ensuring that structured representations prioritize relevant meal suggestions based on real-time dining behaviors, past selections, and external contextual factors.

2507 — Adaptive response generator 1633 processes structured embeddings by refining real-time adjustments to recommendation outputs, ensuring that structured representations dynamically modify weight distributions in response to user feedback.

2508 — Coherence validator 1931 validates structured embeddings by detecting inconsistencies in fused representations, ensuring that system-driven recommendations align with short-term, mid-term, and long-term preference models.

2509 — Output data 1902 is generated after embeddings have been processed, refined, and validated, ensuring that structured representations maintain coherence across adaptive recommendation outputs, historical dining patterns, and real-time session-based modifications.

FIG. 25

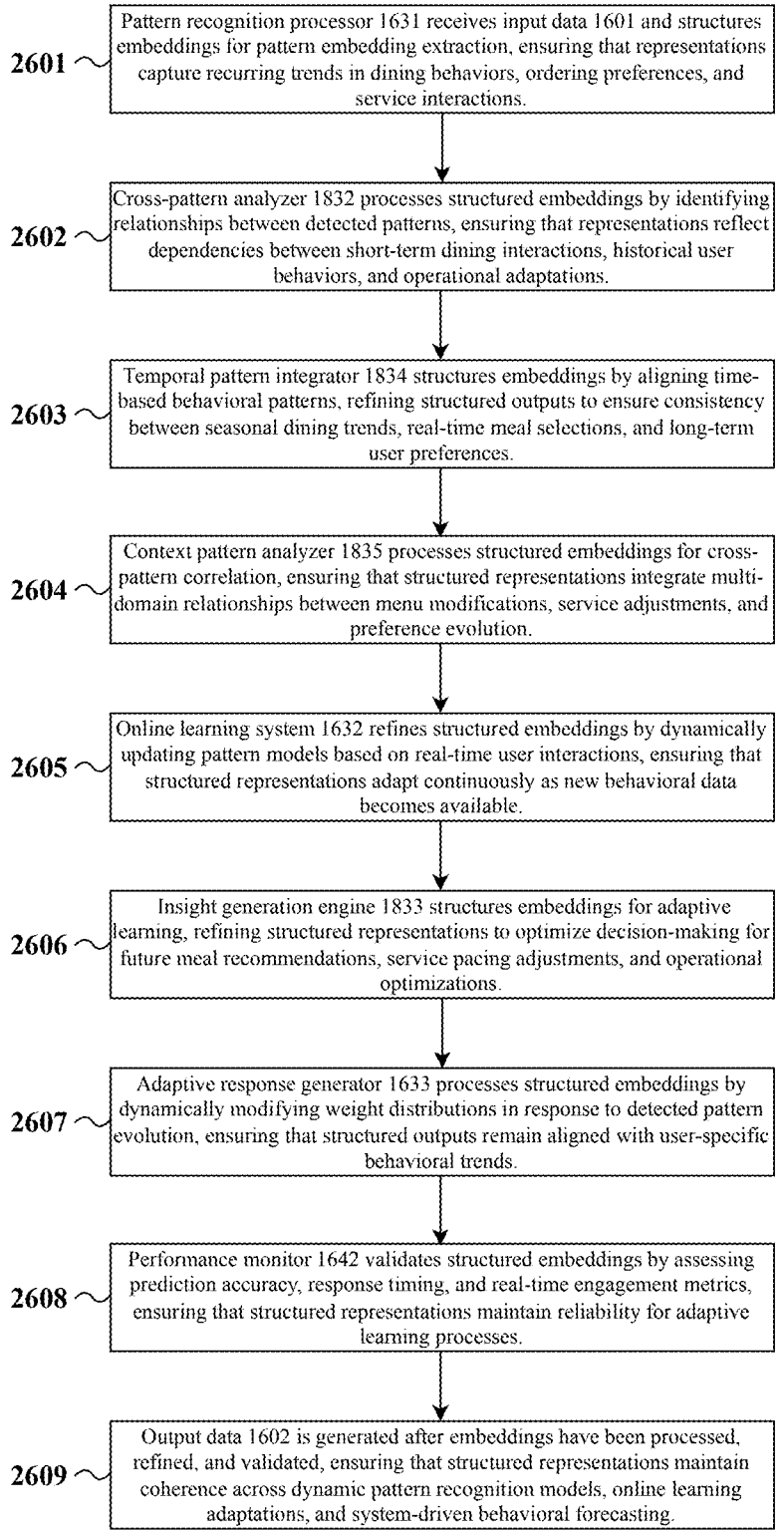

2601 — Pattern recognition processor 1631 receives input data 1601 and structures embeddings for pattern embedding extraction, ensuring that representations capture recurring trends in dining behaviors, ordering preferences, and service interactions.

2602 — Cross-pattern analyzer 1832 processes structured embeddings by identifying relationships between detected patterns, ensuring that representations reflect dependencies between short-term dining interactions, historical user behaviors, and operational adaptations.

2603 — Temporal pattern integrator 1834 structures embeddings by aligning time-based behavioral patterns, refining structured outputs to ensure consistency between seasonal dining trends, real-time meal selections, and long-term user preferences.

2604 — Context pattern analyzer 1835 processes structured embeddings for cross-pattern correlation, ensuring that structured representations integrate multi-domain relationships between menu modifications, service adjustments, and preference evolution.

2605 — Online learning system 1632 refines structured embeddings by dynamically updating pattern models based on real-time user interactions, ensuring that structured representations adapt continuously as new behavioral data becomes available.

2606 — Insight generation engine 1833 structures embeddings for adaptive learning, refining structured representations to optimize decision-making for future meal recommendations, service pacing adjustments, and operational optimizations.

2607 — Adaptive response generator 1633 processes structured embeddings by dynamically modifying weight distributions in response to detected pattern evolution, ensuring that structured outputs remain aligned with user-specific behavioral trends.

2608 — Performance monitor 1642 validates structured embeddings by assessing prediction accuracy, response timing, and real-time engagement metrics, ensuring that structured representations maintain reliability for adaptive learning processes.

2609 — Output data 1602 is generated after embeddings have been processed, refined, and validated, ensuring that structured representations maintain coherence across dynamic pattern recognition models, online learning adaptations, and system-driven behavioral forecasting.

FIG. 26

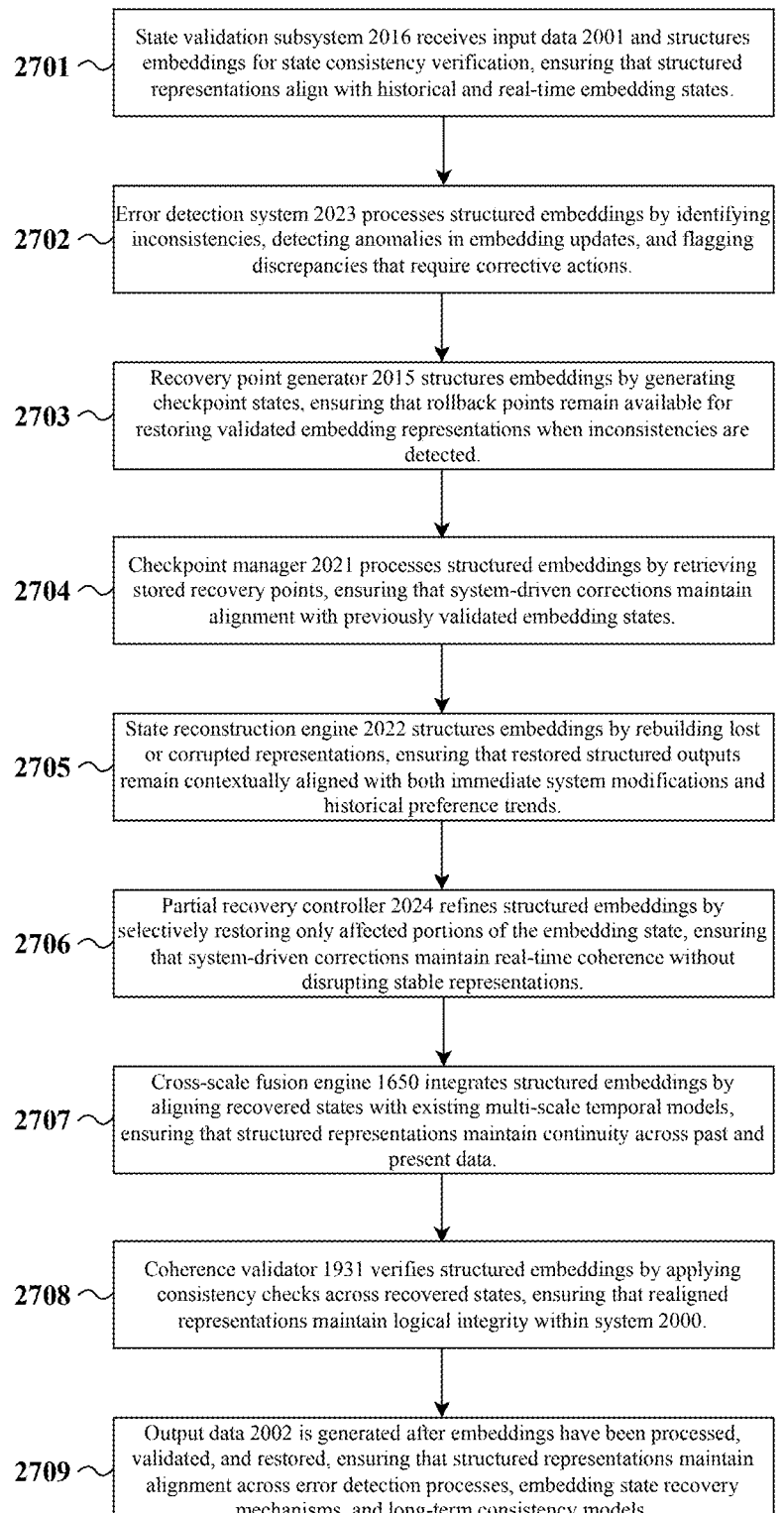

2701 — State validation subsystem 2016 receives input data 2001 and structures embeddings for state consistency verification, ensuring that structured representations align with historical and real-time embedding states.

2702 — Error detection system 2023 processes structured embeddings by identifying inconsistencies, detecting anomalies in embedding updates, and flagging discrepancies that require corrective actions.

2703 — Recovery point generator 2015 structures embeddings by generating checkpoint states, ensuring that rollback points remain available for restoring validated embedding representations when inconsistencies are detected.

2704 — Checkpoint manager 2021 processes structured embeddings by retrieving stored recovery points, ensuring that system-driven corrections maintain alignment with previously validated embedding states.

2705 — State reconstruction engine 2022 structures embeddings by rebuilding lost or corrupted representations, ensuring that restored structured outputs remain contextually aligned with both immediate system modifications and historical preference trends.

2706 — Partial recovery controller 2024 refines structured embeddings by selectively restoring only affected portions of the embedding state, ensuring that system-driven corrections maintain real-time coherence without disrupting stable representations.

2707 — Cross-scale fusion engine 1650 integrates structured embeddings by aligning recovered states with existing multi-scale temporal models, ensuring that structured representations maintain continuity across past and present data.

2708 — Coherence validator 1931 verifies structured embeddings by applying consistency checks across recovered states, ensuring that realigned representations maintain logical integrity within system 2000.

2709 — Output data 2002 is generated after embeddings have been processed, validated, and restored, ensuring that structured representations maintain alignment across error detection processes, embedding state recovery mechanisms, and long-term consistency models.

FIG. 27

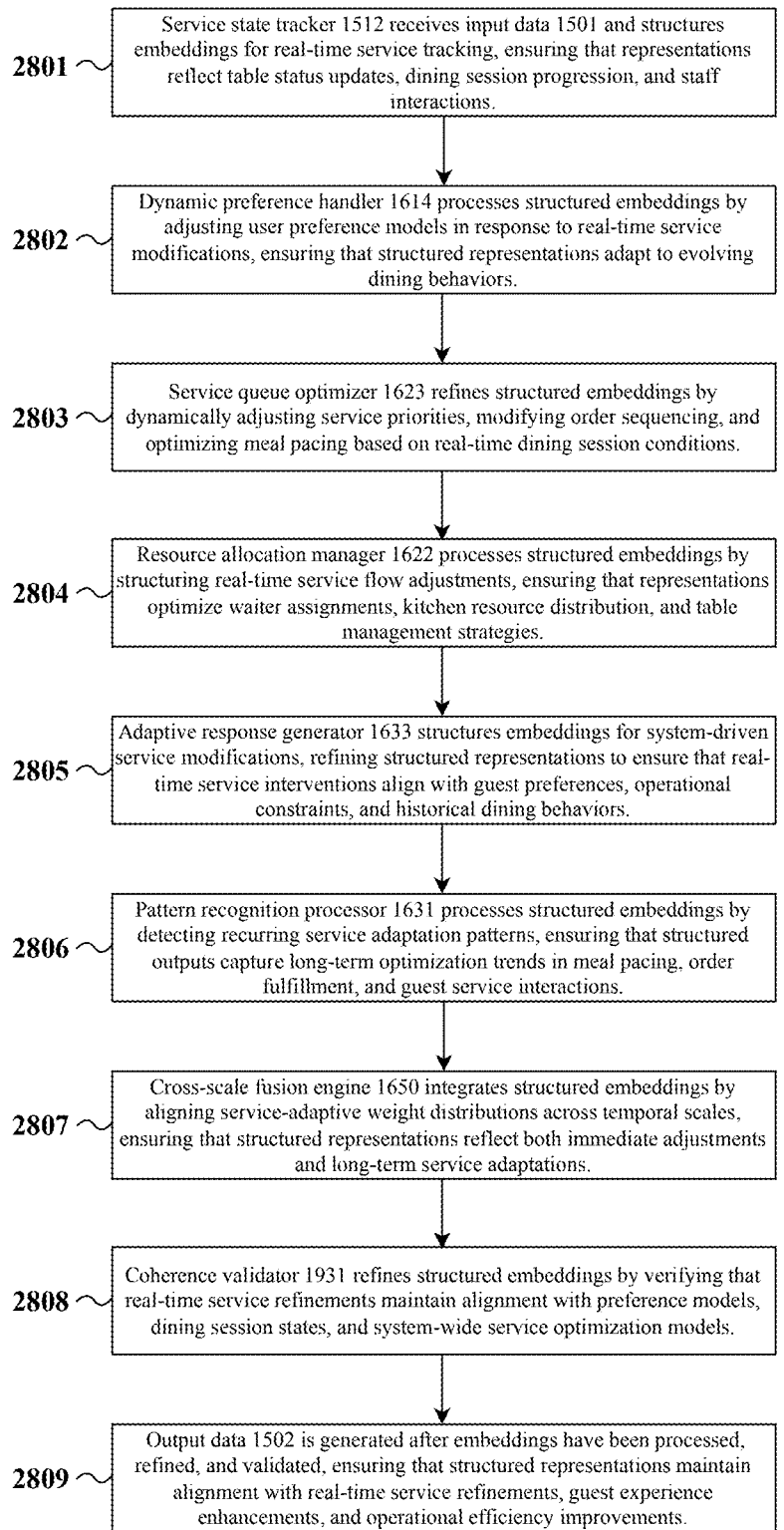

2801 — Service state tracker 1512 receives input data 1501 and structures embeddings for real-time service tracking, ensuring that representations reflect table status updates, dining session progression, and staff interactions.

2802 — Dynamic preference handler 1614 processes structured embeddings by adjusting user preference models in response to real-time service modifications, ensuring that structured representations adapt to evolving dining behaviors.

2803 — Service queue optimizer 1623 refines structured embeddings by dynamically adjusting service priorities, modifying order sequencing, and optimizing meal pacing based on real-time dining session conditions.

2804 — Resource allocation manager 1622 processes structured embeddings by structuring real-time service flow adjustments, ensuring that representations optimize waiter assignments, kitchen resource distribution, and table management strategies.

2805 — Adaptive response generator 1633 structures embeddings for system-driven service modifications, refining structured representations to ensure that real-time service interventions align with guest preferences, operational constraints, and historical dining behaviors.

2806 — Pattern recognition processor 1631 processes structured embeddings by detecting recurring service adaptation patterns, ensuring that structured outputs capture long-term optimization trends in meal pacing, order fulfillment, and guest service interactions.

2807 — Cross-scale fusion engine 1650 integrates structured embeddings by aligning service-adaptive weight distributions across temporal scales, ensuring that structured representations reflect both immediate adjustments and long-term service adaptations.

2808 — Coherence validator 1931 refines structured embeddings by verifying that real-time service refinements maintain alignment with preference models, dining session states, and system-wide service optimization models.

2809 — Output data 1502 is generated after embeddings have been processed, refined, and validated, ensuring that structured representations maintain alignment with real-time service refinements, guest experience enhancements, and operational efficiency improvements.

FIG. 28

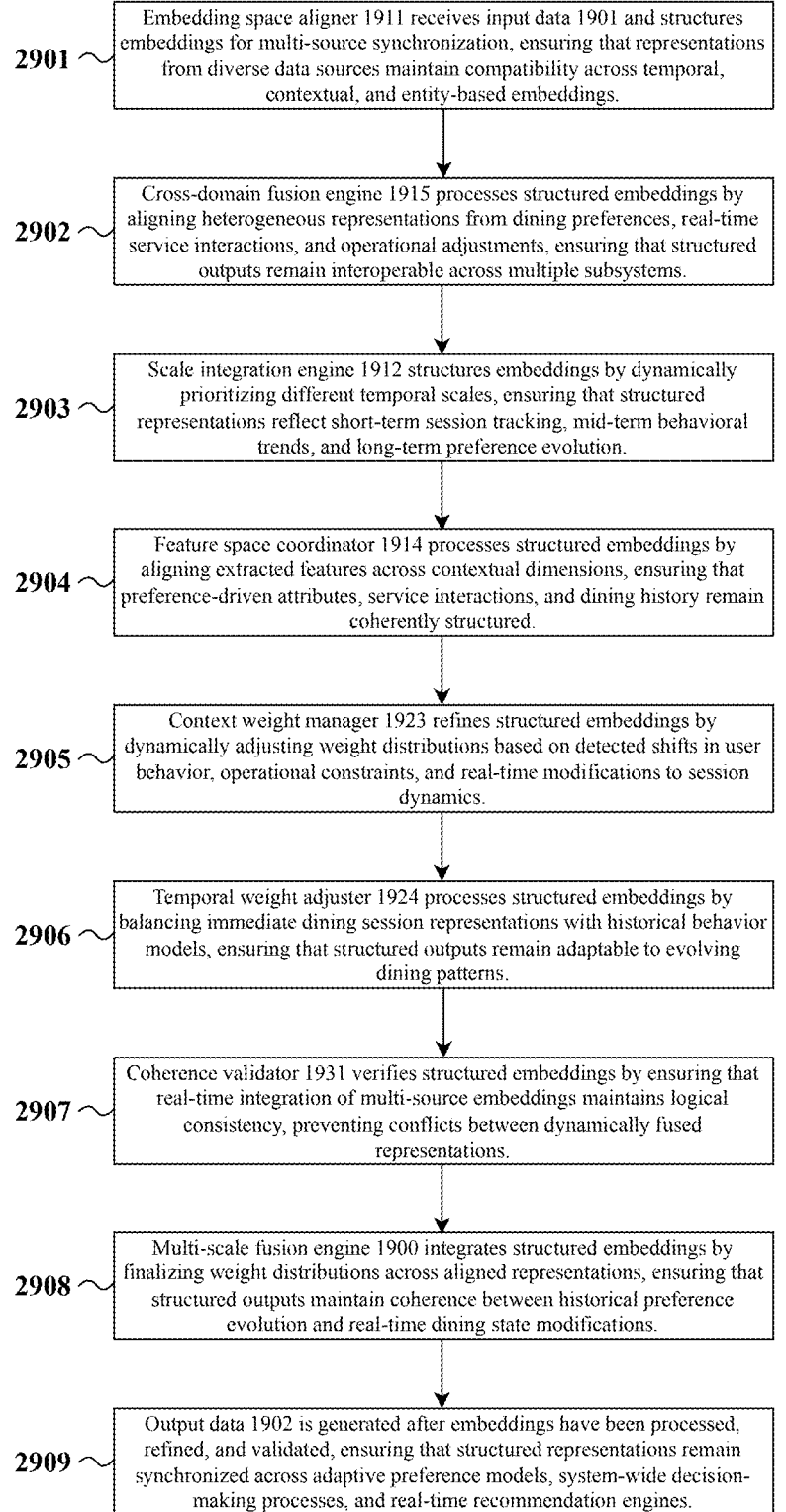

2901 Embedding space aligner 1911 receives input data 1901 and structures embeddings for multi-source synchronization, ensuring that representations from diverse data sources maintain compatibility across temporal, contextual, and entity-based embeddings.

2902 Cross-domain fusion engine 1915 processes structured embeddings by aligning heterogeneous representations from dining preferences, real-time service interactions, and operational adjustments, ensuring that structured outputs remain interoperable across multiple subsystems.

2903 Scale integration engine 1912 structures embeddings by dynamically prioritizing different temporal scales, ensuring that structured representations reflect short-term session tracking, mid-term behavioral trends, and long-term preference evolution.

2904 Feature space coordinator 1914 processes structured embeddings by aligning extracted features across contextual dimensions, ensuring that preference-driven attributes, service interactions, and dining history remain coherently structured.

2905 Context weight manager 1923 refines structured embeddings by dynamically adjusting weight distributions based on detected shifts in user behavior, operational constraints, and real-time modifications to session dynamics.

2906 Temporal weight adjuster 1924 processes structured embeddings by balancing immediate dining session representations with historical behavior models, ensuring that structured outputs remain adaptable to evolving dining patterns.

2907 Coherence validator 1931 verifies structured embeddings by ensuring that real-time integration of multi-source embeddings maintains logical consistency, preventing conflicts between dynamically fused representations.

2908 Multi-scale fusion engine 1900 integrates structured embeddings by finalizing weight distributions across aligned representations, ensuring that structured outputs maintain coherence between historical preference evolution and real-time dining state modifications.

2909 Output data 1902 is generated after embeddings have been processed, refined, and validated, ensuring that structured representations remain synchronized across adaptive preference models, system-wide decision-making processes, and real-time recommendation engines.

FIG. 29

MULTI-SCALE TEMPORAL PROCESSING SYSTEM WITH CULINARY CONTEXT EMBEDDINGS

CROSS-REFERENCE TO RELATED APPLICATIONS

Priority is claimed in the application data sheet to the following patents or patent applications, each of which is expressly incorporated herein by reference in its entirety:
  Ser. No. 19/177,614

BACKGROUND OF THE INVENTION

Field of the Art

The present invention relates to the field of artificial intelligence systems and temporal processing architectures, and more specifically to systems and methods for multi-scale temporal processing of dining context, enabling adaptive meal recommendations, real-time service optimization, and dynamic menu management through structured embedding refinement and state tracking.

Discussion of the State of the Art

Current artificial intelligence systems face significant limitations in their ability to process and integrate culinary and service-related contextual information across multiple time scales effectively. Existing approaches typically operate at a single, fixed temporal scale, restricting their ability to adapt dining recommendations, service pacing, and menu adjustments in response to both immediate session dynamics and long-term behavioral trends. This single-scale processing hinders the ability to track preference evolution over time, align real-time user interactions with historical dining patterns, and dynamically refine structured embeddings, leading to inefficient meal recommendations, suboptimal service timing, and rigid menu structures that fail to account for evolving user needs.

One of the key challenges lies in the integration of temporal dining data with domain-specific culinary and service context. Many current systems fail to synthesize relationships between ingredient preferences, dish composition structures, and service interactions within a unified temporal model. As a result, existing systems lack the capability to generate adaptive recommendations that balance real-time customer input with structured knowledge of long-term dietary habits, seasonal ingredient availability, and regional cuisine variations. This limitation reduces the effectiveness of applications requiring real-time meal personalization, adaptive service refinements, and dynamic menu optimization in restaurant, hospitality, and food service environments.

Another significant drawback of current systems is their poor handling of state transitions across different dining sessions. Without a robust mechanism for tracking ordering behaviors, ingredient substitutions, and long-term service interactions, existing solutions struggle to preserve continuity in dining recommendations, maintain consistency in adaptive menu modifications, and refine structured embeddings to align with evolving customer preferences. This lack of temporal coherence is particularly problematic in applications requiring multi-session preference retention, service coordination across multiple dining venues, and ingredient-aware meal customization.

Moreover, existing solutions often fail to integrate immediate dining session data with long-term customer history, limiting their ability to dynamically balance real-time adjustments with established preference trends. While some systems may excel at processing single-session recommendations, they lack historical memory structures that allow for intelligent adaptation to past ordering behaviors, cross-session preference modeling, and cumulative dietary trend analysis. Conversely, systems that focus primarily on historical meal tracking frequently fail to respond effectively to real-time ordering modifications, service disruptions, or immediate dietary adjustments.

What is needed is a system that processes and integrates multi-scale temporal dining context, ensuring that real-time session data, mid-term dining behaviors, and long-term culinary patterns remain synchronized. A robust solution must maintain temporal coherence, flexibly incorporate domain-specific culinary knowledge, entity relationships, and interaction sequences, and leverage adaptive state management to refine structured embeddings continuously. By aligning real-time dining preferences with structured historical insights, an improved system should enable personalized meal recommendations, optimized service interactions, and intelligent menu adaptations that dynamically evolve with user behaviors over time.

SUMMARY OF THE INVENTION

Accordingly, the inventor has conceived and reduced to practice a system and method for multi-scale temporal context processing and integration in dining recommendation systems. The system comprises a temporal processing engine, a dining context integration engine, and a fusion engine that operate cooperatively to process dining input data across multiple time scales, extract and manage dining context features, and generate coherent dining recommendations while maintaining temporal coherence. The invention provides a robust framework for simultaneously processing immediate, recent, and historical dining data, integrating domain-specific and contextual information, and ensuring consistent state management across dining sessions.

In an embodiment, the system includes a temporal processing engine configured to receive dining input data comprising immediate and historical dining context, process the data using multiple temporal processors operating at distinct time scales, and maintain temporal coherence between the temporal processors.

In an aspect of an embodiment, the temporal processing engine includes a short-term processor for analyzing immediate dining session data and a long-term processor for processing historical dining patterns, with both processors operating simultaneously to maintain temporal coherence.

In another aspect of an embodiment, the system further includes a dining context integration engine configured to extract dining context features, generate dining context representations for different dining context types, and maintain relationships and state changes across individual diner preferences and group dining dynamics.

In an aspect of an embodiment, the system includes a culinary knowledge engine that processes hierarchical ingredient embeddings and dish embeddings through a transformer architecture to generate dining context representations.

In an aspect of an embodiment, the culinary knowledge engine encodes both cuisine-specific preparation methods and cultural significance metadata within the dish embeddings to inform the dining recommendations.

In an aspect of an embodiment, the fusion engine dynamically combines outputs from the plurality of temporal processors and integrates these outputs with the dining context representations to generate personalized dining recommendations.

In an aspect of an embodiment, the fusion engine adjusts weights between temporal embeddings and dining context embeddings based on the progression of the current dining session.

In an aspect of an embodiment, maintaining temporal coherence involves tracking both current dining session states and historical preference evolution states across multiple time scales to ensure consistent outputs.

In another aspect of an embodiment, the dining recommendations are generated using parallel transformer networks that simultaneously process temporal embeddings and culinary embeddings while maintaining dining context coherence.

In an aspect of an embodiment, the system further includes a pattern recognition system that identifies and tracks preference evolution across multiple time scales and integrates this information into the dining context representations.

In another aspect of an embodiment, the system includes an adaptation system configured to adjust processing parameters and update dining context representations based on identified pattern changes across time scales.

In an aspect of an embodiment, the fusion engine validates the consistency of temporal, context, and state information throughout the integration process, ensuring coherence in the final dining recommendation output.

BRIEF DESCRIPTION OF THE DRAWING FIGURES

FIG. 1 is a block diagram illustrating exemplary architecture of multi-scale temporal context integration system

FIG. 7 is a method diagram illustrating the overall processing of multi-scale temporal context integration system.

FIG. 8 is a method diagram illustrating the temporal processing of multi-scale temporal context integration system.

FIG. 9 is a method diagram illustrating the context integration of multi-scale temporal context integration system.

FIG. 10 is a method diagram illustrating the state management of multi-scale temporal context integration system.

FIG. 11 is a method diagram illustrating the error recovery of multi-scale temporal context integration system.

FIG. 12 is a method diagram illustrating the adaptation of multi-scale temporal context integration system.

FIG. 16 is a block diagram illustrating exemplary architecture of dynamic integration system.

FIG. 17 is a block diagram illustrating exemplary architecture of expert knowledge system.

FIG. 21 is a method diagram illustrating embedding generation and management of multi-scale temporal processing system with culinary context embeddings.

FIG. 22 is a method diagram illustrating restaurant-specific embedding processing of multi-scale temporal processing system with culinary context embeddings.

FIG. 23 is a method diagram illustrating culinary knowledge embedding processing of multi-scale temporal processing system with culinary context embeddings.

FIG. 24 is a method diagram illustrating real-time dining state management of multi-scale temporal processing system with culinary context embeddings.

FIG. 25 is a method diagram illustrating embedding-based recommendation generation of multi-scale temporal processing system with culinary context embeddings.

FIG. 26 is a method diagram illustrating pattern recognition and learning of multi-scale temporal processing system with culinary context embeddings.

FIG. 27 is a method diagram illustrating embedding state recovery and validation of multi-scale temporal processing system with culinary context embeddings.

FIG. 28 is a method diagram illustrating service-adaptive embedding refinement of multi-scale temporal processing system with culinary context embeddings.

FIG. 29 is a method diagram illustrating dynamic embedding integration of multi-scale temporal processing system with culinary context embeddings.

DETAILED DESCRIPTION OF THE INVENTION

Figure 2:
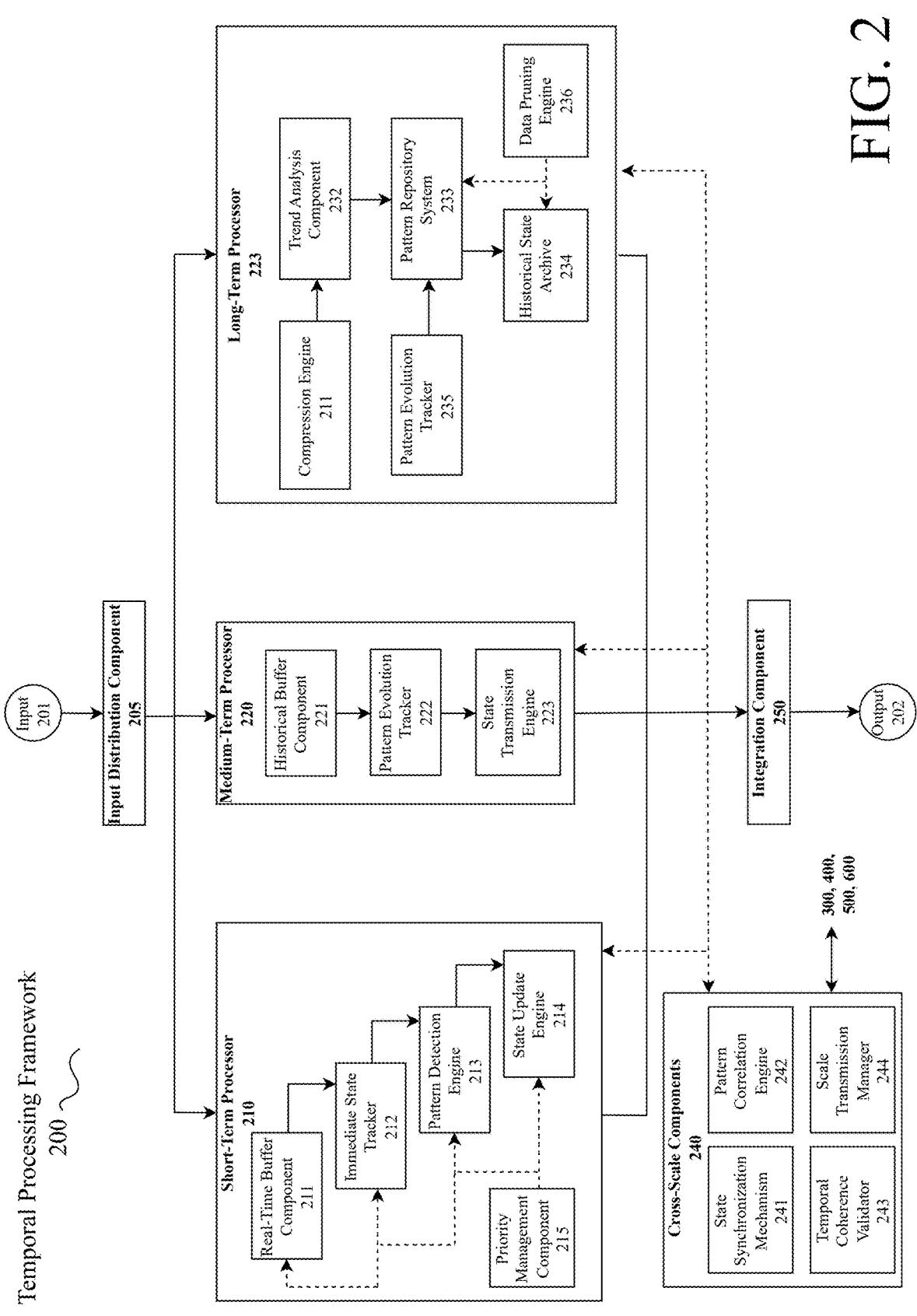
FIG. 2 is a block diagram illustrating exemplary architecture of temporal processing framework.

The inventor has conceived and reduced to practice a multi-scale temporal processing system with culinary context integration, designed to analyze and integrate dining data across multiple time scales. The system comprises a temporal processing engine, a dining context integration engine, and a fusion engine, which work together to process immediate, short-term, and long-term dining data while maintaining temporal coherence.

In an embodiment, a temporal processing engine includes multiple processors, each configured to analyze dining input data at a specific time scale. A short-term processor evaluates immediate dining session data, identifying real-time behaviors and preferences. A long-term processor analyzes historical dining patterns, capturing evolving preferences and trends. These processors operate simultaneously to ensure dining recommendations reflect both immediate dining contexts and historical patterns. A dining context integration engine extracts dining-specific contextual features and generates structured representations of individual and group dining preferences. A culinary knowledge engine processes ingredient embeddings and dish embeddings using a transformer-based architecture, incorporating hierarchical culinary data to enhance dining recommendations. The dining context integration engine also integrates environmental factors, such as restaurant characteristics and external influences, to enrich the recommendation process. A fusion engine combines outputs from the temporal processing engine and the dining context integration engine, generating a coherent dining recommendation. This engine dynamically adjusts weighting between temporal and contextual embeddings based on the progression of a dining session. By leveraging parallel transformer networks, the fusion engine ensures that both temporal embeddings and culinary embeddings are processed cohesively, maintaining contextual integrity in the final recommendations.

This system architecture ensures continuous refinement of dining recommendations through real-time updates and historical data integration. The ability to process multiple time scales and dynamically adjust contextual information allows the system to provide highly personalized and contextually relevant dining suggestions, enhancing user experiences and optimizing recommendation accuracy.

In an embodiment, a culinary knowledge engine may incorporate hierarchical ingredient embeddings to structure ingredient relationships across multiple levels. These embeddings may categorize ingredients based on attributes such as flavor profiles, textural properties, allergen content, and dietary suitability, allowing the system to recognize substitutions and similarities across different cuisines. For example, a system may identify that tamarind and vinegar share acidity characteristics, enabling substitution recommendations in regional dishes while preserving intended flavor balance. Additionally, seasonal and regional context integration may refine recommendations by dynamically adjusting ingredient suggestions based on availability and cultural significance, ensuring that dish recommendations remain relevant to a user's geographic and seasonal context.

A dish embedding system may go beyond ingredient lists to incorporate preparation techniques, presentation styles, and regional influences, creating a richer understanding of culinary structures. In an embodiment, a dish embedding may integrate cooking method encodings, such as steaming, grilling, or fermentation, to differentiate how the same set of ingredients may yield distinct culinary results. Cultural significance encoding may further enhance recommendations by identifying dishes associated with specific traditions, holidays, or regional customs, enabling personalized suggestions that align with user backgrounds or preferences. For example, the system may recommend a Lunar New Year dish for a user searching for celebratory meals based on prior dining behavior.

Diner preference tracking may leverage both short-term and long-term data to model evolving taste preferences and dietary habits. A dynamic preference system may analyze past interactions to refine recommendations, capturing not only explicit user selections but also implicit behaviors, such as time-of-day meal preferences or habitual ingredient exclusions. For instance, if a user gradually transitions toward plant-based meals, the system may begin prioritizing vegetarian-friendly options without requiring manual adjustments. This preference modeling may extend to dietary restrictions, price sensitivity, and cultural inclinations, ensuring that recommendations align with evolving user needs.

In an embodiment, a dining context integration engine may process both individual and group dining behaviors, enabling recommendations that adapt to shared preferences, past group interactions, and social occasions. A multi-user preference modeling system may track dining histories across multiple diners, identifying overlapping taste preferences while resolving conflicts through weighted scoring techniques. For example, if one diner prefers seafood while another avoids it, the system may suggest menu options that accommodate both preferences, ensuring an optimal dining experience for the group.

Special occasion awareness may be incorporated by dynamically adjusting recommendations based on contextual triggers, such as calendar events, user-inputted notes, or past celebration patterns. In an embodiment, a recommendation system may recognize that a user frequently books fine dining restaurants for anniversaries and proactively suggest a selection of high-end venues when similar occasions approach. Additionally, contextual factors such as restaurant ambiance, cuisine type, and service style may be weighed to enhance relevance, ensuring that suggestions align with the intended occasion.

The fusion engine may integrate social dining preferences with temporal embeddings, ensuring that recommendations reflect both immediate context and historical group trends. For example, if a recurring group of coworkers dines together weekly, the system may prioritize restaurants that cater to their past selections while introducing novel but relevant options to maintain variety. Dynamic adjustments may also be applied mid-session, such as refining dessert recommendations based on real-time menu selections, ensuring coherence between multi-course meals and group preferences.

In an embodiment, a multilingual recommendation system may facilitate seamless dining experiences by offering translations, cultural adaptations, and language-specific menu interpretations. A polyglot AI may process user inputs across multiple languages, ensuring that dish descriptions, ingredient details, and preparation methods are conveyed accurately. For instance, a user traveling in Japan who queries a dish in English may receive a recommendation enriched with both the native dish name and an explanation of its key flavors and textures, ensuring both linguistic and cultural clarity.

A nutrition-aware AI may enhance recommendations by integrating health-based dietary insights, dynamically adjusting suggestions based on medical restrictions, fitness goals, or general wellness preferences. For example, a nutritionist component may analyze macronutrient distributions within dishes and suggest alternatives that align with a user's dietary needs, such as reducing sodium for hypertensive individuals or prioritizing high-protein meals for athletes. In an embodiment, the system may track past meal choices and detect nutritional imbalances, nudging users toward more balanced selections over time.

A sommelier recommendation engine may extend beyond basic wine pairings to incorporate regional beverage traditions, personal taste calibrations, and adaptive pairings based on dish modifications. For instance, if a user prefers low-tannin wines, the system may adjust its recommendations even when pairing wines with traditionally bold-flavored dishes, ensuring an optimal tasting experience. Additionally, the AI may recognize variations in global wine naming conventions and educate users on equivalents across regions, allowing for cross-cultural adaptability.

In an embodiment, transformer-based architectures may be employed to integrate temporal embeddings, culinary embeddings, and user preference modeling into a cohesive recommendation system. A multi-head attention mechanism may be utilized to process dining data across different time scales, ensuring that immediate session details, recent user interactions, and long-term preferences contribute to real-time recommendation accuracy. For example, a transformer model may assign higher attention weights to recent dining behaviors when making short-term recommendations, while still incorporating long-term taste preferences for strategic meal planning.

Parallel transformer networks may be deployed to refine embeddings dynamically, allowing temporal patterns and culinary knowledge to interact without information loss. In an embodiment, one transformer network may focus on tracking dining session progression, ensuring that course recommendations transition naturally based on real-time user selections, while another transformer may specialize in understanding regional and cultural context, adapting suggestions accordingly. For instance, if a user initially selects a Mediterranean appetizer, the system may shift its focus toward dishes that align with Mediterranean flavors, maintaining contextual coherence throughout the meal.

A latent transformer model may optimize long-term preference predictions by continuously refining weight distributions across contextual factors. In an embodiment, the latent transformer may process user feedback, session duration, and dining satisfaction levels to iteratively improve future recommendations. For example, if a user consistently dismisses certain suggestions, the model may gradually deprioritize those categories, ensuring that the recommendation system evolves based on both explicit and implicit feedback.

In an embodiment, a system may maintain multi-phase conversation state tracking to ensure seamless and adaptive interactions throughout a dining session. A real-time state manager may track user inputs, evolving dining preferences, and contextual modifications over multiple interactions, ensuring that each response remains aligned with prior selections. For example, if a diner expresses a preference for spicy dishes early in the session but later requests a milder recommendation, the system may balance historical preferences with real-time adjustments to refine ongoing suggestions. The conversation state tracker may store active session embeddings that encode real-time feedback, enabling the system to dynamically update its recommendations while preserving coherence across multiple dialogue phases. Additionally, temporal markers may be used to distinguish between immediate user adjustments and long-term preference shifts, allowing the system to optimize recommendations based on whether a change is situational or indicative of evolving taste patterns.

In an embodiment, domain-specific attention mechanisms may be applied to refine dining recommendations by focusing on culinary embeddings and dining-specific temporal contexts. Unlike general attention architectures, which may weigh input features uniformly, a culinary-focused attention model may assign differential weightings to dish composition, ingredient relationships, and preparation techniques. For example, the system may prioritize certain taste profiles when recommending complementary dishes, ensuring that a meal plan aligns with both individual and group dining preferences. Attention layers may also dynamically adjust based on user feedback, reinforcing patterns detected across multiple dining sessions while allowing for real-time adaptability. Additionally, transformer-based attention heads may distinguish between static culinary knowledge, such as fundamental ingredient pairings, and contextual dining behavior, such as a user's preference for specific meal types at different times of day. By integrating hierarchical embeddings with specialized attention layers, the system may enhance its ability to generate highly personalized and contextually relevant dining experiences.

In an embodiment, a system may incorporate dynamic adaptability to account for variations in dining environments, restaurant settings, and diner interactions. A dining context integration engine may track external factors such as restaurant characteristics, real-time availability of menu items, and seasonal changes that impact recommendations. For example, if a restaurant runs out of a key ingredient, the system may identify suitable dish modifications or suggest alternative restaurants with similar offerings. Additionally, the adaptability engine may detect dining session progression, adjusting recommendations as a meal unfolds-such as shifting focus from appetizer selections to main courses and beverages as the session advances. Context adaptability may also extend to personalized environmental factors, such as recognizing when a diner is traveling and modifying recommendations based on regional specialties or locally available ingredients. By dynamically aligning recommendations with evolving contextual inputs, the system may enhance the relevance and responsiveness of dining suggestions.

In an embodiment, the system may integrate multiple data sources, including restaurant management systems, consumer preference databases, and external knowledge repositories, to refine dining recommendations. A restaurant knowledge base may store detailed menu structures, preparation techniques, and pricing information, ensuring that recommendations remain accurate and up to date. Consumer data may be derived from individual preference histories, group dining behaviors, and external signals, such as dietary trends or regional dining customs. For example, if a restaurant updates its menu to include a seasonal dish, the system may automatically factor that dish into recommendations for diners who have previously selected similar cuisines. Additionally, real-time API calls may be used to access external data streams, such as supplier availability, traffic conditions affecting restaurant wait times, or crowd density levels at specific venues. By leveraging a continuous feedback loop between internal knowledge repositories and external real-time inputs, the system may generate adaptive and context-aware recommendations tailored to evolving dining conditions.

In an embodiment, a dining recommendation system may incorporate both real-time and batch processing techniques to balance computational efficiency with responsiveness. Real-time processing may be used for high-priority, session-specific recommendations, such as adjusting dish suggestions based on immediate user feedback during a conversation. For example, if a diner requests a low-carb meal, the system may instantly filter recommendations using a real-time preference adjustment engine while maintaining prior dining history embeddings. Conversely, batch processing may be applied to long-term preference learning, aggregating historical dining trends, user engagement patterns, and seasonal menu updates. Periodic batch updates may refine culinary embeddings by identifying long-term behavioral patterns, such as an increased preference for a particular cuisine over several months. The system may also prioritize computational resources by dynamically allocating processing power to real-time recommendation pipelines during peak usage hours while deferring non-critical preference learning tasks to off-peak times. By combining real-time and batch methodologies, the system may optimize both immediate responsiveness and long-term adaptability.

In an embodiment, a dining recommendation system may include mechanisms to handle ambiguous, incomplete, or conflicting preference data to ensure robust decision-making. A diner profile inference engine may analyze incomplete user histories, extrapolating probable preferences based on behavioral similarities to other users with known dining patterns. For example, if a new user has no recorded dining history, the system may infer potential preferences by analyzing demographic factors, regional cuisine popularity, or initial selections within the app. Additionally, a conflict resolution module may address group dining preference clashes, such as balancing a table with both vegetarian and non-vegetarian diners. In such cases, the system may recommend restaurants with diverse menu offerings, prioritize commonly preferred dishes, or suggest customizable meal options that accommodate varying dietary restrictions. If conflicting input is detected, such as a diner requesting both a dairy-free and cheese-based meal, the system may prompt the user for clarification or prioritize the most restrictive constraint by default. Through structured error detection, conflict resolution, and fallback recommendation strategies, the system may ensure seamless and contextually appropriate dining experiences even under uncertain conditions.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

The term "temporal scale" as used herein refers to a specific time horizon over which context processing occurs, including immediate context comprising events and states within the current processing cycle, short-term context comprising events and states within a recent time window of up to 24 hours, medium-term context comprising events and states within a time window of up to 30 days, and long-term context comprising events and states beyond 30 days.

The term "context type" as used herein refers to a specific category of contextual information, including domain context comprising field-specific information and rules, entity context comprising information about specific actors or objects, interaction context comprising patterns and histories of interactions, and state context comprising system and component states.

The term "temporal coherence" as used herein refers to the consistent relationship between contextual information across different time scales, maintained through state tracking across time scales, pattern recognition and validation, cross-scale dependency management, and temporal consistency verification.

The term "context integration" as used herein refers to the process of combining different types of context while maintaining semantic relationships, preserving temporal dependencies, ensuring state consistency, and supporting pattern evolution.

The term "fusion" as used herein refers to the process of combining multiple sources of information, including temporal fusion across time scales, context fusion across context types, cross-integration of temporal and contextual information, and state and pattern integration.

The term "pattern" as used herein refers to recurring structures or relationships in data, characterized by temporal consistency requirements, context-specific validation criteria, evolution tracking parameters, and significance thresholds.

The term "state" as used herein refers to the configuration of system components at any given time, including component-specific states, cross-component relationships, temporal dependencies, and context dependencies.

The term "processor" as used herein refers to specialized computational units that operate on specific temporal scales, process specific context types, maintain dedicated state information, and implement defined interfaces.

The term "weight" as used herein refers to numerical values that determine relative importance of information, guide fusion operations, control state transitions, and influence pattern recognition.

The term "coherent output" as used herein refers to system responses that maintain temporal consistency across scales, context consistency across types, state consistency across components, and pattern consistency across time.

As used herein, "processing scale" refers to a specific computational window or scope over which data analysis and pattern recognition operations are performed, including but not limited to immediate processing comprising current input data, short-term processing comprising recent historical data up to 24 hours, medium-term processing comprising historical data up to 30 days, and long-term processing comprising historical data beyond 30 days.

As used herein, "coherent output" refers to a system response or result that maintains consistency across temporal scales, context types, and system states while preserving logical relationships and dependencies between different elements of the processed data.

As used herein, "cross-scale integration" refers to the process of combining and reconciling data, patterns, or states from different temporal scales or context types while maintaining temporal coherence and logical consistency across the integrated elements.

As used herein, "attention weight" refers to a numerical value that determines the relative importance or influence of specific data elements, features, or patterns during processing operations, including but not limited to temporal weights, context weights, and fusion weights.

As used herein, "state transition" refers to a change in system configuration, context representation, or processing status that is tracked, validated, and synchronized across system components to maintain operational coherence.

As used herein, "pattern evolution" refers to the process of tracking and analyzing how identified patterns, relationships, or trends change over time across different temporal scales and context types.

As used herein, "context representation" refers to a structured encoding of contextual information that captures relevant features, relationships, and states for a specific context type, including but not limited to domain context, entity context, and interaction context.

Conceptual Architecture

Figure 1:
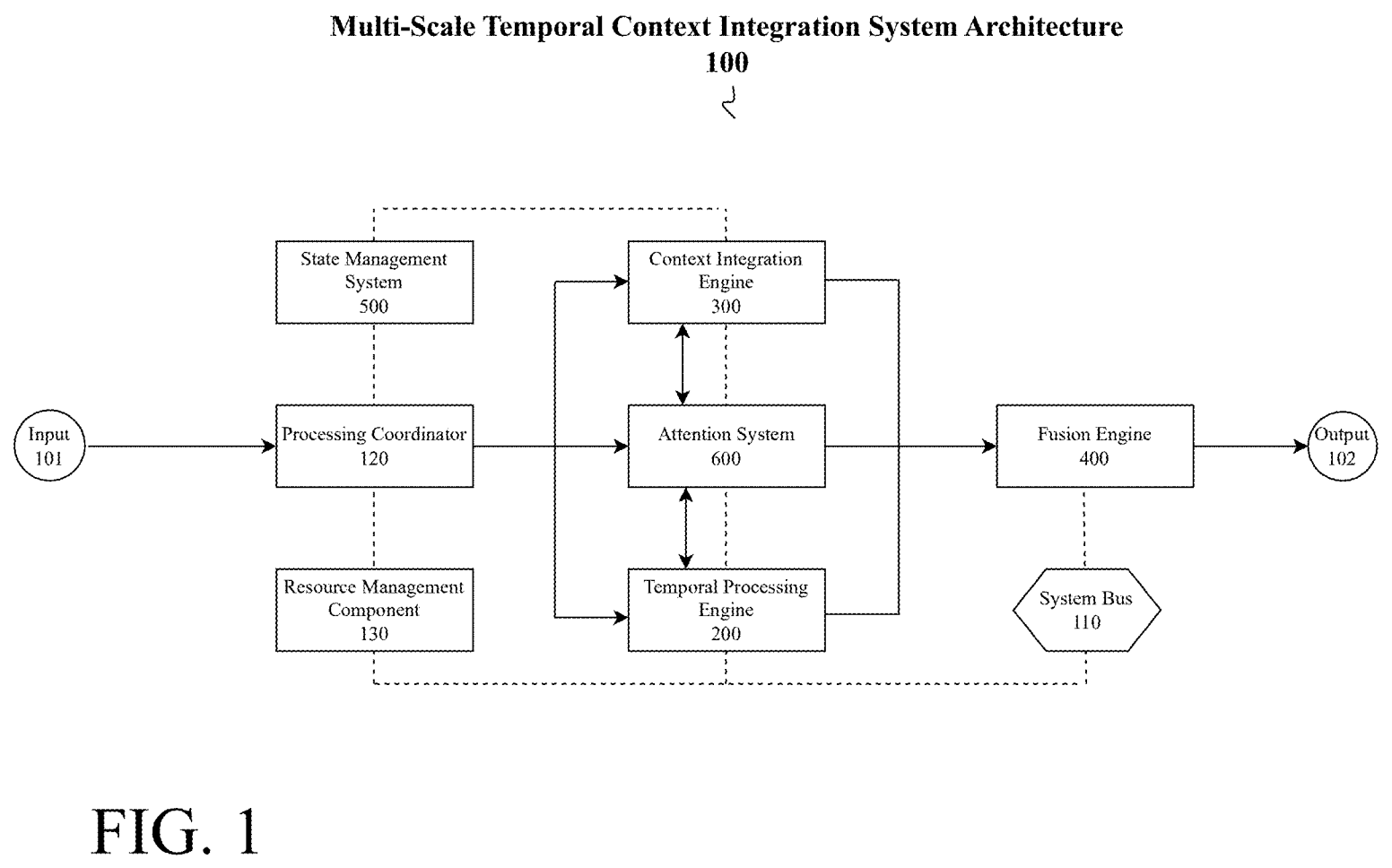

FIG. 1 is a block diagram illustrating exemplary architecture of multi-scale temporal context integration system 100, in an embodiment. System 100 facilitates the processing and integration of temporal and contextual data across multiple time scales while maintaining state coherence and operational efficiency. Input data 101 flows into system 100 and is received by processing coordinator 120. Processing coordinator 120 distributes input data to attention system 600, temporal processing engine 200, and context integration engine 300.

Attention system 600 analyzes the input data to identify priority elements and adjust processing focus accordingly. Temporal processing engine 200 processes the input data across distinct time scales using short-term processor 210, medium-term processor 220, and long-term processor 230. These processors operate concurrently to extract patterns, maintain state transitions, and track temporal coherence across immediate, recent, and extended historical contexts. Context integration engine 300 processes the input data to extract domain-specific, entity-specific, and interaction-specific contextual information. Outputs from these subsystems represent structured data representing relationships, patterns, and context features relevant to the input data.

Fusion engine 400 integrates outputs from temporal processing engine 200 and context integration engine 300 to generate coherent outputs while dynamically assigning weights to various time scales and context types based on relevance. State management system 500 maintains synchronization and consistency of state information across all subsystems, ensuring data integrity and temporal coherence throughout the processing cycle. Resource management component 130 monitors computational load and allocates processing resources efficiently to meet system requirements and operational constraints. System bus 110 facilitates communication between all subsystems and components, ensuring seamless data flow and coordination across system 100.

Output data 102 is produced by fusion engine 400 after validating the integrated results for coherence and consistency. This architecture enables system 100 to handle complex multi-scale temporal and contextual data processing tasks while maintaining adaptive responsiveness and state integrity.

Data flows through the multi-scale temporal context integration system 100 in a coordinated and synchronized manner to ensure efficient processing and integration of temporal and contextual information. Input data 101 enters system 100 and is received by processing coordinator 120, which distributes the input across attention system 600, temporal processing engine 200, and context integration engine 300.

Attention system 600 analyzes the input to determine areas of focus and assigns processing priorities for downstream components. This subsystem generates attention weights that guide the allocation of computational resources and influence how input data is processed across different temporal scales and context types.

Temporal processing engine 200 processes input data across short-term processor 210, medium-term processor 220, and long-term processor 230. Short-term processor 210 analyzes immediate events, tracking state transitions and detecting patterns in real-time. Medium-term processor 220 integrates data over recent timeframes to identify evolving trends and ensure temporal coherence within intermediate horizons. Long-term processor 230 analyzes extended historical data to detect persistent patterns, manage state information, and ensure temporal consistency across broader timeframes. Outputs from these processors include time-specific state updates and patterns reflective of their respective processing scales.

Simultaneously, context integration engine 300 processes domain-specific, entity-specific, and interaction-specific information. Domain context processor within context integration engine 300 extracts features related to predefined rules, industry standards, or field-specific knowledge. Entity context processor maps relationships and tracks the states of relevant entities. Interaction context processor identifies patterns and dependencies in interactions over time, ensuring that temporal and contextual dynamics are captured comprehensively.

Outputs from temporal processing engine 200 and context integration engine 300 are delivered to fusion engine 400. Fusion engine 400 combines temporal outputs and context representations into a unified result, dynamically adjusting weights to prioritize the most relevant temporal scales and context features. The fusion process ensures temporal coherence and contextual alignment by reconciling dependencies and validating the integrated output against state information maintained by state management system 500.

State management system 500 operates continuously to synchronize state information across all subsystems, track state transitions, and resolve inconsistencies. This subsystem ensures that the system maintains operational integrity and coherence throughout the data flow. Resource management component 130 monitors system resource utilization and dynamically adjusts allocations to maintain optimal performance under varying computational loads.

The final output data 102 is generated by fusion engine 400 and represents a coherent and contextually integrated response that incorporates immediate, short-term, medium-term, and long-term temporal insights along with domain, entity, and interaction-specific contextual information. This output is validated for consistency and accuracy before being made available for downstream processes or external systems.

FIG. 2 is a block diagram illustrating exemplary architecture of temporal processing framework 200, in an embodiment. Temporal processing framework 200 facilitates multi-scale temporal analysis by processing input data 201 across short-term processor 210, medium-term processor 220, and long-term processor 230 while ensuring coordination and temporal coherence through cross-scale components 240. Input distribution component 205 routes input data 201 to all three temporal processors simultaneously, enabling parallel processing of immediate, recent, and extended historical data.

In short-term processor 210, real-time buffer component 211 receives and holds immediate data, providing a steady stream of information for immediate analysis. For example, real-time buffer component 211 may implement a circular buffer structure to handle continuous incoming data efficiently, discarding older entries as new data arrives to maintain freshness. Immediate state tracker 212 maintains state information relevant to the current context, which may include tracking transient system states, such as user activity or rapidly changing sensor inputs. Pattern detection engine 213 identifies immediate patterns within the data by applying algorithms such as sliding window correlation or fast Fourier transforms, in an embodiment. These patterns are passed to state update engine 214, which refines state information in real-time by incorporating new data into the existing state representation. Priority management component 215 guides processing priorities within short-term processor 210, for example, by dynamically adjusting computation focus based on predefined criteria, such as criticality of detected patterns or available system resources, ensuring responsiveness to dynamic changes.

Medium-term processor 220 receives recent historical data from historical buffer component 221, which maintains a rolling window of data for intermediate analysis. For instance, historical buffer component 221 may group data into time buckets, enabling efficient aggregation and retrieval of data for pattern analysis. Pattern evolution tracker 222 monitors how patterns develop over recent timeframes, providing insights into emerging trends. In an embodiment, this tracker may apply time-series analysis or trend-line fitting to identify shifts or progressions in observed patterns. State transition engine 223 manages state changes specific to this temporal scale by updating and reconciling intermediate states with both short-term and long-term data, ensuring consistency and alignment across scales. For example, state transition engine 223 may implement rule-based logic or machine learning models to validate and propagate state changes.

Long-term processor 230 analyzes extended historical data with support from compression engine 231, which optimizes older data for efficient storage and analysis. Compression engine 231, in an embodiment, may apply techniques such as wavelet transformations or dimensionality reduction to retain significant features while discarding redundant or less relevant information. Trend analysis component 232 identifies long-term trends by leveraging historical data aggregated over extended periods, which may include recognizing cyclical patterns, seasonal behaviors, or gradual shifts in underlying data distributions. Pattern repository system 233 stores recognized patterns for future reference, enabling persistent insights that can be revisited or refined as new data emerges. Historical state archive 234 maintains persistent state information over extended time horizons, supporting consistency in long-term analysis by ensuring that critical states remain accessible even as data ages. Pattern evolution tracker 235 monitors changes in long-term patterns by comparing historical trends with recent observations to detect anomalies or significant deviations. Data pruning engine 236 removes irrelevant historical data by applying configurable rules or thresholds, ensuring efficient use of resources while preserving essential information.

Cross-scale components 240 coordinate operations across the three temporal processors to ensure alignment and coherence. State synchronization mechanism 241 ensures state consistency by aligning state information across different time scales, which may include resolving conflicts between short-term, medium-term, and long-term states. For example, it may implement consensus algorithms to validate updates across scales. Pattern correlation engine 242 identifies relationships between patterns detected at various temporal scales by performing cross-correlation analysis or hierarchical clustering, in an embodiment. Temporal coherence validator 243 maintains consistency across time scales by ensuring that outputs from the processors reflect a unified temporal narrative. For instance, it may reconcile overlapping or conflicting temporal insights into a coherent representation. Scale transition manager 244 oversees transitions between time scales by dynamically adjusting data granularity or processing windows, facilitating seamless integration of data processed at different temporal granularities.

Integration component 250 combines outputs from short-term processor 210, medium-term processor 220, and long-term processor 230 into a unified result. This combination may include assigning dynamic weights to the outputs based on their relative relevance or significance for a given task. For example, the integration component may prioritize short-term insights for immediate responsiveness while incorporating long-term trends for strategic consistency. Output 202 reflects coherent and comprehensive temporal insights derived from processing data across multiple time scales. This framework ensures adaptive and robust temporal analysis, enabling effective integration of immediate, intermediate, and historical contexts to support a wide range of applications.

In an embodiment, temporal processing framework 200 may include machine learning models to enhance pattern recognition, state tracking, and trend analysis across various time scales. For example, short-term processor 210 may employ recurrent neural networks (RNNs) or gated recurrent units (GRUs) to analyze sequential data in real-time and capture transient patterns within immediate contexts. These models may, for example, be trained on high-frequency event streams such as user interaction logs or sensor data. Training may use supervised learning techniques with labeled sequences that identify specific patterns or state transitions relevant to immediate temporal horizons.

Medium-term processor 220 may incorporate convolutional neural networks (CNNs) or temporal convolutional networks (TCNs) to analyze aggregated data within a rolling window. These models may detect evolving trends or intermediate patterns by processing time-series data spanning hours or days. For example, training datasets may include operational logs or recent interaction histories annotated with mid-term state transitions or anomaly indicators. Model optimization may involve methods such as backpropagation and stochastic gradient descent (SGD), ensuring effective detection of meaningful features within the medium-term timeframe.

Long-term processor 230 may include unsupervised learning models, such as autoencoders or clustering algorithms, to extract and analyze long-term patterns. For example, autoencoders may compress extended historical data while preserving critical features, enabling efficient storage and analysis. Clustering algorithms, such as k-means or hierarchical clustering, may identify groups of related patterns or trends across extended time horizons. Training data for these models may include multi-month or multi-year historical records, such as customer behavior trends or seasonal variations, allowing the system to adapt to persistent or recurring phenomena without requiring explicit labels.

The training of machine learning models within temporal processing framework 200 may utilize a combination of local and distributed environments. For example, short-term and medium-term models may be fine-tuned locally for responsiveness, while long-term models may leverage distributed cloud-based systems for large-scale training on comprehensive datasets. Adaptive learning techniques may be employed, enabling the models to update their parameters dynamically as new data is processed, ensuring alignment with evolving temporal patterns.

By incorporating machine learning models, temporal processing framework 200 may dynamically adapt to complex temporal dynamics, enabling robust pattern detection, state management, and trend analysis across short-term, medium-term, and long-term timescales.

Data flow through temporal processing framework 200 begins when input data 201 enters input distribution component 205, which routes the data simultaneously to short-term processor 210, medium-term processor 220, and long-term processor 230 for parallel processing. In short-term processor 210, real-time buffer component 211 receives and temporarily holds immediate data, ensuring a steady flow for analysis. Immediate state tracker 212 maintains the current state, while pattern detection engine 213 identifies patterns emerging in real-time. These patterns are used by state update engine 214 to refine state information dynamically. Priority management component 215 guides processing focus within the short-term processor, ensuring high-priority data receives timely attention.

In medium-term processor 220, historical buffer component 221 manages a rolling window of recent data, making it available for intermediate-scale analysis. Pattern evolution tracker 222 monitors changes and developments in patterns over this timeframe, while state transition engine 223 updates state information to reflect shifts in the medium-term context. These components work in coordination to identify and track trends as they emerge and stabilize.

Long-term processor 230 processes extended historical data with the help of compression engine 231, which optimizes data storage by reducing redundancy. Trend analysis component 232 identifies persistent or recurring trends, while pattern repository system 233 stores these trends for long-term reference. Historical state archive 234 maintains durable state information over extended timeframes, enabling consistent integration of long-term insights. Pattern evolution tracker 235 monitors how these patterns change over time, and data pruning engine 236 removes data deemed irrelevant to preserve storage and computational resources.

Cross-scale components 240 operate throughout the framework to coordinate data processing and ensure alignment between the three temporal processors. State synchronization mechanism 241 aligns state information across temporal scales, while pattern correlation engine 242 identifies relationships between patterns detected at different scales. Temporal coherence validator 243 ensures that outputs from the processors remain consistent across time horizons, and scale transition manager 244 facilitates smooth transitions between scales, ensuring seamless integration of data.

Finally, integration component 250 receives outputs from all three temporal processors and combines them into a unified representation. This output, labeled 202, reflects the coherent and comprehensive temporal analysis performed across short-term, medium-term, and long-term timescales, maintaining consistency and relevance for downstream applications.

Figure 3:
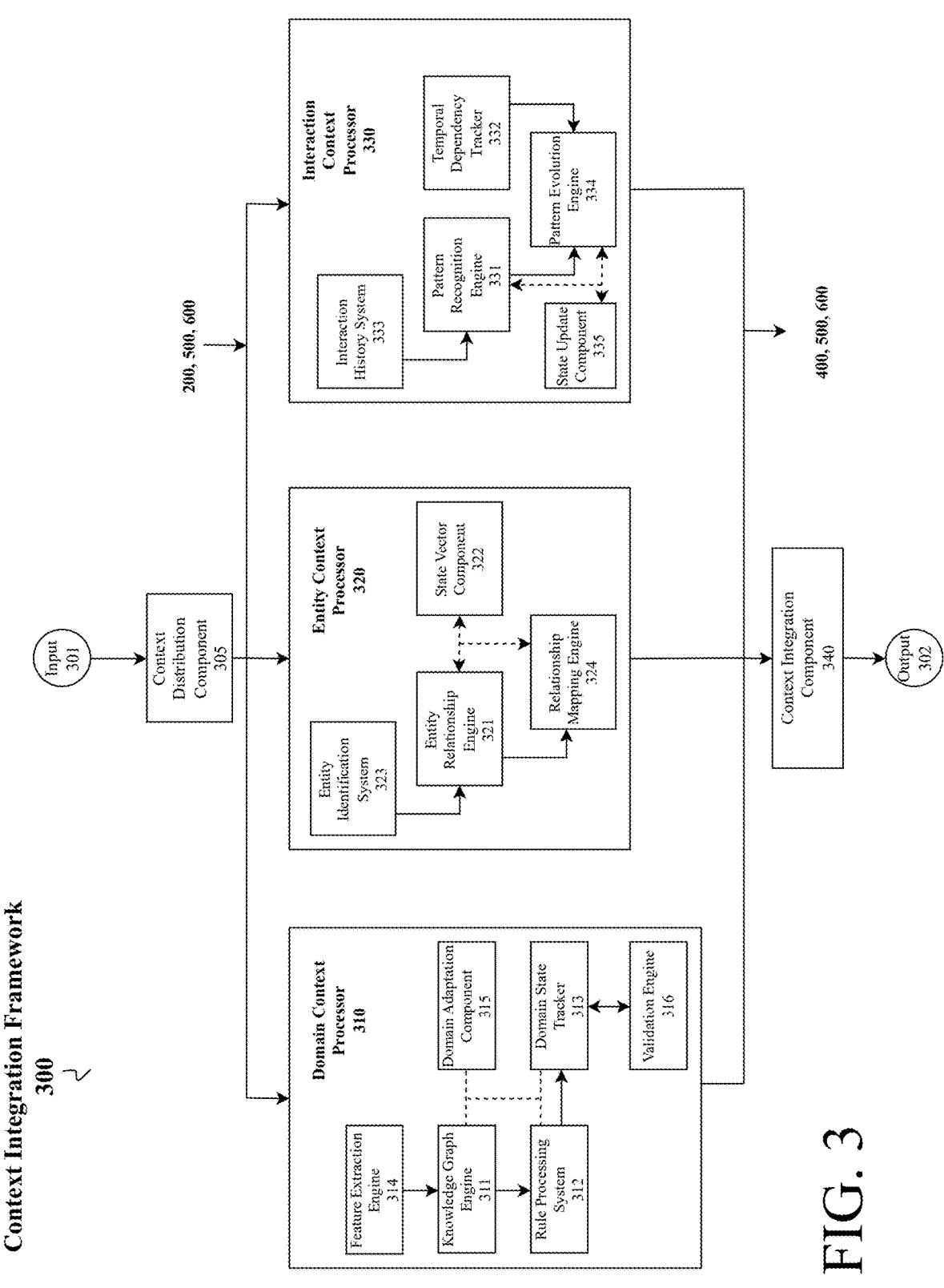
FIG. 3 is a block diagram illustrating exemplary architecture of context integration framework.

FIG. 3 is a block diagram illustrating exemplary architecture of context integration framework 300, in an embodiment. Context integration framework 300 processes input data 301 and produces unified context output 302 by leveraging multiple context-specific subsystems operating in parallel. Input data 301 enters through context distribution subsystem 305, which routes the data to three parallel context processors: domain context processor 310, entity context processor 320, and interaction context processor 330.

Context distribution subsystem 305 facilitates the initial routing of input data 301 within context integration framework 300 by directing relevant portions of the data to the appropriate processors for domain, entity, and interaction contexts. This subsystem may, in an embodiment, include pre-processing mechanisms to filter, classify, or tag input data based on predefined criteria or dynamic analysis. For example, textual data may be parsed and annotated to identify entities, domain-specific keywords, or interaction markers before distribution. Context distribution subsystem 305 may implement feature extraction or categorization techniques, such as tokenization, semantic analysis, or data type identification, to allocate data efficiently to domain context processor 310, entity context processor 320, and interaction context processor 330. Additionally, the subsystem may include load-balancing mechanisms to manage computational resources, ensuring that no single processor is overwhelmed during high-volume operations. In some embodiments, context distribution subsystem 305 dynamically adapts its routing strategy based on feedback from downstream processors, such as prioritizing real-time interaction data during periods of heightened user activity or routing additional resources to domain processing during updates to domain-specific rules. This subsystem operates as a central hub for data intake and ensures that input data is optimally divided and routed for efficient and coherent processing across the context integration framework.

Domain context processor 310 receives input data from context distribution subsystem 305 and processes domain-specific information. Knowledge graph engine 311, for example, may map domain features such as keywords, ontologies, or hierarchies into structured domain knowledge by utilizing predefined schemas or dynamically learned relationships. Rule processing system 312 may include, in an embodiment, mechanisms for applying industry standards, regulatory guidelines, or business rules to refine domain understanding. For instance, the rule processing system could validate compliance with financial reporting standards or enforce constraints within an industrial setting. Domain state tracker 313 maintains current state information related to domain-specific entities and relationships, which may involve tracking changes over time to reflect updates in real-world scenarios, such as inventory levels or customer preferences. Feature extraction engine 314 extracts domain-relevant features from input data, such as identifying critical attributes in medical records or transaction logs, and may implement techniques like natural language processing or statistical analysis. Domain adaptation component 315 dynamically adjusts processing parameters based on changes in domain context, such as shifts in user preferences or market trends, by leveraging feedback loops or real-time analytics. Validation engine 316 ensures consistency and accuracy of the domain-specific output by applying verification techniques, which may include cross-referencing domain outputs with known benchmarks or validation datasets before passing the processed data to context integration subsystem 340.

Entity context processor 320 identifies and processes entity-specific information. Entity identification system 323 extracts relevant entities from input data, which may include names, identifiers, or object tags, and could employ techniques such as named entity recognition or pattern matching. Entity relationship engine 321 determines relationships between identified entities by analyzing attributes, interactions, or structural dependencies, which may involve constructing entity graphs or calculating proximity measures within datasets. State vector component 322 tracks state information for each entity, maintaining representations of properties such as status, operational metrics, or dynamic attributes over time. For example, a customer entity's state might include their purchase history, preferences, and interaction frequency, while a physical asset entity might track usage data and maintenance schedules. Relationship mapping engine 324 generates structured representations of entity interactions and dependencies, which may involve encoding connections in matrices, graphs, or other structured formats. Outputs of entity context processor 320 are provided to context integration subsystem 340 for further processing, enabling downstream systems to leverage comprehensive and structured entity insights.

Interaction context processor 330 handles temporal and pattern-based interaction data. Interaction history system 333 maintains records of previous interactions, which may include time-stamped logs, annotated records, or summaries of communication exchanges. This subsystem can store data in optimized structures such as rolling windows, time-series databases, or interaction graphs to facilitate efficient retrieval and analysis. Pattern recognition engine 331 identifies recurring interaction patterns, which may involve detecting repetitive behaviors, correlations, or sequences, such as recurring customer inquiries or seasonal purchasing trends, using machine learning models or rule-based approaches. Temporal dependency tracker 332 analyzes time-based dependencies in interaction data, such as identifying causality or lag relationships between events, and may employ time-series analysis techniques or causal inference models. Pattern evolution engine 334 monitors changes or trends in interaction patterns over time, identifying shifts that may indicate emerging behaviors or anomalies, such as evolving customer preferences or deviations in operational workflows. State update component 335 manages state information associated with interaction contexts, ensuring temporal coherence by reconciling updates from recent interactions with historical data and maintaining consistent states across multiple contexts. Outputs of interaction context processor 330 are directed to context integration subsystem 340, providing enriched interaction data for downstream processing.

Context integration subsystem 340 receives outputs from domain context processor 310, entity context processor 320, and interaction context processor 330. Integration subsystem 340 combines these outputs into a unified context representation by reconciling relationships, resolving inconsistencies, and ensuring alignment across different context types. For example, it may assign higher weights to short-term interaction data when immediate responsiveness is required, while giving more significance to long-term trends in strategic decision-making. The integration process may include advanced fusion techniques, such as multi-head attention mechanisms, hierarchical merging, or statistical weighting, to prioritize relevant inputs. Internal mechanisms may dynamically adjust weights assigned to each context type based on real-time feedback, identified patterns, or system-level priorities. Context integration subsystem 340 produces unified context output 302, which is delivered to downstream components such as fusion engine 400 for combining with temporal data or state management system 500 for maintaining system-wide coherence and enabling adaptive responses.

Machine learning models may be utilized within context integration framework 300 to enhance the functionality and adaptability of its subsystems. In an embodiment, domain context processor 310 may employ models such as neural networks, decision trees, or support vector machines to classify domain-specific data and extract relevant features. For example, a neural network may be trained to map textual input to specific domain categories, such as legal, medical, or financial domains, based on labeled datasets containing annotated examples of domain-related content. Similarly, rule processing system 312 may utilize reinforcement learning to adaptively refine rule application based on feedback from validation engine 316, optimizing its decisions over time as new data becomes available.

Entity context processor 320 may leverage machine learning models to identify entities, detect relationships, and maintain state information. For example, named entity recognition models based on transformer architectures, such as BERT or GPT, may be trained on datasets comprising labeled text to identify and classify entities like names, organizations, or product identifiers. Relationship mapping engine 324 may utilize graph neural networks to infer and represent connections between entities, enabling it to identify complex dependencies in large datasets. These models may be trained using relational data, such as knowledge graphs, transactional logs, or annotated interaction records, ensuring robust handling of entity-specific information.

Interaction context processor 330 may incorporate sequence models, such as recurrent neural networks (RNNs) or temporal convolutional networks (TCNs), to analyze interaction history and identify patterns over time. For example, a TCN may be trained on time-stamped interaction logs to detect recurring patterns, such as customer inquiries that follow seasonal trends. Temporal dependency tracker 332 may use models like hidden Markov models or attention-based mechanisms to capture causal or sequential relationships between events. Training data for these models may include historical interaction datasets enriched with metadata, such as timestamps, user IDs, or interaction types, allowing the models to learn the dynamics of time-dependent processes.

The training of these machine learning models may be performed using supervised, unsupervised, or semi-supervised learning techniques, depending on the availability of labeled data. For example, supervised learning may be used for classification tasks, such as mapping input data to predefined categories or labels, while unsupervised learning may be applied to discover hidden patterns in large, unlabeled datasets, such as clustering entities based on shared characteristics. Semi-supervised learning may be utilized when only a subset of data is labeled, enabling the models to leverage both labeled and unlabeled examples to improve accuracy. The training process may involve standard techniques, such as gradient descent for optimizing model parameters, and may utilize frameworks like TensorFlow, PyTorch, or scikit-learn.

In addition to offline training, certain machine learning models within context integration framework 300 may be updated through online or incremental learning. For example, pattern recognition engine 331 may continuously adapt its models based on real-time data streams, refining its ability to identify evolving interaction patterns. Training datasets for this purpose may be augmented over time with newly acquired data, ensuring the models remain relevant and effective in dynamic environments. Feedback loops from validation components, such as validation engine 316 or state update component 335, may also provide iterative refinements, enabling adaptive learning within the system.

These machine learning capabilities enhance the overall flexibility, accuracy, and scalability of context integration framework 300, enabling it to process diverse and dynamic data inputs while maintaining coherence and relevance across its subsystems.

Data flow through context integration framework 300 begins when input data 301 is received by context distribution subsystem 305, which processes and routes the data to domain context processor 310, entity context processor 320, and interaction context processor 330 for parallel processing. Within domain context processor 310, knowledge graph engine 311 maps domain-relevant features from the input data to structured domain knowledge, while rule processing system 312 applies applicable rules or standards to refine the domain-specific insights. Extracted domain features and state information are maintained by feature extraction engine 314 and domain state tracker 313, respectively, ensuring that changes in domain context are dynamically incorporated by domain adaptation component 315. Entity context processor 320 processes the input data by identifying entities with entity identification system 323, determining relationships through entity relationship engine 321, and maintaining states with state vector component 322. Interaction context processor 330 concurrently analyzes interaction-specific data, with interaction history system 333 managing past records, pattern recognition engine 331 identifying recurring patterns, and temporal dependency tracker 332 capturing sequential dependencies within interactions. Outputs from these processors are directed to context integration subsystem 340, which combines the processed data into a unified context representation by reconciling inconsistencies, resolving cross-context relationships, and assigning appropriate weights to the contributions of each processor. The resulting unified context output 302 is then forwarded to downstream components, such as fusion engine 400, where it is integrated with temporal data for further processing, or to state management system 500, where it contributes to maintaining system coherence and facilitating adaptive responses. This coordinated flow ensures that context integration framework 300 processes data effectively across multiple dimensions while maintaining alignment and coherence among its components.

Figure 4:
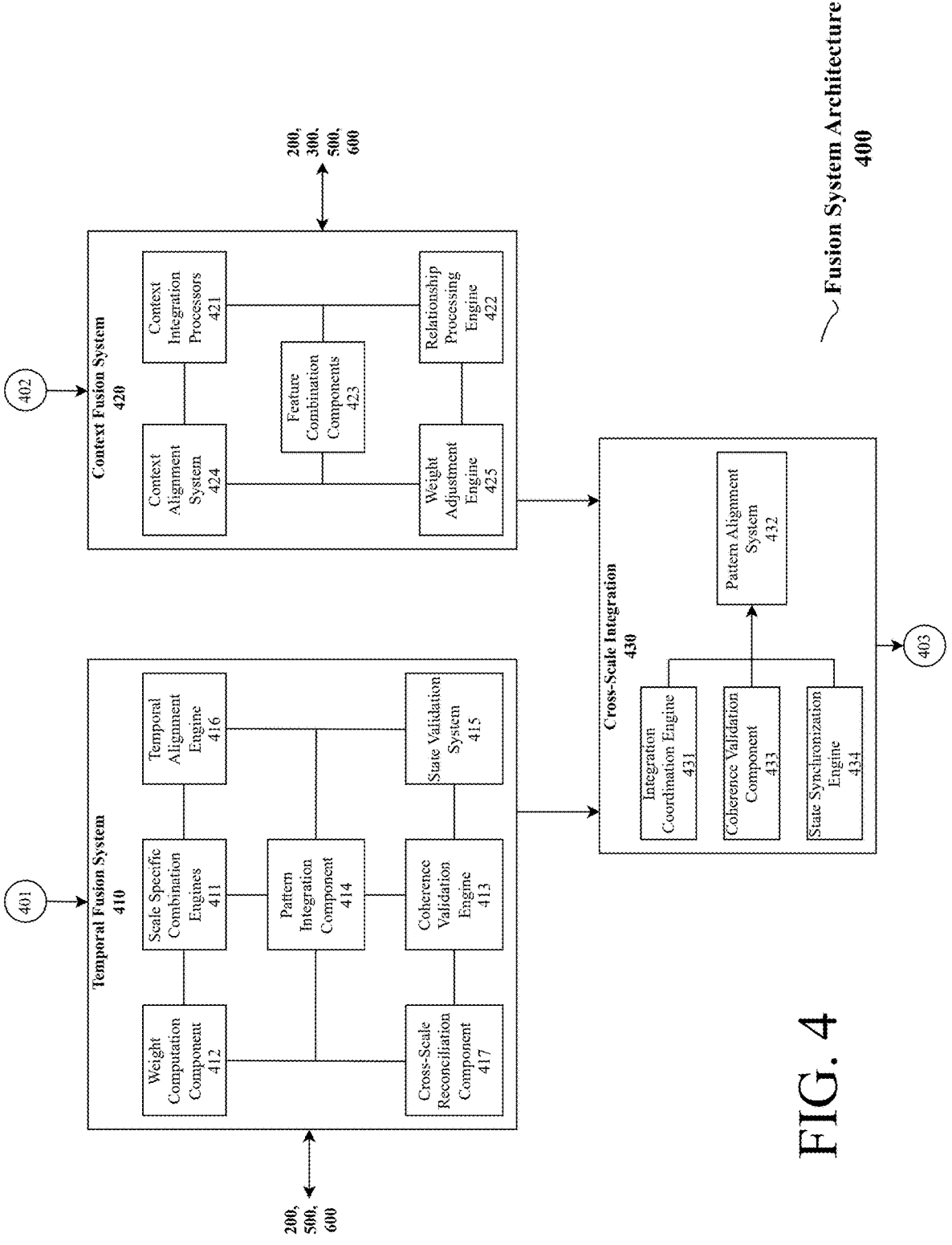
FIG. 4 is a block diagram illustrating exemplary architecture of fusion system.

FIG. 4 is a block diagram illustrating exemplary architecture of fusion system 400, in an embodiment. Fusion system 400 integrates temporal input 401 from temporal processing engine 200 and context input 402 from context integration engine 300 to generate coherent outputs that maintain temporal coherence and contextual consistency. Fusion system 400 operates with three primary subsystems: temporal fusion system 410, context fusion system 420, and cross-scale integration subsystem 430, which interact to process and reconcile data from the contributing systems.

Temporal input 401 is processed by temporal fusion system 410, which manages alignment and reconciliation of data across multiple time scales. Temporal alignment engine 416, for example, ensures synchronization by coordinating outputs from short-term processor 210, medium-term processor 220, and long-term processor 230. This may include aligning timestamps, reconciling overlapping data windows, and ensuring that state transitions occurring across time scales are accurately represented. In an embodiment, temporal alignment engine 416 may implement adaptive alignment techniques that dynamically adjust based on detected temporal patterns or inconsistencies in input data streams. Scale-specific combination engines 411 integrate outputs from different temporal scales by assigning relative importance to each time scale, guided by weights dynamically calculated by weight computation component 412. For instance, during periods of rapid pattern evolution, higher weights may be assigned to outputs from short-term processor 210, while stable trends may result in greater reliance on long-term processor 230 outputs. Weight computation component 412 may employ machine learning algorithms or rule-based systems to identify pattern relevance and assign weights accordingly. Pattern integration component 414 identifies recurring or significant patterns across temporal scales, which may include, in an embodiment, recognizing cyclical trends, detecting abrupt changes, or correlating events spanning different time horizons. Coherence validation engine 413 verifies temporal coherence by analyzing dependencies and ensuring that the integrated temporal output reflects a unified temporal narrative. This process may involve comparing predicted patterns with observed data, reconciling anomalies, or employing consistency-checking algorithms to validate inter-scale transitions. Cross-scale reconciliation component 417 resolves discrepancies between outputs from different time scales, which may include reconciling conflicting state transitions or smoothing out abrupt shifts in data continuity. For example, discrepancies in pattern recognition between medium-term processor 220 and long-term processor 230 may be addressed through iterative validation or weighted averaging. State validation system 415 confirms that integrated temporal outputs are consistent with state information maintained by state management system 500, ensuring system-wide alignment of temporal states. This validation may include checking for persistent state transitions, verifying historical accuracy, or implementing rollback mechanisms to address inconsistencies.

Context input 402 is processed by context fusion system 420, which aligns and combines data from domain context processor 310, entity context processor 320, and interaction context processor 330. Context integration processors 421 reconcile representations from these processors by identifying common features, aligning context-specific patterns, and integrating shared relationships across contexts. For instance, data from entity context processor 320 may include relationships between specific entities, such as customers or assets, while domain context processor 310 may provide regulatory or rule-based constraints that influence these relationships. In an embodiment, context integration processors 421 may prioritize context elements dynamically based on their relevance to the overall integration. Relationship processing engine 422 identifies and resolves dependencies between contexts, which may include reconciling conflicting entity relationships, mapping overlapping domain constraints, or identifying emergent interaction patterns. This process may involve generating graph-based representations of inter-contextual relationships or applying statistical models to assess dependency strength. Feature combination component 423 merges features from different contexts by harmonizing their representations, which may include transforming domain-specific features into embeddings that are compatible with entity and interaction contexts. Context alignment system 424 ensures consistency across varied representations by dynamically addressing discrepancies, such as differences in granularity or format, and adjusting alignment parameters to preserve semantic coherence. In an embodiment, context alignment system 424 may incorporate attention mechanisms to focus on the most relevant contextual features for integration. Weight adjustment engine 425 calculates and updates weights assigned to different contexts based on identified patterns in context input 402. For example, significant recent interaction patterns may be prioritized over static domain rules when generating real-time outputs. Context fusion system 420 integrates these components to produce a unified contextual representation that aligns with temporal patterns and dependencies, ensuring the resulting output reflects coherent relationships across contexts.

Cross-scale integration subsystem 430 integrates the processed outputs from temporal fusion system 410 and context fusion system 420. Integration coordination engine 431 manages alignment and merging of temporal and contextual data by orchestrating communication between subsystems and determining how outputs are combined. For example, integration coordination engine 431 may use dependency graphs to map temporal patterns to contextual relationships, ensuring compatibility and coherence. Pattern alignment system 432 aligns temporal patterns and contextual relationships by reconciling differences in scale, resolution, or granularity. This may include identifying shared patterns, such as recurring interaction cycles that align with temporal trends, and ensuring consistency between the integrated dimensions. Coherence validation component 433 evaluates consistency across temporal and contextual dimensions by verifying that integrated data maintains logical dependencies and reflects observed patterns accurately. In an embodiment, coherence validation component 433 may apply multi-dimensional consistency checks to ensure that outputs align with both temporal states and contextual features. State synchronization engine 434 maintains alignment of state information across the integrated temporal and contextual systems, ensuring that state transitions and updates are propagated correctly. This process may involve leveraging inputs from state management system 500 to synchronize local states across subsystems, validate state changes, and resolve any inconsistencies that arise during integration.

Fusion system 400 interacts dynamically with other systems in the architecture to facilitate seamless integration of temporal and contextual data. Temporal processing engine 200 provides temporal input 401 to temporal fusion system 410, enabling the alignment, combination, and validation of data across multiple time scales. This interaction ensures that outputs from short-term processor 210, medium-term processor 220, and long-term processor 230 are incorporated into a unified temporal representation. Context integration engine 300 provides context input 402 to context fusion system 420, allowing the reconciliation and merging of data from domain context processor 310, entity context processor 320, and interaction context processor 330. Fusion system 400 communicates with state management system 500 through state validation system 415 and state synchronization engine 434 to ensure that integrated outputs reflect consistent state information and align with system-wide states. Additionally, weight computation and adjustment mechanisms within fusion system 400 interact with attention system 600 to dynamically adjust processing priorities and optimize the integration of temporal and contextual inputs. Outputs generated by fusion system 400 serve as inputs for downstream systems, supporting coherent, adaptive decision-making and enabling real-time responses based on integrated insights from temporal and contextual dimensions. This interconnected operation ensures that fusion system 400 acts as a central hub for synthesizing data, maintaining consistency, and supporting overall system coherence.

In an embodiment, fusion system 400 may utilize machine learning models to enhance the integration and reconciliation of temporal and contextual data. For example, temporal fusion system 410 may incorporate recurrent neural networks (RNNs) or long short-term memory networks (LSTMs) to process sequential data from temporal input 401, identifying patterns and dependencies across short-term, medium-term, and long-term processors. These models may be trained on datasets comprising sequential data such as user interaction logs, sensor data streams, or time-series records, allowing them to capture temporal relationships and adapt dynamically to changing patterns. In an embodiment, scale-specific combination engines 411 may employ reinforcement learning to optimize weight assignments for outputs from different time scales, where the reward function is designed to maximize the coherence and relevance of the integrated temporal output.

Context fusion system 420 may utilize transformer-based models or attention mechanisms, for example, to process context input 402. These models may, for example, include multi-head attention layers to prioritize significant features across domain, entity, and interaction contexts. Training for such models may involve datasets containing structured and unstructured context-specific data, such as knowledge graphs, relational databases, annotated interaction logs, or domain-specific text corpora. In an embodiment, relationship processing engine 422 may employ graph neural networks (GNNs) to model dependencies between contexts, training on data that represents relationships between entities, such as social networks, customer-product interaction graphs, or event dependency maps.

For integration tasks within cross-scale integration subsystem 430, fusion system 400 may employ unsupervised learning models, such as autoencoders or clustering algorithms, to reconcile patterns and align relationships between temporal and contextual data. These models may be trained, for example, on data that reflects cross-dimensional correlations, such as synchronized temporal and contextual event logs or co-occurrence matrices derived from historical interactions. In an embodiment, coherence validation component 433 may use supervised learning models, trained on labeled datasets containing examples of coherent and non-coherent integrations, to evaluate the consistency of the combined outputs.

Training of machine learning models within fusion system 400 may be performed using a combination of supervised, unsupervised, or semi-supervised approaches, depending on the availability and nature of labeled data. For example, supervised learning may be applied to pattern detection models using labeled time-series data with annotated patterns, while unsupervised learning may be used for clustering models to group similar context features without predefined labels. Semi-supervised learning may, for instance, be employed for models that require generalization across both labeled and unlabeled data, such as combining domain-specific rules with interaction patterns in partially annotated datasets. Training datasets may be sourced from historical logs, domain-specific repositories, or generated synthetically to simulate complex temporal and contextual scenarios.

In an embodiment, fusion system 400 may incorporate transfer learning to accelerate the training process by leveraging pre-trained models. For instance, transformer models pre-trained on large text corpora may be fine-tuned for specific domain contexts using smaller, domain-specific datasets. Additionally, active learning techniques may be used to iteratively refine models, where the system selects the most informative data samples for labeling and retraining, improving model accuracy and efficiency in data-scarce environments. Models used in fusion system 400 may also include mechanisms for online learning, allowing them to adapt to new data streams and evolving patterns in real time, ensuring that the system remains responsive and effective in dynamic operational environments.

Data flows through fusion system 400 as it integrates temporal input 401 from temporal processing engine 200 and context input 402 from context integration engine 300 to produce a coherent, unified output that informs downstream processes and decision-making systems. Temporal input 401 enters temporal fusion system 410, where temporal alignment engine 416 synchronizes data from short-term processor 210, medium-term processor 220, and long-term processor 230. Outputs from these processors are integrated by scale-specific combination engines 411, guided by dynamically calculated weights from weight computation component 412. Temporal patterns detected by pattern integration component 414 are reconciled across time scales, and coherence validation engine 413 ensures temporal dependencies and transitions are preserved. The resulting temporal output reflects a unified temporal narrative, which may include aligned short-term trends, evolving medium-term patterns, and persistent long-term states.

Simultaneously, context input 402 enters context fusion system 420, where context integration processors 421 align data from domain context processor 310, entity context processor 320, and interaction context processor 330. Relationship processing engine 422 reconciles inter-contextual dependencies, and feature combination component 423 merges relevant features, guided by adjustments from context alignment system 424. Contextual weights are calculated and updated by weight adjustment engine 425, prioritizing significant relationships and features identified within the input data. The contextual output reflects a cohesive representation of domain rules, entity relationships, and interaction patterns, structured to align with temporal dynamics.

Both processed outputs are received by cross-scale integration subsystem 430, where integration coordination engine 431 aligns and merges temporal and contextual data. Pattern alignment system 432 ensures compatibility between temporal patterns and contextual relationships, while coherence validation component 433 verifies consistency and logical dependencies across integrated dimensions. State synchronization engine 434 ensures that state information is maintained and updated across the system, using inputs from state management system 500 to align outputs with system-wide state requirements.

The output of fusion system 400 represents a unified, contextually enriched temporal representation that supports downstream systems by providing actionable insights. For example, in an interactive AI system, the output may drive real-time decision-making, adapt recommendations to current user behavior, or provide predictions informed by historical patterns and domain-specific rules. This output may include temporal trends aligned with immediate user interactions, context-specific adjustments for domain constraints or preferences, and predictive insights that reflect long-term consistency. The system's dynamic integration ensures that the output remains coherent and responsive, enabling robust and adaptive performance across a wide range of applications.

Figure 5:
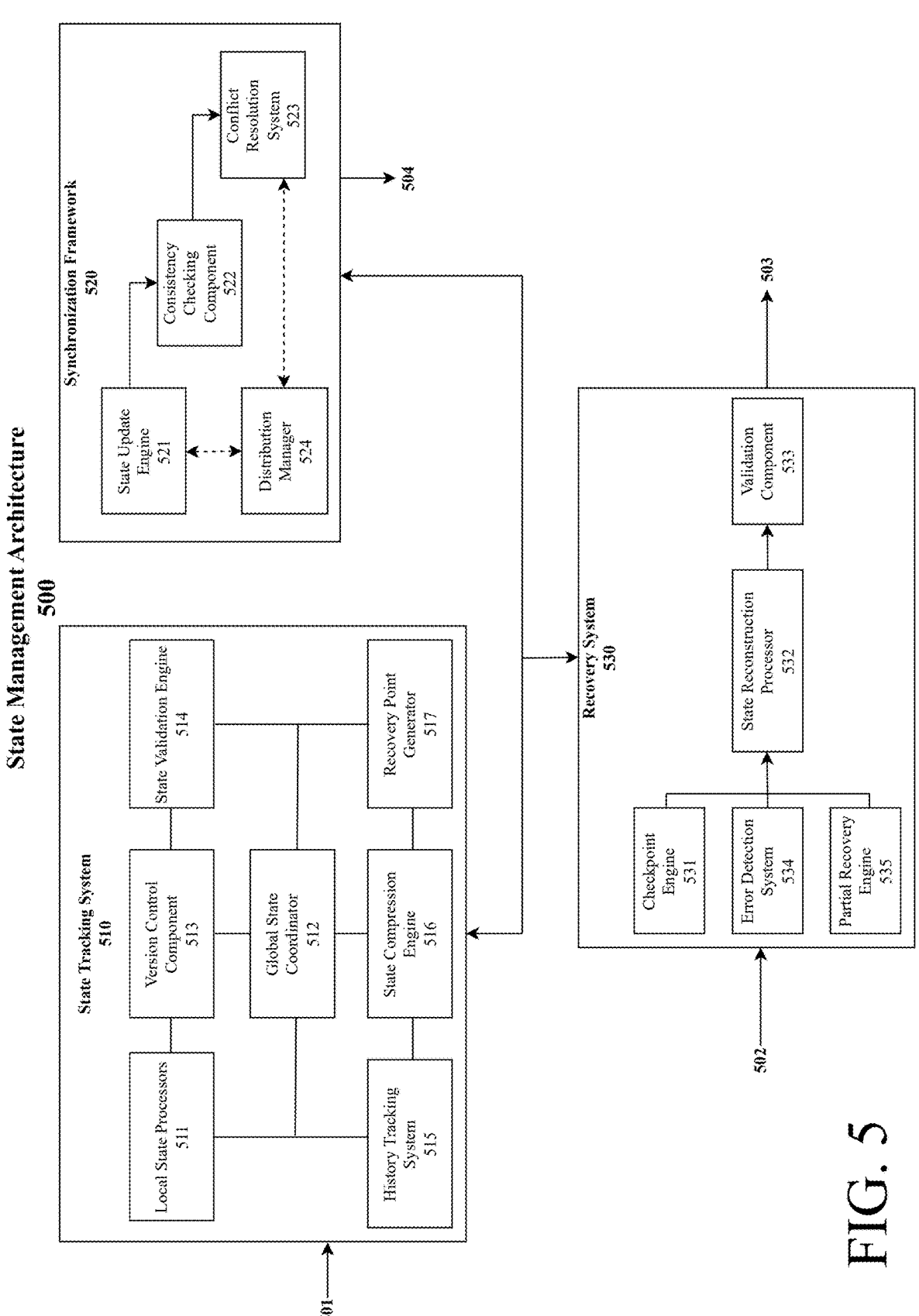
FIG. 5 is a block diagram illustrating exemplary architecture of state management.

FIG. 5 is a block diagram illustrating exemplary architecture of state management 500, in an embodiment. State management 500 coordinates state tracking, synchronization, validation, recovery, and maintenance across various components of the system to ensure temporal coherence and consistency. Data flow begins with state updates 501, which are received from interconnected components of the system, including temporal processing engine 200, context integration engine 300, and fusion engine 400. State management 500 processes these updates to maintain system-wide state integrity.

State tracking system 510 may include local state processors 511 that handle state information for specific subsystems, allowing for localized updates and retrievals. For example, local state processors 511 may track state transitions associated with immediate context data processed by the short-term processor 210 of temporal processing engine 200. In an embodiment, each local state processor may maintain a versioned record of states, enabling rapid access to recent state changes while isolating errors to individual subsystems. Global state coordinator 512 ensures alignment of states across local processors by aggregating and reconciling state data. For instance, global state coordinator 512 may merge local state changes from temporal and context processing components into a unified state representation, which is shared across system components. Version control component 513 tracks incremental changes to states over time, allowing for detailed rollback and reconstruction. In an embodiment, version control component 513 may store checkpoints for every significant state transition, enabling precise reconstruction of states when inconsistencies arise. State validation engine 514 applies predefined rules and conditions to ensure the consistency and integrity of state information. For example, validation may involve cross-referencing updated states with historical patterns stored in pattern repository system 233 of the long-term processor 230. History tracking system 515 records a chronological log of state changes, which may include timestamps, associated patterns, and triggering events, facilitating traceability for debugging and performance analysis. State compression engine 516 optimizes storage by identifying redundant or outdated state data and reducing its resolution or representation while preserving critical information. In an embodiment, this may involve applying compression algorithms, such as wavelet transformations, to long-term state records. Recovery point generator 517 establishes checkpoints at defined intervals or critical operations, supporting state restoration when inconsistencies are detected or recovery is initiated. These checkpoints may include full snapshots of state data or incremental logs that can be reassembled during recovery.

Synchronization framework 520 facilitates state updates and ensures consistency across components. State update engine 521 propagates changes to local and global states, ensuring synchronization among local state processors 511 and global state coordinator 512. For example, state update engine 521 may prioritize updates based on urgency or importance, such as applying real-time adjustments to short-term states during high-frequency data processing. Consistency checking component 522 performs real-time validation by comparing updated states against predefined constraints or expected transitions. In an embodiment, this may involve validating that state transitions conform to dependency rules established by domain context processor 310 in context integration engine 300. Conflict resolution system 523 resolves inconsistencies by applying resolution rules, such as prioritizing recent updates or reconciling conflicting states based on context-specific weights. For instance, in a multi-user environment, conflict resolution system 523 may align user interaction states by reconciling overlapping interactions. Distribution manager 524 coordinates the flow of state updates, ensuring timely propagation across components. This may include managing bandwidth allocation for updates and prioritizing critical components, such as fusion engine 400, to ensure system-wide coherence.

Recovery system 530 addresses restoration and error correction processes, minimizing system disruption during inconsistencies or failures. Checkpoint engine 531 retrieves recovery points generated by recovery point generator 517 and prepares them for reconstruction by state reconstruction processor 532. These recovery points may include full state snapshots or incremental logs, depending on the level of restoration required. State reconstruction processor 532 rebuilds state information from selected recovery points and integrates additional updates to restore consistency. For example, if an inconsistency is detected in medium-term processor 220, state reconstruction processor 532 may apply incremental updates from historical buffer component 221 to recover the correct state. Validation component 533 verifies that reconstructed states meet predefined criteria, such as coherence across temporal scales or alignment with historical trends. In an embodiment, validation may involve running consistency checks against long-term trends identified by trend analysis component 232 of the long-term processor 230. Error detection system 534 continuously monitors state updates for anomalies, such as unexpected transitions or deviations from historical patterns, triggering recovery operations as needed. Partial recovery engine 535 focuses on restoring specific components or subsystems, such as interaction context processor 330, while maintaining overall system functionality. For example, partial recovery may involve isolating and reconstructing the state of a failed subsystem while allowing other components to continue processing uninterrupted.

In an embodiment, machine learning models may be integrated into various components of the system to enhance state tracking, synchronization, validation, and recovery processes. These models may include supervised, unsupervised, or semi-supervised learning approaches, trained to optimize the detection of patterns, validation of state transitions, and reconstruction of inconsistent states. For example, local state processors 511 may implement recurrent neural networks (RNNs) or long short-term memory networks (LSTMs) to model state sequences and predict next states based on historical data. These models may analyze time-series data from short-term, medium-term, and long-term processors to identify trends and anomalies that inform state updates.

Global state coordinator 512 may, in an embodiment, employ graph neural networks (GNNs) to model dependencies between states across subsystems. For example, GNNs may capture relationships between entity-specific states managed by context integration engine 300 and temporal patterns detected by temporal processing engine 200. Training for these models may involve using datasets comprising historical state logs, dependency graphs, and labeled examples of valid state transitions to enable accurate modeling of cross-component dependencies.

State validation engine 514 may incorporate anomaly detection models, such as autoencoders or isolation forests, to identify inconsistencies in state data. For instance, an autoencoder may be trained on state data to learn compact representations of valid states, enabling it to flag deviations indicative of errors or inconsistencies. These models may be trained using historical state records that represent normal operating conditions, augmented with synthetic examples of erroneous states to improve robustness.

State reconstruction processor 532 may, for example, leverage generative models such as variational autoencoders (VAEs) or transformer-based architectures to rebuild inconsistent or missing states. These models may be trained on large datasets containing complete state histories and recovery scenarios, allowing them to generate plausible reconstructions of corrupted or incomplete state data. In an embodiment, the models may include positional encoding to retain temporal information, ensuring that reconstructed states align with the temporal coherence of the system.

Training of these machine learning models may utilize datasets generated from operational logs, including time-stamped state updates, pattern transitions, and recovery scenarios. For example, supervised learning models may be trained using labeled data representing valid and invalid state transitions, while unsupervised learning models may analyze unlabeled data to identify hidden patterns and relationships. In some embodiments, semi-supervised learning techniques may be applied, where a portion of the data is labeled to guide the learning process while leveraging a larger corpus of unlabeled data for additional training.

These models may be updated dynamically through online learning, where new state data continuously informs model parameters, or through periodic retraining using an expanded dataset. For example, the system may periodically aggregate state data from state history tracking system 515 and pattern evolution tracker 235 to refresh training datasets and improve model accuracy. Transfer learning may also be utilized, where pre-trained models from similar applications are fine-tuned on domain-specific data to accelerate deployment and reduce training requirements.

Throughout state management 500, bidirectional communication ensures seamless integration with other components. Local state processors 511 interact directly with state update engine 214 from temporal processing engine 200 and state vector component 322 from context integration engine 300 to track localized state changes. Global state coordinator 512 maintains synchronization with state validation system 415 from fusion engine 400, ensuring system-wide coherence. History tracking system 515 provides temporal insights to pattern evolution tracker 235 in long-term processor 230, enabling informed decision-making during state updates.

Outputs from state management 500 include state updates 504 and recovery operations 503. State updates 504 propagate validated and synchronized state information back to system components, enabling continuity in processing. Recovery operations 503 restore system functionality after detected inconsistencies or errors. This architecture supports robust state tracking and maintenance, ensuring reliable operation across integrated systems.

The data flow through state management 500 begins with state updates 501, which are received from interconnected components, including temporal processing engine 200, context integration engine 300, and fusion engine 400. These updates may originate from subsystems such as state update engine 214 in temporal processing, state vector component 322 in context integration, or state validation system 415 in the fusion engine, each providing localized state changes or adjustments. Local state processors 511 in state tracking system 510 process these updates by storing, modifying, and validating state information specific to their respective subsystems. Global state coordinator 512 aggregates state data from local processors, creating a unified representation that is accessible to other components. History tracking system 515 records each state transition in a chronological log, while version control component 513 tracks incremental changes to states, enabling precise rollback and reconstruction if needed. State compression engine 516 optimizes historical state storage by reducing redundant or outdated data.

Processed state information flows through synchronization framework 520, where state update engine 521 propagates the unified state representation back to all relevant components. Consistency checking component 522 verifies the integrity of synchronized states, identifying and resolving discrepancies through conflict resolution system 523. Distribution manager 524 coordinates the timing and routing of state updates to ensure efficient delivery across subsystems. Recovery system 530 handles state restoration when inconsistencies are detected. Checkpoint engine 531 retrieves recovery points generated by recovery point generator 517, and state reconstruction processor 532 rebuilds the affected state. Validation component 533 ensures the reconstructed state meets predefined criteria before reintegration. The final state updates 504 and recovery operations 503 are sent back to temporal processing engine 200, context integration engine 300, and fusion engine 400, ensuring all components operate with consistent and validated state information. This coordinated data flow maintains temporal coherence, contextual alignment, and system integrity.

When a recovery request 502 is made, it enters recovery system 530 within state management 500, triggering a sequence of operations to restore system consistency and functionality. Recovery requests may originate from error detection systems in components such as state validation engine 514, which monitors for anomalies in state transitions, or from external systems identifying discrepancies that require resolution. Upon receiving a recovery request, checkpoint engine 531 retrieves the most recent recovery point generated by recovery point generator 517. These recovery points may include full state snapshots or incremental logs detailing state changes over time, depending on the system's configuration and the nature of the error.

State reconstruction processor 532 processes the retrieved recovery point by reconstructing the affected state information and integrating it with additional updates from other subsystems. For example, reconstruction may involve applying historical state data from history tracking system 515 and incorporating recent updates from temporal processing engine 200's medium-term processor 220 or context integration engine 300's interaction context processor 330. Validation component 533 then verifies the reconstructed state against predefined criteria, such as temporal coherence, contextual consistency, and compliance with dependency rules established by global state coordinator 512.

If the validation identifies further inconsistencies, partial recovery engine 535 isolates and restores specific subsystems or components, minimizing disruption to overall system operations. For instance, partial recovery may focus on restoring the state of long-term processor 230 while maintaining active processing in short-term and medium-term processors. Once validated, the reconstructed state is reintegrated into the system and distributed through synchronization framework 520, where state update engine 521 propagates the restored state across all relevant subsystems. Consistency checking component 522 ensures that all components, including fusion engine 400 and context integration engine 300, align with the recovered state before the system resumes normal operations. The final recovery operations 503 are sent back to relevant components, completing the process and maintaining system integrity.

Figure 6:
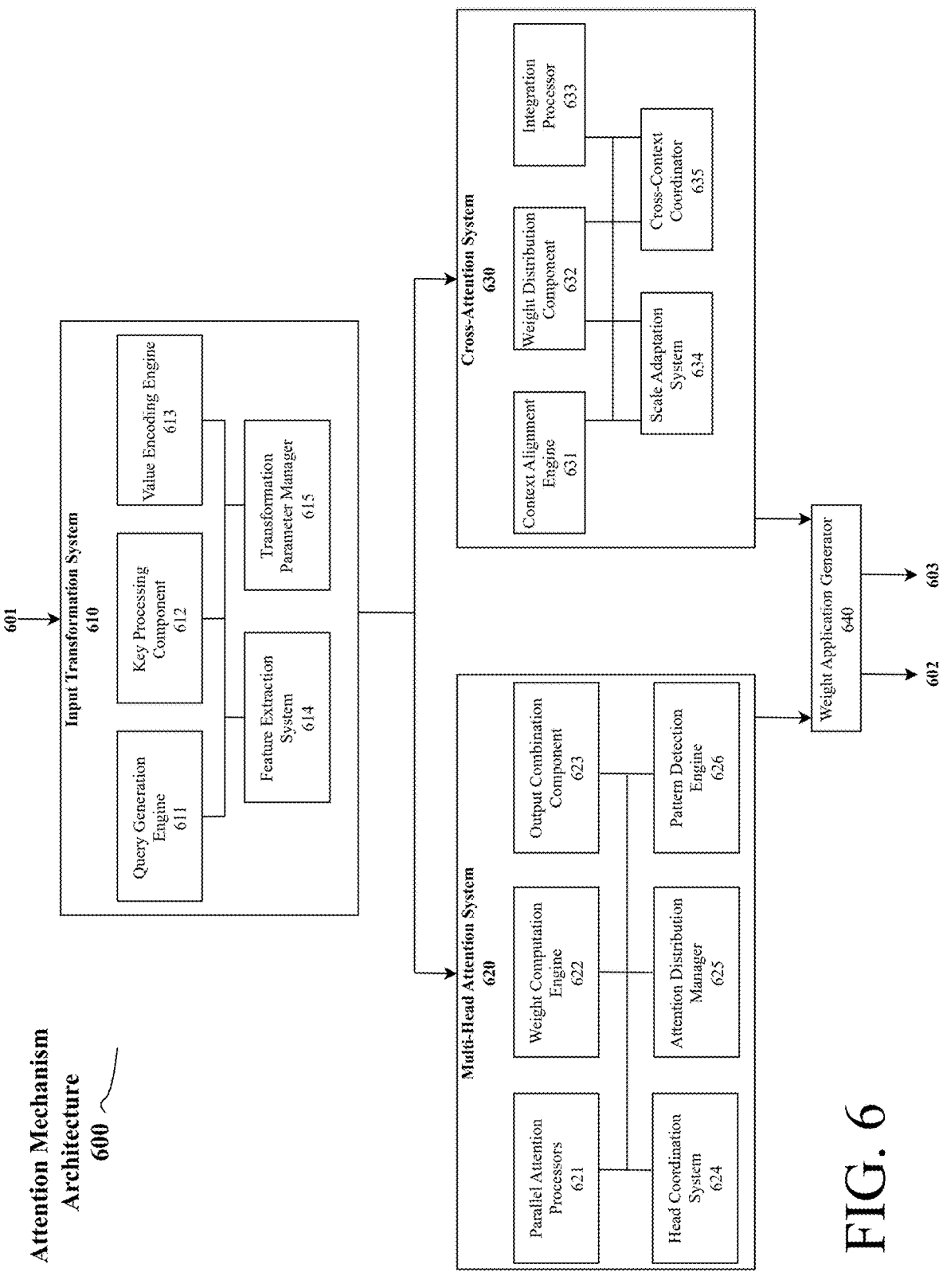
FIG. 6 is a block diagram illustrating exemplary architecture of attention.

FIG. 6 is a block diagram illustrating exemplary architecture of attention mechanism 600, in an embodiment. Attention mechanism 600 facilitates dynamic prioritization and integration of input data by generating and applying weights to emphasize relevant features, contexts, and temporal scales during processing. Data flow begins with input 601, which may include temporal data from temporal processing engine 200 and context data from context integration engine 300. This input is received by input transformation system 610, which processes the data into representations suitable for attention computations.

Input transformation system 610 may include query generation engine 611, key processing component 612, and value encoding engine 613, which transform input data into queries, keys, and values that are suitable for attention-based computations. For example, temporal input data from temporal processing engine 200 may be analyzed to extract features representing immediate processing needs, such as real-time events or short-term trends, and these features may be used to generate queries that specify the system's current focus. Context input data from context integration engine 300, such as domain-specific or entity-specific features, may be converted into keys and values that encapsulate relevant stored information, enabling alignment with incoming queries. Feature extraction system 614 processes raw input data to identify salient attributes, which may include patterns, state transitions, or domain-specific signals. For instance, feature extraction may employ signal processing techniques, embedding representations, or natural language processing to ensure critical information is preserved during query, key, and value transformations. Transformation parameter manager 615 governs the parameters of these transformations, dynamically adapting them based on evolving system states and ensuring alignment with components such as pattern recognition engine 331 in context integration engine 300.

Input transformation system 610 may incorporate positional encoding to ensure that temporal and sequential information is preserved during the query, key, and value transformation process. For example, sinusoidal positional encodings may be added to raw input data before it is processed by feature extraction system 614, allowing the system to maintain awareness of temporal ordering and dependencies. These encodings may be particularly valuable when aligning immediate temporal data from temporal processing engine 200 with historical context data from context integration engine 300. Positional encodings may also be applied to intermediate representations within multi-head attention system 620, enabling each attention head to distinguish between data points based on their position in the sequence. In an embodiment, the transformation parameter manager 615 may dynamically adjust the parameters of positional encodings based on the temporal scale of the input, such as applying higher resolution encodings for short-term data and lower resolution encodings for long-term patterns.

Transformed representations flow to multi-head attention system 620, where data is processed across multiple parallel attention heads to capture diverse relationships and dependencies within the input. Parallel attention processors 621 compute attention scores for each head, with each head specializing in analyzing specific aspects of the data, such as immediate temporal relationships or cross-context correlations. Weight computation engine 622 calculates the importance of query-key pairs, dynamically adjusting scores based on relevance and patterns detected in the data. For example, short-term trends may be assigned higher weights during periods of rapid change, while long-term relationships may be emphasized in stable conditions. Output combination component 623 aggregates results from individual heads into a unified attention representation, ensuring that each head's contribution is appropriately integrated. Head coordination system 624 manages dependencies between heads, enabling them to share intermediate results and avoid redundant computations. Attention distribution manager 625 balances processing loads across attention heads, dynamically allocating computational resources based on input complexity and head-specific requirements. Pattern detection engine 626 identifies recurring patterns in attention data, such as consistent query-key alignments or repeating temporal relationships, which may inform downstream processing.

Multi-head attention architecture in multi-head attention system 620 enables the system to process diverse aspects of the input data simultaneously by dividing the data into parallel attention heads. Each attention head specializes in a specific aspect of the input, allowing the system to capture both broad and fine-grained relationships within the data. For example, one attention head may focus on identifying short-term temporal dependencies, such as recurring patterns within immediate data streams processed by short-term processor 210, while another head may concentrate on domain-specific contextual features extracted by domain context processor 310. This parallel architecture ensures that critical relationships across temporal and contextual dimensions are effectively captured and integrated into the unified representation produced by output combination component 623. In an embodiment, the number and configuration of attention heads may be dynamically adjusted based on the complexity and dimensionality of the input data, as determined by attention distribution manager 625.

Weight computation engine 622 may, in an embodiment, dynamically calculate attention weights by analyzing the relationships between queries and keys, considering factors such as relevance metrics, input characteristics, and detected patterns. For example, attention weights may be adjusted to emphasize short-term data when processing real-time temporal events from short-term processor 210 or to prioritize historical trends during strategic analysis. The system may leverage insights from pattern detection engine 626 to identify recurring patterns or anomalies in the data, informing weight adjustments. Additionally, weight computation engine 622 may integrate feedback from other components, such as fusion engine 400, to refine its calculations and ensure alignment with overall system priorities. This dynamic weighting ensures that attention mechanisms adapt to changing data contexts and processing requirements, enhancing the system's responsiveness and accuracy.

Multi-head attention system 620 may, in an embodiment, implement sparse attention mechanisms to optimize computational efficiency and focus processing on the most relevant data. For example, masking techniques may restrict attention computations to specific temporal ranges, such as prioritizing immediate context data from short-term processor 210 while ignoring less relevant long-term patterns during real-time operations. Dropout may also be applied to attention weights to prevent overfitting, particularly when the system processes repetitive or highly correlated data. Attention distribution manager 625 may dynamically determine the scope of attention for each head, ensuring that only significant query-key pairs are processed while reducing unnecessary computations. Sparse attention mechanisms allow the system to allocate resources more efficiently, enhancing overall performance without sacrificing the quality of results.

Cross-attention system 630 integrates data streams from different domains or contexts, aligning queries, keys, and values to enable coherent and unified processing. Context alignment engine 631 matches queries from one data stream, such as temporal inputs, with keys and values from another, such as domain-specific contexts, facilitating integration of diverse information sources. Weight distribution component

632 calculates attention weights for aligned data streams, dynamically prioritizing elements based on relevance and contribution to the overall system objectives. For example, when processing customer interactions, recent activity may be given higher priority than long-term preferences, depending on the context of the task. Integration processor 633 combines aligned data streams into a single representation, ensuring that temporal and contextual elements are seamlessly integrated. Scale adaptation system 634 resolves differences in temporal resolutions or contextual granularities between data streams, applying interpolation, aggregation, or alignment techniques to ensure compatibility. Cross-context coordinator 635 facilitates communication between cross-attention system 630 and other components, such as context integration framework 300, enabling continuous alignment with evolving states and patterns.

Cross-attention system 630 may, in an embodiment, support applications that require the integration of diverse data streams, enabling robust and contextually relevant processing. For example, in a customer service scenario, queries derived from immediate customer interactions processed by short-term processor 210 may be aligned with keys and values representing historical preferences and purchase trends processed by entity context processor 320. This alignment allows the system to generate recommendations that balance short-term behavior with long-term customer profiles. Similarly, in healthcare applications, cross-attention may align real-time vital signs with long-term health records to support timely and contextually informed decision-making. Weight distribution component 632 may dynamically adjust the priority of different data streams, such as emphasizing recent medical events during critical situations or prioritizing long-term trends in routine analyses. By enabling these use cases, cross-attention system 630 facilitates seamless integration of data across temporal and contextual domains, ensuring relevance and coherence in the generated outputs.

Scale adaptation system 634 may, in an embodiment, dynamically adjust data representations to align differing temporal resolutions or contextual granularities across data streams. For example, temporal data from long-term processor 230, which may represent aggregated trends over months, can be interpolated or downsampled to align with high-resolution real-time data from short-term processor 210. Similarly, context data with fine-grained entity relationships processed by entity context processor 320 may be aggregated to match broader domain-specific features from domain context processor 310. Scale adaptation may include techniques such as temporal resampling, feature aggregation, or weighted averaging to reconcile differences without losing critical information. This system ensures that aligned data streams maintain consistency and relevance when processed by integration processor 633 and subsequently passed to weight application generator 640. In an embodiment, scale adaptation system 634 may also adjust processing parameters based on feedback from downstream components, such as fusion engine 400, enabling the system to optimize its integration of multi-scale data.

Both multi-head attention system 620 and cross-attention system 630 provide outputs to weight application generator 640, which applies the computed weights to guide downstream processing. Temporal processing weights 602 influence operations in temporal processing engine 200, such as determining priorities in short-term processor 210 or modifying state transitions in medium-term processor 220 to reflect detected patterns or trends. Context integration weights 603 guide components in context integration engine

300, such as feature extraction engine 314, to emphasize relevant context features or domain adaptation component 315 to adjust processing parameters dynamically. The output of attention mechanism 600 ensures that input data is prioritized and aligned across multiple scales and contexts, facilitating coherent and adaptive system performance.

Weight application generator 640 may, in an embodiment, perform consistency validation on attention results before applying them to downstream components. For example, the generator may cross-reference temporal processing weights 602 with historical state information maintained by state management system 500 to ensure that computed weights align with long-term trends and do not introduce inconsistencies. Context integration weights 603 may similarly be validated against domain-specific constraints processed by domain context processor 310, ensuring adherence to rules or priorities specific to the application domain. The generator may also apply scaling factors to balance the influence of different attention heads or data streams, such as amplifying short-term weights during real-time decision-making scenarios while attenuating less relevant long-term contributions. By integrating these results and validating their consistency, weight application generator 640 ensures that attention mechanism 600 supports coherent and effective processing throughout the system.

Attention mechanism 600 may incorporate error handling procedures to detect and address anomalies in attention computations, ensuring reliable and consistent outputs. For example, pattern detection engine 626 may monitor attention scores for irregularities, such as abnormally high weights assigned to unrelated query-key pairs, and flag these for further analysis. Cross-attention system 630 may include fallback mechanisms, such as using default weights or previously validated outputs, when inconsistencies are detected during alignment or weight distribution. Error signals identified within attention mechanism 600 may be communicated to state management system 500, where recovery system 530 can initiate partial restoration of affected components, such as recalibrating weight computation engine 622 or reprocessing input transformations in input transformation system 610. In an embodiment, consistency validation performed by weight application generator 640 may serve as an additional safeguard, ensuring that errors in upstream attention computations do not propagate to downstream components. These error handling measures enhance the robustness of attention mechanism 600, maintaining system stability even under irregular or unexpected conditions.

Machine learning models may, in an embodiment, be integrated within attention mechanism 600 to enhance the computation of attention weights, pattern detection, and cross-context integration. These models may include supervised, unsupervised, or semi-supervised learning approaches that are trained to optimize query-key-value transformations, detect recurring patterns, and dynamically adjust attention scores. For example, multi-head attention system 620 may incorporate transformer-based architectures, where each head is a scaled dot-product attention mechanism trained to specialize in analyzing specific aspects of input data, such as immediate temporal dependencies or domain-specific features. These models may be trained on large datasets containing labeled sequences of queries, keys, and values, annotated with expected attention weights, to capture relevant relationships across data dimensions.

Cross-attention system 630 may include models such as graph neural networks (GNNs) or attention-based sequence models that align data streams from different domains. For instance, a graph neural network may model relationships between entities identified in context integration engine 300 and temporal patterns detected in temporal processing engine 200. Training for these models may involve datasets containing structured representations of entity interactions, temporal trends, and cross-domain dependencies. These datasets may be constructed from historical interaction logs, annotated knowledge graphs, and synthetic data generated to simulate complex cross-context scenarios. Models in cross-attention system 630 may learn to prioritize certain contexts dynamically, such as emphasizing recent temporal data when immediate responsiveness is required or focusing on historical domain rules for strategic decision-making.

Weight computation engine 622 may leverage deep learning models, such as convolutional neural networks (CNNs) or feed-forward neural networks, to calculate attention scores for each query-key pair. For example, a CNN may analyze patterns in temporal and contextual embeddings to detect correlations that inform weight adjustments. These models may be trained using supervised learning on datasets containing examples of effective query-key alignments and their corresponding weights, with loss functions designed to minimize deviations from expected output distributions.

Pattern detection engine 626 may incorporate recurrent neural networks (RNNs), LSTMs, or temporal convolutional networks (TCNs) to identify recurring patterns within attention data. These models may, for example, detect repeating temporal relationships or persistent cross-context correlations, providing insights to guide attention weight adjustments. Training data for these models may include labeled time-series datasets, where patterns are annotated based on historical trends or known dependencies. Semi-supervised learning techniques may also be employed, where the models leverage both labeled and unlabeled data to improve their ability to generalize across diverse scenarios.

These machine learning models may be updated periodically or continuously to maintain accuracy and relevance. For example, online learning techniques may enable models to adjust their parameters based on real-time feedback from the system, ensuring alignment with evolving patterns in input data. Transfer learning may also be utilized, where pre-trained models from similar applications are fine-tuned on domain-specific data to accelerate deployment and reduce training overhead. Data augmentation techniques may be employed during training to improve model robustness, such as generating synthetic query-key-value pairs or introducing noise to simulate real-world variability.

By integrating machine learning models, attention mechanism 600 may dynamically adapt to changing data conditions, enabling precise and efficient prioritization and alignment of inputs across temporal and contextual dimensions. This integration supports the system's overall objective of maintaining coherence and responsiveness across multiple scales and contexts.

The data flow through attention mechanism 600 begins with input 601, which may include temporal data from temporal processing engine 200 and context data from context integration engine 300. This input is received by input transformation system 610, where query generation engine 611, key processing component 612, and value encoding engine 613 transform the input into queries, keys, and values, guided by feature extraction system 614. Transformation parameter manager 615 ensures that these transformations align with the current processing requirements and state information from other system components. The transformed representations are then processed by multi-head attention system 620, where parallel attention processors 621 calculate attention scores for each head. Weight computation engine 622 determines the importance of query-key relationships, and output combination component 623 aggregates results from all attention heads into a unified representation. Head coordination system 624 ensures efficient communication between attention heads, while attention distribution manager 625 dynamically allocates computational resources. Pattern detection engine 626 identifies recurring or significant relationships within the attention data, which informs downstream processing.

Simultaneously, cross-attention system 630 aligns data streams from different domains or contexts. Context alignment engine 631 matches queries from one stream with keys and values from another, weight distribution component 632 computes attention weights for aligned data, and integration processor 633 combines the streams into a coherent representation. Scale adaptation system 634 resolves differences in resolution or granularity between streams, and cross-context coordinator 635 facilitates synchronization with other system components. Both multi-head attention system 620 and cross-attention system 630 feed their outputs into weight application generator 640, which generates temporal processing weights 602 and context integration weights 603. These weights are sent to temporal processing engine 200 and context integration engine 300, respectively, influencing operations such as prioritization of temporal data in short-term processor 210 and feature extraction in context integration framework 300. This flow enables attention mechanism 600 to dynamically prioritize and align input data across temporal and contextual dimensions, ensuring coherent and adaptive processing throughout the system.

FIG. 7 is a method diagram illustrating the overall processing of multi-scale temporal context integration system 100, in an embodiment. Input data 101 is received by processing coordinator 120, where the data undergoes initial validation to ensure conformity with required formats and preprocessing to normalize and standardize features for downstream components. Preprocessing may include timestamp alignment, feature scaling, and schema verification to ensure consistency across temporal and contextual data streams 701. Relevant features are then extracted from input data by feature extraction systems in temporal processing engine 200 and context integration engine 300. Temporal feature extraction may involve identifying time-based trends and events, while context-specific extraction focuses on attributes such as domain-specific rules or entity relationships. These features are organized into representations suitable for further processing 702.

Temporal analysis is performed by short-term processor 210, medium-term processor 220, and long-term processor 230 within temporal processing engine 200. Each processor operates at a distinct time scale, analyzing immediate, recent, and extended historical data to detect patterns, state transitions, and trends specific to its time scale. For example, short-term processor 210 may identify high-frequency patterns within a rolling time window, while long-term processor 230 analyzes aggregated historical trends over months 703. Simultaneously, context integration engine 300 processes input data to extract domain-specific, entity-specific, and interaction-specific context features. Domain context processor 310 applies rules and knowledge graphs to analyze structured data, entity context processor 320 identifies and tracks relationships between entities, and interaction context processor 330 examines interaction histories and dependencies to generate a unified contextual representation 704.

State management system 500 tracks and maintains state information across the system, ensuring synchronization and validation of states from temporal processing engine 200, context integration engine 300, and fusion engine 400. Local state processors manage component-specific states, while the global state coordinator aggregates and reconciles these states into a unified representation. This process ensures temporal coherence and consistency across all components 705. Fusion engine 400 receives outputs from temporal processing engine 200 and context integration engine 300, integrating temporal and contextual data into a coherent, unified representation. This process dynamically assigns weights to different scales and contexts, aligning short-term, medium-term, and long-term patterns with domain and entity-specific contexts to generate a comprehensive output 706.

Output data 102 is generated by fusion engine 400 and formatted for delivery to downstream components or external systems. Formatting may include transforming the data into structured responses, reports, or visualizations depending on application requirements 707. Validation and feedback mechanisms verify the consistency and coherence of generated outputs, identifying anomalies or discrepancies. When inconsistencies are detected, state management system 500 performs corrections by initiating recovery processes or recalibrating system parameters 708. Feedback loops adjust processing parameters in temporal processing engine 200 and context integration engine 300, enabling adaptive optimization of future operations based on system performance metrics and identified patterns 709.

FIG. 8 is a method diagram illustrating the temporal processing of multi-scale temporal context integration system 100, in an embodiment. Input data 201 is initially distributed to the system's temporal processors by input distribution component 205. This component separates the data into distinct temporal scales, ensuring that immediate data is directed to short-term processor 210, recent historical data to medium-term processor 220, and extended historical data to long-term processor 230, thereby preparing the data for parallel processing 801.

Each temporal processor then processes the data in parallel to extract time-specific patterns and dependencies. Short-term processor 210 handles real-time data, analyzing immediate trends and state changes. Medium-term processor 220 focuses on intermediate patterns, integrating data from recent interactions to identify evolving trends. Long-term processor 230 evaluates extended historical data to detect persistent patterns or seasonal trends, leveraging techniques such as trend analysis and hierarchical compression 802.

Pattern detection is performed within each processor to identify significant events or correlations in the data. Pattern detection engine 213 in short-term processor 210 identifies transient patterns, such as spikes or anomalies in real-time data. Pattern evolution tracker 222 in medium-term processor 220 analyzes how patterns develop or change over recent timeframes. Trend analysis component 232 in long-term processor 230 evaluates persistent trends across extensive historical datasets, ensuring comprehensive pattern recognition across temporal horizons 803.

State tracking is conducted concurrently in each processor. Immediate state tracker 212 manages transient states within short-term processor 210, ensuring real-time responsiveness. State transition engine 223 in medium-term processor 220 updates states to reflect intermediate changes detected in recent data. Historical state archive 234 in long-term processor 230 maintains durable records of long-term states, preserving consistency and enabling integration with other time scales 804.

The outputs from each temporal processor are routed to cross-scale components 240, where state synchronization mechanism 241 reconciles and aligns state information across temporal scales. This process ensures that outputs from short-term, medium-term, and long-term processors are coherent and consistent, allowing for seamless integration across time horizons 805.

Pattern correlation engine 242 integrates the patterns detected across all temporal processors. By identifying correlations between short-term trends, medium-term developments, and long-term patterns, the system generates a unified representation of temporal dependencies, providing a comprehensive view of temporal relationships 806.

Temporal coherence validator 243 verifies the consistency of the integrated data. This subsystem cross-references the integrated outputs with system-wide state information maintained by state management system 500, ensuring that all temporal relationships align with the current and historical states of the system 807.

Scale transition manager 244 refines the integration of data across temporal scales by making necessary adjustments to state transitions or outputs. For example, it may reconcile discrepancies between high-resolution short-term data and lower-resolution long-term trends, ensuring smooth alignment across scales 808.

The final integrated temporal outputs are delivered to fusion engine 400. These outputs, representing a unified and coherent analysis of temporal data, are then combined with context data for further processing and decision-making 809.

FIG. 9 is a method diagram illustrating the context integration of multi-scale temporal context integration system 100, in an embodiment. Input data 301 is received by context distribution subsystem 305, which identifies relevant portions of the data and routes it to domain context processor 310, entity context processor 320, and interaction context processor 330. This ensures that each processor focuses on data specific to its context type, optimizing the processing flow and resource allocation 901. Context feature extraction is performed by feature extraction engine 314 within domain context processor 310, where domain-relevant features such as regulatory constraints or operational rules are identified. Simultaneously, entity identification system 323 within entity context processor 320 extracts entity-specific attributes such as names, identifiers, or tags, while interaction history system 333 within interaction context processor 330 analyzes temporal and relational aspects of previous interactions 902.

Domain processing occurs within domain context processor 310, where knowledge graph engine 311 maps extracted features to structured domain knowledge, enabling the system to interpret and utilize domain-specific hierarchies, relationships, and ontologies. Rule processing system 312 applies domain-specific rules, such as compliance checks or industry standards, to refine the contextual understanding and enhance consistency in domain representations 903. Entity analysis is conducted by entity context processor 320, where entity relationship engine 321 identifies connections between entities, such as customer-to-product or machine-to-environment relationships. State vector component 322 tracks the current status of each entity, including dynamic attributes such as preferences, operational metrics, or recent interactions, ensuring a comprehensive and up-to-date representation of each entity 904.

Interaction pattern recognition is performed by interaction context processor 330, where pattern recognition engine 331 detects recurring interaction patterns, such as repeated customer inquiries or cyclic operational events. Temporal dependency tracker 332 analyzes sequential dependencies between events, identifying causal relationships or trends over time that can inform downstream decision-making 905. Context fusion operations are handled by context integration subsystem 340, which reconciles outputs from the three processors into a unified representation. This process resolves inconsistencies between domain, entity, and interaction contexts, ensuring alignment and coherence across the integrated data streams 906.

State synchronization is performed by state management system 500, where updates from context integration subsystem 340 are validated and incorporated into the global state representation. This step ensures that context-related updates are synchronized across all system components, maintaining consistency and temporal coherence 907. The unified context representation is then forwarded to fusion engine 400, where it is integrated with temporal outputs from temporal processing engine 200. This combination supports the generation of coherent system outputs that reflect both temporal and contextual dimensions of the input data 908.

FIG. 10 is a method diagram illustrating the state management of multi-scale temporal context integration system 100, in an embodiment. State initialization is performed by local state processors 511 and global state coordinator 512, where initial states are established based on input data and predefined configurations. These initial states may include baseline representations of temporal patterns from temporal processing engine 200 and context-specific attributes from context integration engine 300, ensuring that all system components begin with a coherent and synchronized state foundation 1001. State updates are received from various system components, reflecting recent changes and transitions, and are processed by state update engine 521. For example, updates may include changes in temporal trends detected by medium-term processor 220 or adjustments to context-specific states maintained by entity context processor 320 1002.

Consistency checking is conducted by consistency checking component 522, which validates state updates against predefined rules, historical data, and cross-component dependencies. This process may involve comparing state transitions to historical trends recorded in historical state archive 234 or verifying alignment with domain-specific constraints from domain context processor 310. Any inconsistencies are flagged for further resolution 1003. Version control is managed by version control component 513, which tracks all state changes over time and creates a versioned history. These versions allow the system to perform rollback operations, audit state changes, or compare current states against past configurations for debugging or optimization 1004.

State synchronization is performed by synchronization framework 520, where global state coordinator 512 aligns local states from multiple components into a unified system-wide representation. This alignment ensures that updates from subsystems such as pattern evolution tracker 222 and state vector component 322 are reflected consistently across the system, maintaining temporal and contextual coherence 1005. Conflict resolution is handled by conflict resolution system 523, which resolves inconsistencies or competing state updates using predefined rules or contextual priorities. For example, in cases where updates from short-term processor 210 conflict with long-term trends identified by trend analysis component 232, priority may be given to the most contextually relevant state 1006.

Recovery points are generated by recovery point generator 517 at regular intervals or critical operations, creating snapshots of system states that can be used for restoration in case of anomalies. These recovery points may include comprehensive state snapshots or incremental updates, depending on the system's operational requirements 1007. Recovery operations are executed by recovery system 530, where checkpoint engine 531 retrieves saved states, and state reconstruction processor 532 restores the system to a valid configuration. For example, state reconstruction may involve replaying incremental updates stored in version control component 513 or applying corrections to specific subsystems identified by error detection system 534 1008.

Updated states are validated and synchronized across system components by distribution manager 524, ensuring that all subsystems, including fusion engine 400, operate with consistent and validated state information. This final synchronization step guarantees continuity and prepares the system for subsequent operations, maintaining reliability across multi-scale temporal and contextual processes 1009.

FIG. 11 is a method diagram illustrating the error recovery of multi-scale temporal context integration system 100, in an embodiment. Errors are detected by error detection system 534, which continuously monitors inputs, outputs, and intermediate states for anomalies, inconsistencies, or unexpected patterns. For example, anomalies may include deviations from expected temporal patterns in short-term processor 210 or inconsistencies in context relationships within entity context processor 320, and these are flagged for further assessment 1101. Impact assessment is performed by validation component 533, evaluating the scope and severity of detected errors. This process may identify specific components or subsystems affected by the error and assess their dependencies, such as determining whether an inconsistency in fusion engine 400 affects outputs dependent on state transitions from temporal processing engine 200 1102.

Containment measures are implemented by conflict resolution system 523 and recovery system 530 to isolate affected components and prevent error propagation throughout the system. For example, containment may involve temporarily suspending operations in affected processors, such as interaction context processor 330, while allowing unaffected components to continue processing 1103. State recovery operations are initiated by checkpoint engine 531, which retrieves recovery points generated by recovery point generator 517. These recovery points may include full snapshots or incremental updates, ensuring the system can revert affected states to a known valid configuration without disrupting unrelated processes 1104.

State reconstruction processor 532 processes retrieved recovery points, applying updates or adjustments as needed to restore consistency. For example, if an error occurs in medium-term processor 220, state reconstruction may involve replaying incremental updates stored in historical buffer component 221 to re-establish coherence across time scales 1105. Processing restoration is managed by synchronization framework 520, which reinitializes affected processes and resumes suspended operations. This step may include coordinating temporal and contextual data flows between subsystems, such as reactivating fusion operations in fusion engine 400 to align restored states with ongoing system outputs 1106.

Validation operations are conducted by consistency checking component 522, verifying that restored states and processes meet predefined integrity and coherence criteria. This validation may involve cross-referencing restored states with historical trends in pattern repository system 233 and ensuring alignment with global state information maintained by state management system 500 1107. Adjustments to recovery parameters and system configurations are performed by state management system 500 to optimize future recovery operations and reduce the likelihood of similar errors recurring. For example, adjustments may involve refining checkpoint intervals or updating error detection thresholds to improve system resilience 1108. Finally, system operations are resumed, with validated states and processes reintegrated into the overall workflow. This ensures continuity and stability across all components, maintaining the system's operational integrity and coherence 1109.

FIG. 12 is a method diagram illustrating the adaptation of multi-scale temporal context integration system 100, in an embodiment. System performance is monitored by resource management component 130, which collects metrics such as processing speed, resource utilization, and system latency from all major components, including temporal processing engine 200 and context integration engine 300. These metrics provide real-time insights into the operational efficiency and potential bottlenecks within the system, serving as the foundation for subsequent adaptation steps 1201. Pattern analysis is conducted by pattern detection engine 213 in temporal processing engine 200 and pattern recognition engine 331 in context integration engine 300, identifying trends, anomalies, and recurring patterns. For example, short-term processor 210 may detect rapid changes in temporal data, while interaction context processor 330 may identify shifts in user behavior or interaction patterns 1202.

Weight adjustments are dynamically calculated by weight computation engine 622 in multi-head attention system 620 and weight distribution component 632 in cross-attention system 630. These adjustments may prioritize certain temporal scales or context types based on detected patterns, such as increasing the weight assigned to short-term data during real-time operations or amplifying the influence of historical trends during strategic analyses 1203. Processing parameters are updated by transformation parameter manager 615 in input transformation system 610 and domain adaptation component 315 in domain context processor 310. These updates may reflect changes in input characteristics, such as variations in data frequency or domain-specific rules, ensuring that the system remains responsive to evolving conditions 1204.

Validation is performed by consistency checking component 522 and validation component 533, ensuring that adjusted weights and parameters align with predefined rules and do not introduce inconsistencies. For example, validation may involve cross-referencing new weights with historical states recorded by state management system 500 or verifying that parameter updates preserve coherence across temporal scales and context types 1205. Feedback is integrated into state management system 500, where validated adjustments are stored in state trackers and propagated to subsystems. This integration ensures that updates are synchronized across the system, maintaining alignment with global states and enhancing overall coherence 1206.

The validated updates are applied to temporal processing engine 200 and context integration engine 300, where adjusted weights and parameters refine the operation of processors. For instance, state transitions in medium-term processor 220 may be recalibrated to align with updated priorities, while feature extraction in domain context processor 310 may be adjusted to emphasize newly detected trends 1207. Adaptive improvements are validated in downstream outputs generated by fusion engine 400, ensuring that refined operations enhance overall system performance while maintaining coherence and alignment with prior states 1208. Continuous monitoring is resumed by resource management component 130, initiating subsequent adaptation cycles as necessary to sustain optimal performance across all components of the system 1209.

In a non-limiting use case example of multi-scale temporal context integration system 100, the system is implemented to optimize customer interactions in a restaurant's front-of-house operations. Input data 101 includes real-time updates such as customer arrivals, table occupancy statuses, and waitlist information, which are processed by temporal processing engine 200. Short-term processor 210 analyzes immediate data, such as the current number of parties waiting and their respective preferences for seating arrangements. Medium-term processor 220 evaluates recent patterns, such as the average party size and wait times over the past week, to predict peak periods and guide staff allocations. Long-term processor 230 considers broader historical trends, such as seasonal variations in customer traffic or holiday surges, to inform strategic planning.

Context integration engine 300 combines this temporal data with contextual information specific to the restaurant. Domain context processor 310 applies restaurant policies, such as rules for seating priority (e.g., large parties are seated at designated tables) and dining time limits during peak hours. Entity context processor 320 tracks information on individual customers, including VIP designations, preferences for specific tables, and past orders. Interaction context processor 330 monitors ongoing interactions, such as communication between hosts and customers or updates to the waitlist, ensuring real-time coordination. These processors work together to build a comprehensive understanding of the current state of operations and customer needs.

Fusion engine 400 integrates the outputs of temporal processing engine 200 and context integration engine 300 to dynamically generate actionable insights. For instance, the system may recommend seating arrangements that maximize table utilization while prioritizing customers with specific requests or VIP status. It may also provide estimated wait times for incoming customers based on historical and real-time data, enabling hosts to communicate accurately and manage expectations. Additionally, the system can identify opportunities to seat walk-ins efficiently during lulls or accommodate special occasions such as birthdays.

State management system 500 maintains consistency across all components, ensuring that updates from temporal and context processing are synchronized. For example, changes to the waitlist tracked by interaction context processor 330 are propagated to state management system 500, which ensures that seating recommendations generated by fusion engine 400 remain accurate and up-to-date. State recovery mechanisms, such as checkpoints created by recovery point generator 517, ensure that errors, such as incorrect customer preferences or delays in data processing, can be corrected without disrupting overall operations.

In this use case, the system enables staff to deliver a seamless and personalized dining experience. Hosts are equipped with real-time insights to reduce wait times and handle complex seating arrangements, while customers benefit from improved service efficiency and satisfaction. The restaurant also gains valuable data for long-term planning, such as identifying peak periods for staffing adjustments or tailoring promotions to customer preferences. This demonstrates the versatility and effectiveness of multi-scale temporal context integration system 100 in managing dynamic and customer-centric environments.

In another non-limiting use case example of multi-scale temporal context integration system 100, the system supports back-of-house operations in a restaurant by optimizing inventory management and kitchen workflow. Input data 101 includes real-time information such as ingredient usage rates, order tickets, and staff availability, which is processed by temporal processing engine 200. Short-term processor 210 analyzes immediate data, such as the current rate of ingredient consumption during ongoing meal preparation, enabling rapid adjustments to supply levels or order sequencing. Medium-term processor 220 evaluates patterns from recent shifts, such as the frequency of specific dishes ordered over the past week, to identify trends that inform prep levels and restocking schedules. Long-term processor 230 considers broader trends, such as seasonal changes in menu popularity or historical supplier delivery times, ensuring the system anticipates recurring demands and prepares accordingly.

Context integration engine 300 combines this temporal data with contextual knowledge relevant to back-of-house operations. Domain context processor 310 applies rules such as food safety standards, storage requirements, and inventory turnover policies. For instance, it may prioritize the use of perishable items nearing expiration to minimize waste while maintaining compliance with health regulations. Entity context processor 320 tracks supplier relationships and delivery schedules, enabling dynamic adjustments to reorder plans in case of delays or shortages. Interaction context processor 330 monitors coordination among kitchen staff, such as updates to dish preparation status or workflow interruptions caused by equipment malfunctions. This comprehensive context enables the system to understand the intricate dynamics of kitchen and inventory operations.

Fusion engine 400 integrates outputs from temporal processing engine 200 and context integration engine 300 to generate actionable recommendations for staff. For example, the system may identify an upcoming shortage of a critical ingredient based on real-time consumption and recent order patterns, prompting an alert to reorder supplies from a preferred vendor tracked by entity context processor 320. It may also provide recommendations for reallocating resources during busy periods, such as prioritizing certain prep stations or temporarily modifying dish assembly workflows to manage bottlenecks.

State management system 500 ensures consistency and synchronization across all subsystems. Updates to ingredient usage rates tracked by short-term processor 210 are validated and incorporated into the global state, ensuring that inventory levels remain accurate and reliable. Recovery mechanisms, such as checkpoints created by recovery point generator 517, provide resilience in case of discrepancies, such as mismatched order tickets or missing inventory data. State synchronization ensures that all adjustments, from inventory changes to kitchen workflows, are coordinated seamlessly across the system.

This use case highlights how multi-scale temporal context integration system 100 enhances the efficiency and reliability of back-of-house operations. By integrating temporal data and contextual knowledge, the system minimizes waste, optimizes resource allocation, and ensures that kitchen staff can respond to changing demands effectively. These capabilities enable the restaurant to maintain high operational standards, reduce costs, and deliver consistent quality to customers.

In another non-limiting use case example of multi-scale temporal context integration system 100, the system is applied in a healthcare setting to monitor patient health and provide actionable insights for caregivers. Input data 101 includes real-time vital signs such as heart rate, blood pressure, and oxygen levels, as well as patient activity data collected through wearable devices. Temporal processing engine 200 analyzes this data at multiple time scales. Short-term processor 210 monitors immediate fluctuations in vitals, detecting anomalies such as sudden drops in oxygen saturation. Medium-term processor 220 evaluates trends over recent days or weeks, such as changes in blood pressure patterns, while long-term processor 230 incorporates historical health records to identify persistent conditions or risk factors.

Context integration engine 300 combines this temporal analysis with patient-specific and domain-specific contextual data. Entity context processor 320 manages patient profiles, including demographic details, medical histories, and current medications. Domain context processor 310 applies medical protocols, such as treatment guidelines for chronic conditions or thresholds for triggering alerts in critical care situations. Interaction context processor 330 tracks recent interactions between patients and healthcare providers, such as consultations, medication changes, or reported symptoms, ensuring that care recommendations are informed by recent clinical events.

Fusion engine 400 integrates these outputs to generate personalized health insights and actionable recommendations. For example, the system may alert a caregiver to administer an intervention if a patient's vitals exceed critical thresholds, using a combination of real-time monitoring and historical trend analysis. It may also recommend adjustments to treatment plans, such as modifying medication dosages based on the evolution of a patient's condition or scheduling follow-up visits for further evaluation.

State management system 500 ensures consistency across temporal and contextual updates, synchronizing patient data to maintain an accurate and unified health profile. For instance, when a caregiver updates a patient's treatment plan, the changes are propagated across all system components, ensuring that subsequent recommendations align with the latest data. Recovery mechanisms, such as checkpoint engine 531, allow the system to restore prior states in case of errors, such as erroneous data entries or equipment malfunctions.

In this use case, multi-scale temporal context integration system 100 supports caregivers in delivering timely, personalized, and effective healthcare. The integration of temporal and contextual data enables proactive interventions, improved patient outcomes, and optimized resource allocation in medical environments. This example highlights the system's adaptability to complex, high-stakes applications where precision and responsiveness are critical.

In a non-limiting use case example of multi-scale temporal context integration system 100, the system is applied in a hotel management setting to optimize operations, predict periods of high demand, and enhance guest experiences. Input data 101 includes real-time updates such as room availability, active reservations, and guest check-ins, processed by temporal processing engine 200. Short-term processor 210 analyzes immediate data, such as the current rate of new bookings or cancellations. Medium-term processor 220 evaluates trends from recent weeks, such as peak days for check-ins or seasonal occupancy rates, while long-term processor 230 incorporates historical data, including year-over-year booking patterns and the impact of previous local events on hotel demand.

Context integration engine 300 processes this temporal data alongside contextual information relevant to hotel management. Entity context processor 320 tracks individual guest preferences, such as room types, amenities, and loyalty program status, enabling personalized service. Domain context processor 310 incorporates hotel policies, such as rules for prioritizing high-value guests or handling overbooked situations. Interaction context processor 330 monitors ongoing interactions, such as guest requests for early check-ins or special accommodations, ensuring that real-time guest needs are accounted for in operational decisions.

The system is further enhanced by its ability to monitor regional events, incorporating external data sources such as event calendars, weather forecasts, and transportation schedules. For example, domain context processor 310 may integrate information about a major concert, conference, or festival occurring nearby, while interaction context processor 330 tracks inquiries from potential guests mentioning attendance at these events. Temporal processing engine 200 evaluates the timing and expected duration of such events, combining them with historical demand data to predict surges in bookings.

Fusion engine 400 integrates all these inputs to provide actionable insights and recommendations. For instance, the system may dynamically adjust room pricing based on predicted demand spikes, offer targeted promotions to guests with relevant booking histories, or recommend staff schedule adjustments to accommodate increased check-in activity. The system can also generate alerts to ensure that critical resources, such as housekeeping or concierge services, are adequately allocated during high-demand periods.

State management system 500 ensures consistency across temporal and contextual updates, synchronizing changes in room availability, pricing, and staff schedules. For example, when a last-minute cancellation is received, the system updates the availability state across all components and adjusts demand predictions accordingly. Recovery mechanisms, such as checkpoint engine 531, allow the system to restore accurate states in the event of data errors or system interruptions, ensuring operational continuity during peak periods.

In this use case, multi-scale temporal context integration system 100 empowers hotel managers to anticipate and respond to fluctuations in demand, providing guests with seamless and personalized experiences while optimizing operational efficiency. By integrating real-time, contextual, and external event data, the system enables the hotel to remain agile in a dynamic environment, ensuring competitive advantage and guest satisfaction.

In a non-limiting use case example of multi-scale temporal context integration system 100, the system is integrated into a dining application to provide personalized recommendations and enhance user engagement. Input data 101 includes real-time user activity, such as searches for restaurants, interactions with menus, and reservation requests. This data is processed by temporal processing engine 200, where short-term processor 210 analyzes immediate user behavior, such as the cuisine types or price ranges being browsed. Medium-term processor 220 evaluates trends in recent user activity, such as the frequency of dining out or preferences for specific days or times. Long-term processor 230 incorporates historical data, such as a user's dining history, favorite cuisines, and reviews left on prior visits.

Context integration engine 300 processes this temporal data alongside user-specific and domain-specific contextual information. Entity context processor 320 maintains a profile for the user, including preferences for specific dishes, dietary restrictions, and loyalty memberships with certain restaurants. Domain context processor 310 applies rules related to restaurant operations, such as availability of table types, reservation policies, or special offers. Interaction context processor 330 monitors ongoing interactions within the application, such as whether the user is actively browsing for same-day reservations or planning ahead for an event.

Fusion engine 400 integrates these outputs to generate personalized recommendations and insights. For example, the system may suggest restaurants that match the user's current preferences based on real-time activity, such as browsing a specific cuisine category. It may also prioritize restaurants offering discounts or promotions that align with the user's loyalty memberships or past spending habits. Additionally, the system can predict the user's future dining needs by analyzing long-term patterns, such as recommending brunch spots if the user has consistently shown a preference for morning reservations on weekends.

State management system 500 ensures consistency and accuracy across temporal and contextual updates. For example, when the user makes a reservation, the system updates the availability state for the selected restaurant and reflects the booking in the user's profile and the application's recommendation algorithms. Recovery mechanisms, such as checkpoint engine 531, enable the system to restore user preferences or reservations in the event of accidental cancellations or errors during the booking process.

In this use case, multi-scale temporal context integration system 100 provides a highly personalized and seamless dining application experience. Users receive recommendations tailored to their tastes and habits, while restaurants benefit from increased visibility and targeted engagement. By integrating temporal analysis and contextual data, the system enhances decision-making for both users and dining establishments, driving satisfaction and loyalty.

The use case examples described herein are intended to be non-limiting and are provided for illustrative purposes only to demonstrate the versatility and functionality of multi-scale temporal context integration system 100. The range of potential applications for the system is vast and spans diverse fields such as hospitality, healthcare, customer service, retail, and more. Embodiments of the system may vary significantly depending on the specific requirements and contexts of the application, as one skilled in the art would readily recognize. Variations may include modifications to the architecture, configurations of subsystems, and implementation details, all of which can be tailored to optimize performance and meet the unique demands of a given use case without departing from the scope and spirit of the invention.

Multi-Scale Temporal Processing System with Culinary Context Embeddings

Figure 13:
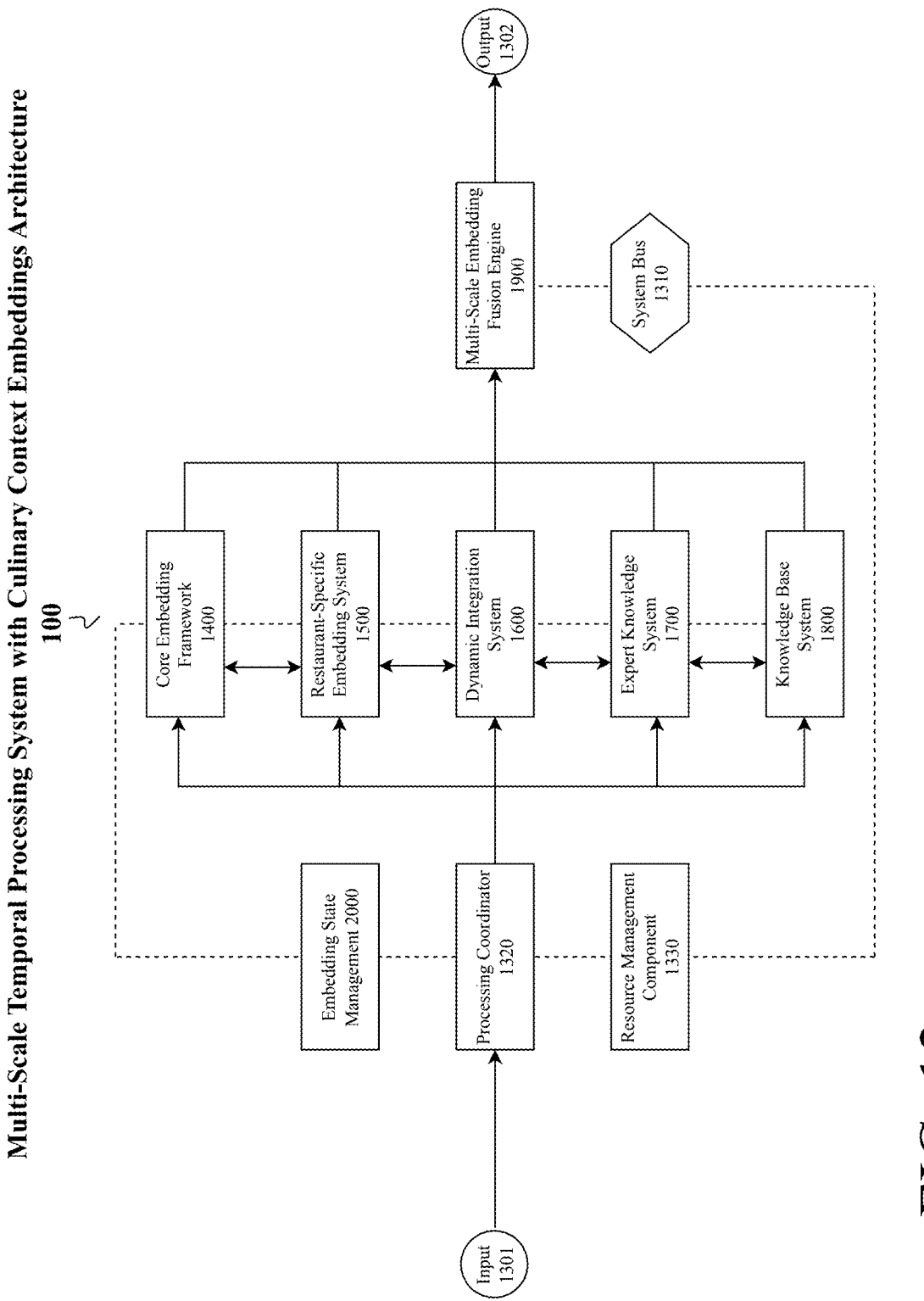
FIG. 13 is a block diagram illustrating exemplary architecture of multi-scale temporal processing system with culinary context embeddings.

FIG. 13 is a block diagram illustrating exemplary architecture of multi-scale temporal processing system with culinary context embeddings 1300, in an embodiment. Multi-scale temporal processing system with culinary context embeddings 1300 processes dining input data 1301 and generates output data 1302 by integrating multiple subsystems designed to maintain temporal coherence and context awareness. System bus 1310 facilitates communication between processing coordinator 1320, resource management component 1330, and interconnected subsystems 1400 through 2000, ensuring efficient data transfer and synchronization across different components.

Processing coordinator 1320 directs dining input data 1301 to appropriate subsystems for analysis and transformation. In an embodiment, processing coordinator 1320 distributes input data across interconnected processing components based on the type of information received, ensuring that subsystems 1400 through 2000 operate on relevant data streams. Resource management component 1330 monitors computational requirements and dynamically adjusts processing loads to optimize performance across the system.

Subsystems 1400 through 1800 perform specialized processing tasks before transmitting data to multi-scale embedding fusion engine 1900. Core embedding framework 1400 processes dining-related embeddings, integrating temporal and contextual representations. Restaurant-specific embedding system 1500 extends base embeddings with dining-related data, ensuring that system 1300 maintains domain-specific knowledge. Dynamic integration and real-time processing system 1600 continuously updates state information, aligning immediate data with historical patterns. Expert knowledge and specialized processing system 1700 enhances contextual understanding by incorporating structured knowledge representations. Knowledge base and pattern analysis system 1800 tracks preference evolution and behavioral patterns, refining embeddings and contextual models over time.

Multi-scale embedding fusion engine 1900 integrates outputs from processing subsystems, aligning embeddings and assigning relative weights to different temporal and contextual features. Multi-scale embedding fusion engine 1900 dynamically adjusts the importance of various inputs to maintain temporal coherence and context relevance throughout the recommendation generation process. In an embodiment, multi-scale embedding fusion engine 1900 applies weighting adjustments based on session progression, dining history, and real-time inputs.

Embedding state management system 2000 maintains synchronization across system 1300 by tracking state transitions and validating coherence between historical and real-time data. Embedding state management system 2000 ensures that embedded representations generated by subsystems 1400 through 1800 remain consistent and adaptable to changing user preferences and evolving dining contexts. In an embodiment, embedding state management system 2000 resolves inconsistencies by updating historical embeddings based on newly identified dining patterns.

Output data 1302 is generated after multi-scale embedding fusion engine 1900 integrates and validates processed embeddings, ensuring that recommendations and contextual insights maintain coherence across time scales. Output data 1302 may reflect personalized dining recommendations, inferred dining patterns, or dynamically adjusted preference representations, allowing downstream applications to provide adaptive and context-aware interactions.

In an embodiment, data flows through multi-scale temporal processing system with culinary context embeddings 1300 beginning with dining input data 1301 entering processing coordinator 1320, which directs relevant information to interconnected subsystems based on temporal, contextual, and computational requirements. Processing coordinator 1320 ensures that dining input data 1301 is distributed efficiently to core embedding framework 1400, restaurant-specific embedding system 1500, dynamic integration and real-time processing system 1600, expert knowledge and specialized processing system 1700, and knowledge base and pattern analysis system 1800, each of which performs specialized processing tasks to extract, refine, and integrate temporal and contextual embeddings. As data progresses through system 1300, multi-scale embedding fusion engine 1900 combines outputs from processing subsystems, adjusting weighting parameters and ensuring temporal coherence across embedded representations. During this process, embedding state management system 2000 tracks state transitions and resolves inconsistencies to maintain alignment between historical and real-time embeddings. Once multi-scale embedding fusion engine 1900 finalizes the integration of processed data, output data 1302 is generated, reflecting dining recommendations, preference updates, or contextual insights that can be used to inform downstream processes and applications.

Various embodiments of multi-scale temporal processing system with culinary context embeddings 1300 are possible, with configurations varying based on available resources, computational constraints, or system requirements. In some embodiments, certain components may be omitted, combined, or modified while maintaining core functionality related to temporal coherence and contextual integration. For example, multi-scale embedding fusion engine 1900 may process a subset of embeddings when limited computing resources are available, or embedding state management system 2000 may operate with reduced historical tracking in real-time optimization scenarios. The arrangement and interaction of processing coordinator 1320, resource management component 1330, and subsystems 1400 through 2000 may be adjusted based on implementation priorities, ensuring flexibility in how system 1300 adapts to different use cases without departing from its overall operational principles.

Figure 14A:
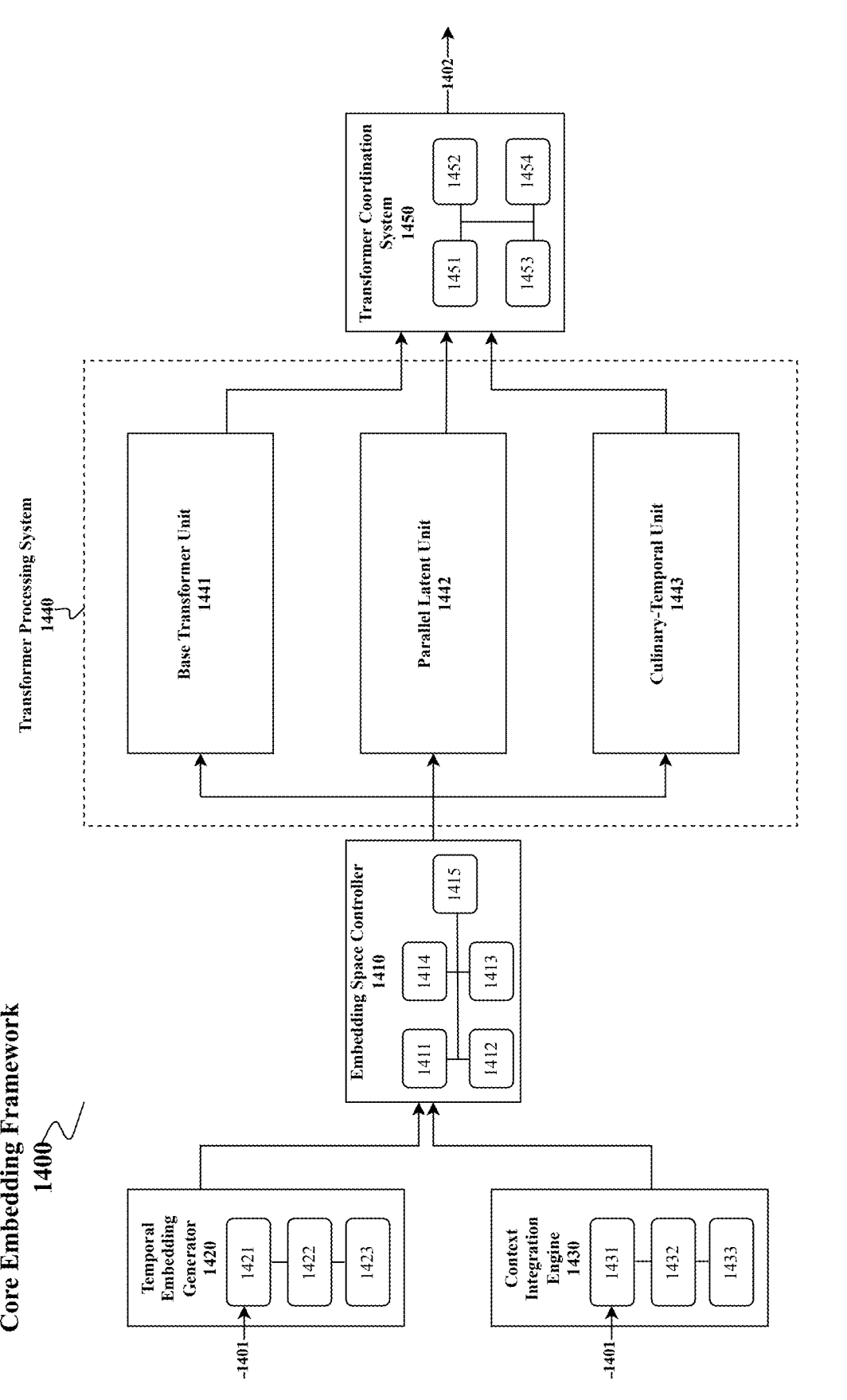
FIG. 14A is a block diagram illustrating exemplary architecture of block diagram for core embedding framework.

FIG. 14A is a block diagram illustrating exemplary architecture of core embedding framework 1400, in an embodiment. Core embedding framework 1400 processes input data 1401 to generate output data 1402 by transforming temporal and contextual information into structured embeddings that maintain coherence across different time scales and contextual dimensions.

Various embodiments of core embedding framework 1400 may incorporate different transformer architectures depending on computational resources, system requirements, or specific application needs. In an embodiment, base transformer unit 1441 may implement a standard transformer architecture with self-attention layers and feed-forward networks for processing embeddings, while parallel latent transformer unit 1442 may operate as an auxiliary transformer that refines latent representations by capturing relationships not explicitly modeled in primary embeddings. Culinary-temporal transformer unit 1443 may, for example, integrate domain-specific knowledge with temporal embeddings by applying cross-attention mechanisms to align dining history with ingredient-based representations. In some embodiments, transformer processing system 1440 may include additional specialized transformer cores that focus on particular aspects of embedding generation, such as a recurrent-enhanced transformer for sequence modeling or a graph-based transformer for entity relationship mapping. The number and configuration of transformers within system 1400 may be adjusted based on processing constraints, with some embodiments employing lightweight transformers optimized for real-time inference and others utilizing deep transformer stacks for complex multi-scale pattern recognition.

Embedding space controller 1410 manages the high-dimensional vector space where embeddings are stored and updated, facilitating structured representation of temporal and contextual data. In an embodiment, vector space manager 1411 maintains dimensionality constraints, which may include enforcing upper limits on embedding dimensions to optimize computational efficiency while preserving information density. Distance metrics managed by vector space manager 1411 may include cosine similarity or Euclidean distance calculations, ensuring that related embeddings remain spatially proximate within the vector space. Scaling functions applied by vector space manager 1411 may dynamically adjust embedding magnitudes based on input characteristics, such as normalizing embeddings to prevent dominance of high-magnitude vectors in similarity computations. Cross-domain coordinator 1412 aligns embeddings across different domains by establishing relationships between distinct embedding types, which may include linking temporal embeddings with entity-based context representations or mapping dining preferences to historical behavioral trends. In an embodiment, cross-domain coordinator 1412 applies transformation functions that reconcile differences between independently trained embeddings, such as adjusting weight distributions to reflect domain-specific importance. Synchronization engine 1413 ensures consistency by tracking updates across multiple embedding spaces, preventing conflicts that may arise from simultaneous modifications. In an embodiment, synchronization engine 1413 employs version control mechanisms that timestamp and sequence embedding updates, ensuring that the most recent and contextually relevant information is retained when resolving conflicts between competing modifications.

Base pattern generator 1414 produces foundational pattern embeddings that structure data into representations capturing recurring relationships, which may include repeated dining behaviors, seasonal trends, or frequently occurring ingredient pairings. In an embodiment, state transition engine 1415 tracks and encodes transitions between states, generating embeddings that reflect both historical evolution and anticipated changes in dining behavior. For example, state transition engine 1415 may update embeddings when a user's dining preferences shift over time, such as a transition from casual dining preferences to fine dining selections, ensuring that predictive models incorporate evolving trends.

Temporal embedding generator 1420 processes sequential and time-dependent data to generate embeddings that maintain temporal coherence across different time scales. Immediate context processor 1421 encodes real-time state information, ensuring that embeddings reflect current conditions such as active dining sessions, recently ordered meals, or ongoing service interactions. In an embodiment, immediate context processor 1421 continuously updates embeddings as new data becomes available, allowing real-time responsiveness to shifts in user behavior. Historical pattern encoder 1422 generates embeddings for long-term trends, which may include identifying persistent patterns across multiple dining sessions, such as a user's preference for specific cuisine types on weekends. State transition manager 1423 integrates outputs from immediate context processor 1421 and historical pattern encoder 1422, maintaining continuity between short-term and long-term embeddings by dynamically adjusting weight distributions based on recent behavioral shifts.

Context integration engine 1430 generates structured representations of entity relationships, interaction histories, and domain-specific constraints by synthesizing multiple data streams into cohesive embeddings. In an embodiment, entity context generator 1431 processes individual and group-specific embeddings, capturing attributes relevant to diners, restaurants, or contextual entities. For example, entity context generator 1431 may generate separate embeddings for an individual's dietary preferences and group dining behavior, ensuring that system 1400 can differentiate between solo and group dining contexts. Interaction pattern processor 1432 encodes sequential and behavioral data to generate embeddings that track user preferences, service interactions, and response patterns. In an embodiment, interaction pattern processor 1432 may incorporate feedback signals from prior dining experiences, refining interaction embeddings to improve predictive accuracy. Domain context manager 1433 processes structured rules and constraints that define relationships within the system, ensuring that embeddings remain aligned with domain-specific requirements. For example, domain context manager 1433 may enforce rules that differentiate between casual and formal dining environments, refining embeddings to reflect distinctions in service expectations, menu structures, or reservation policies.

Transformer processing system 1440 enhances embeddings by applying attention mechanisms and layered transformations that refine data representations before integration with downstream processes. Base transformer unit 1441 processes embeddings through self-attention layers, feed-forward networks, and normalization functions, allowing embeddings to dynamically adjust based on contextual relationships. In an embodiment, base transformer unit 1441 applies multi-head attention to emphasize critical features within input embeddings, such as assigning higher weight to recent dining interactions when generating short-term dining recommendations. Parallel latent transformer unit 1442 operates alongside base transformer unit 1441, generating additional latent representations that enhance embedding robustness by capturing hidden dependencies within temporal and contextual data. In an embodiment, parallel latent transformer unit 1442 may introduce auxiliary embeddings that model uncertainty in dining predictions, ensuring that the system adapts effectively to ambiguous or evolving user preferences. Culinary-temporal transformer unit 1443 integrates embeddings from temporal and culinary sources, applying cross-attention mechanisms to align structured knowledge with real-time data. For example, culinary-temporal transformer unit 1443 may reconcile ingredient embeddings with historical dining patterns to generate context-aware dish recommendations.

Transformer coordination system 1450 synchronizes outputs from transformer processing system 1440, ensuring that generated embeddings maintain consistency across system 1400. In an embodiment, transformer coordination system 1450 dynamically adjusts weighting parameters based on session progression, reinforcing the influence of immediate interactions in active dining sessions while maintaining long-term coherence. Output data 1402 is produced after embedding representations have been processed, refined, and validated, ensuring that downstream systems receive structured and temporally coherent embeddings capable of supporting adaptive and context-aware recommendations.

In an embodiment, core embedding framework 1400 may incorporate machine learning models to generate, refine, and maintain embeddings across temporal, contextual, and domain-specific dimensions. These models may include, for example, transformer-based architectures, recurrent neural networks, or graph-based models, depending on computational resources and specific system requirements. Transformer-based models may be used to process sequential dining interactions, applying self-attention mechanisms to capture dependencies between past dining experiences and immediate context. Recurrent neural networks, such as long short-term memory (LSTM) networks or gated recurrent units (GRUs), may be employed to track dining preference evolution over time, identifying trends in user behavior that inform embedding updates. Graph-based neural networks may be utilized to model relationships between entities such as diners, restaurants, menu items, and ingredients, ensuring that embeddings reflect structural relationships within the data.

Training of machine learning models within system 1400 may be performed using a combination of supervised, unsupervised, and reinforcement learning techniques. In an embodiment, supervised learning may be applied when labeled data is available, such as historical dining interactions annotated with user preferences, service outcomes, or satisfaction ratings. Training data may include structured datasets containing restaurant visit history, dining session logs, ingredient compositions, and real-time user interactions, allowing models to learn associations between temporal and contextual factors. Unsupervised learning techniques, such as clustering or autoencoders, may be employed to identify latent structures within the data, extracting patterns that inform embedding representations. For example, embeddings may be refined by clustering similar dining experiences based on contextual features, enabling system 1400 to generalize preference patterns across users with similar behavioral profiles.

Reinforcement learning may, in an embodiment, be used to optimize adaptive embeddings by continuously updating model parameters based on real-time user interactions and feedback. A reinforcement learning agent may receive rewards for generating embeddings that improve recommendation accuracy or enhance dining session coherence, allowing the system to dynamically adjust its representations over time. Training data for reinforcement learning may include sequential user feedback, dining selection modifications, and service engagement patterns, ensuring that embeddings evolve in response to real-world interactions. Model training may be conducted using distributed processing architectures, enabling embeddings to be updated asynchronously as new data becomes available. In an embodiment, transfer learning techniques may be used to fine-tune pre-trained models on domain-specific data, leveraging existing embeddings trained on general dining behavior while adapting them to the unique contextual requirements of system 1400.

In an embodiment, data flows through core embedding framework 1400 beginning with input data 1401 entering embedding space controller 1410, where vector space manager 1411 assigns dimensionality constraints and scaling functions to ensure consistency across embeddings. Cross-domain coordinator 1412 aligns input embeddings with existing representations, facilitating integration between temporal, contextual, and domain-specific data. Synchronization engine 1413 tracks updates across embedding spaces, resolving conflicts and ensuring coherence in dynamically changing representations. Base pattern generator 1414 structures input data into foundational embeddings, while state transition engine 1415 encodes transitions between states, refining embeddings to reflect evolving dining behaviors. Temporal embedding generator 1420 processes sequential and time-dependent data, distributing information between immediate context processor 1421 for real-time state encoding and historical pattern encoder 1422 for long-term trend analysis. State transition manager 1423 integrates outputs from temporal embedding generator 1420, ensuring continuity between immediate and historical representations. Context integration engine 1430 generates structured representations of entity relationships, interaction sequences, and domain constraints, with entity context generator 1431 processing individual and group attributes, interaction pattern processor 1432 tracking behavioral sequences, and domain context manager 1433 maintaining rule-based constraints. Transformer processing system 1440 refines embeddings by applying attention mechanisms through base transformer unit 1441, latent space modeling through parallel latent transformer unit 1442, and culinary-temporal alignment through culinary-temporal transformer unit 1443. Transformer coordination system 1450 synchronizes transformer outputs, ensuring embeddings maintain temporal coherence before output data 1402 is generated, providing structured and contextually enriched representations for downstream processing.

Figure 14B:
FIG. 14B is a block diagram illustrating exemplary architecture of base transformer unit.

FIG. 14B is a block diagram illustrating exemplary architecture of base transformer unit 1441, in an embodiment. Base transformer unit 1441 processes embeddings using attention mechanisms and feed-forward transformations to refine temporal and contextual representations before integration with downstream components of system 1400. Input embeddings enter input processing layer 1441A, where tokenization and position encoding functions may be applied to structure input data for transformer-based operations. Multi-head attention layer 1441B applies self-attention mechanisms to capture dependencies between embeddings, weighting relationships based on context relevance. In an embodiment, attention mechanisms may emphasize recent dining interactions when processing short-term embeddings while preserving historical trends in long-term representations. Feed-forward network 1441C enhances embeddings through non-linear transformations, adjusting vector magnitudes and distributions to optimize feature separability. Layer normalization 1441D stabilizes transformer computations by normalizing activation outputs, ensuring numerical consistency across processing steps. Output generation component 1441E produces refined embeddings, which may be forwarded to additional processing layers or integrated with outputs from other transformers within transformer processing system 1440. In some embodiments, multiple transformer layers may be present, each progressively refining embeddings by capturing increasingly complex relationships between input features. Base transformer unit 1441 may be trained using a combination of supervised and unsupervised learning techniques, where training data may include historical dining sequences, service interaction logs, and contextual embeddings generated from domain-specific knowledge bases. Pretraining may involve self-supervised learning on large-scale dining datasets, followed by fine-tuning on task-specific objectives such as personalized recommendation accuracy or dining session coherence.

Figure 14C:
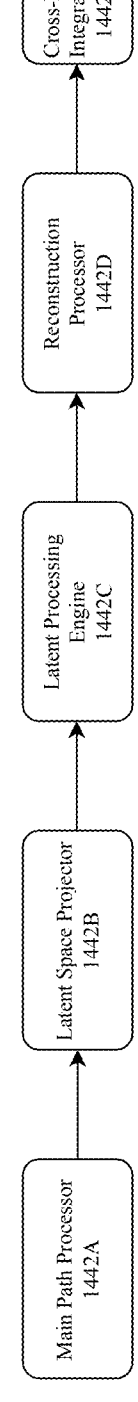
FIG. 14C is a block diagram illustrating exemplary architecture of parallel latent transformer unit.

FIG. 14C is a block diagram illustrating exemplary architecture of parallel latent transformer unit 1442, in an embodiment. Parallel latent transformer unit 1442 operates alongside base transformer unit 1441, generating latent representations that supplement primary embeddings with additional contextual refinements. Main path processor 1442A receives input embeddings and applies standard transformer operations, including self-attention and feed-forward transformations, to process initial representations. Latent space projector 1442B maps embeddings into a latent representation space, where additional computations refine embeddings by capturing implicit relationships that may not be fully represented in direct attention-based processing. Latent processing engine 1442C performs transformations within the latent space, applying additional attention weighting, contrastive learning, or hierarchical modeling techniques to extract abstract features from input embeddings.

Reconstruction processor 1442D maps latent representations back into the primary embedding space, ensuring that refinements introduced in the latent domain align with structured embedding formats used throughout system 1400. Cross-path integration component 1442E facilitates bidirectional information flow between the main processing path and the latent space, dynamically adjusting weight distributions between explicit and latent embeddings based on contextual importance. In an embodiment, multiple layers of latent transformation may be present, with each successive layer refining embeddings by extracting progressively higher-order features from temporal and contextual relationships. Training of parallel latent transformer unit 1442 may include self-supervised contrastive learning on large-scale behavioral datasets, enabling the model to distinguish between subtle variations in dining patterns, service interactions, and long-term preference evolution. Fine-tuning may involve reinforcement learning techniques that adjust latent representation weighting based on real-time user feedback, allowing system 1400 to adapt dynamically to changing dining contexts.

Figure 14D:
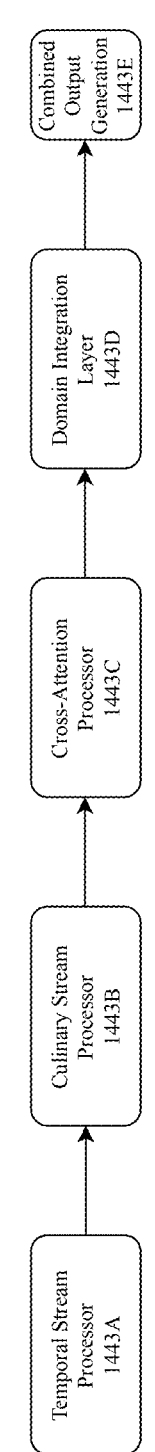
FIG. 14D is a block diagram illustrating exemplary architecture of culinary-temporal transformer unit.

FIG. 14D is a block diagram illustrating exemplary architecture of culinary-temporal transformer unit 1443, in an embodiment. Culinary-temporal transformer unit 1443 integrates embeddings from temporal and culinary sources, aligning structured knowledge representations with dynamic user interaction data. Temporal stream processor 1443A processes embeddings derived from dining sessions, preference histories, and behavioral trends, ensuring that sequential dependencies between dining interactions are preserved. Culinary stream processor 1443B processes embeddings associated with dish compositions, ingredient hierarchies, and preparation techniques, structuring culinary knowledge into vectorized formats compatible with system 1400. Cross-attention processor 1443C facilitates alignment between temporal and culinary embeddings by applying cross-attention mechanisms that associate dining behavior patterns with ingredient-level preferences, menu structures, and regional cuisine influences. In an embodiment, cross-attention processor 1443C may prioritize real-time dining session data when generating immediate recommendations while incorporating long-term culinary knowledge for trend-based preference modeling. Domain integration layer 1443D ensures embeddings remain aligned with structured domain constraints, such as dietary restrictions, service protocols, or cultural dining conventions. Combined output generator 1443E synthesizes refined embeddings, merging contextual relationships between temporal dining behaviors and culinary knowledge to enhance downstream processing within system 1400. Culinary-temporal transformer unit 1443 may include multiple layers, with early layers focusing on low-level ingredient and dish attributes while deeper layers capture broader culinary trends and dining behaviors. Training may involve multimodal learning on datasets combining structured recipe data, restaurant menus, and dining history logs, allowing the model to develop nuanced associations between culinary elements and user preferences. Transfer learning techniques may be applied, where a general-purpose transformer trained on diverse food-related datasets is fine-tuned using regional or culturally specific data, ensuring adaptability across different dining environments.

Figure 15:
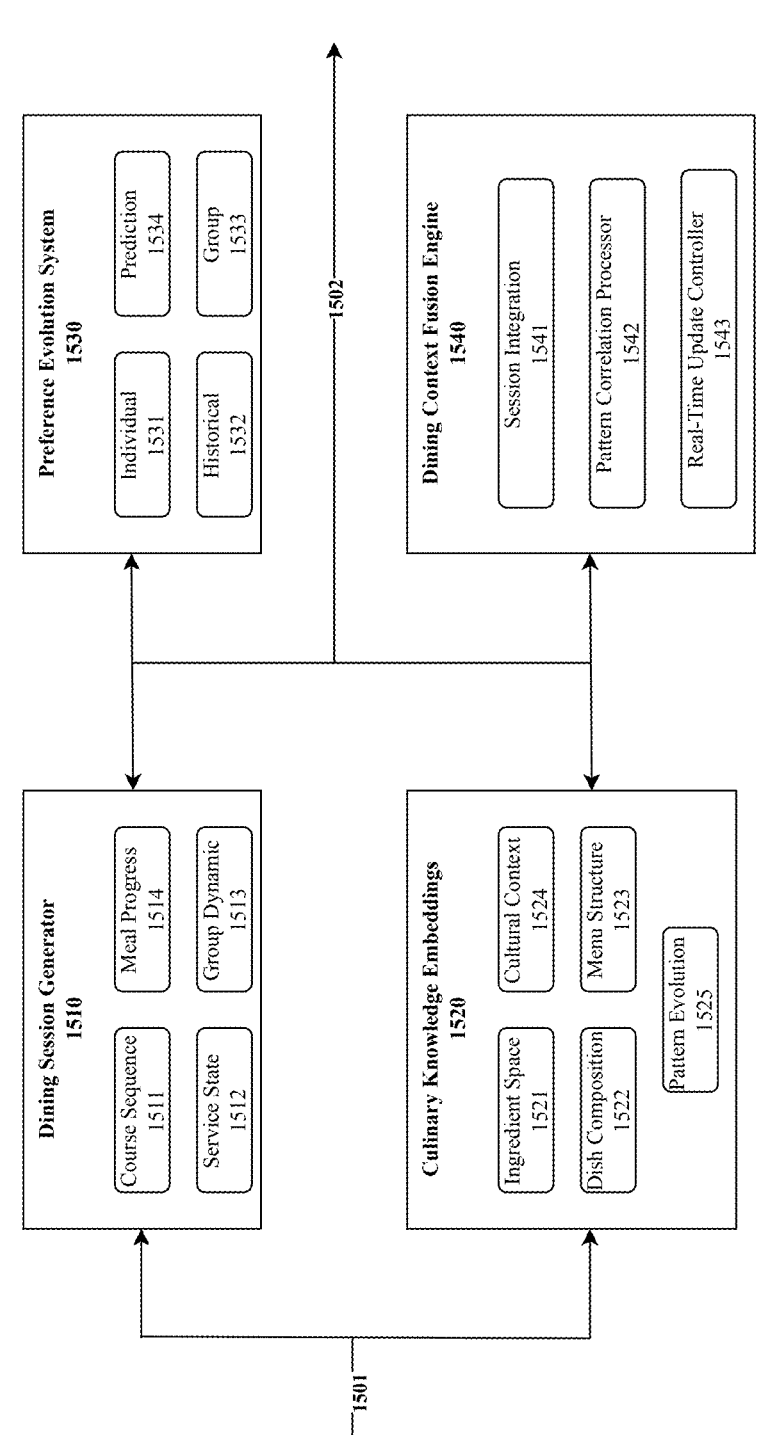
FIG. 15 is a block diagram illustrating exemplary architecture of restaurant-specific system.

FIG. 15 is a block diagram illustrating exemplary architecture of restaurant-specific system 1500, in an embodiment. Restaurant-specific system 1500 processes input data 1501 and generates output data 1502 by integrating dining session information, culinary knowledge, and contextual preference tracking.

Dining session embedding generator 1510 encodes real-time dining session data, maintaining structured representations of ordering patterns, service progress, and group dining dynamics. In an embodiment, dining session embedding generator 1510 may track multiple aspects of the dining experience, such as variations in meal pacing, server interactions, and order modifications, ensuring that embeddings evolve to reflect real-time conditions. Course sequence processor 1511 structures embeddings related to meal progression, encoding the order of courses, expected service timing, and dish pairings. For example, course sequence processor 1511 may generate embeddings that capture transitions between appetizer, entrée, and dessert courses, aligning timing patterns with user preferences for dining pace. Service state tracker 1512 maintains real-time embeddings for table status, service interactions, and fulfillment of orders, ensuring that dining experiences remain coherent across different time scales. In an embodiment, service state tracker 1512 may dynamically adjust embeddings to reflect changes in dining session conditions, such as modifications to table assignments, delays in meal delivery, or special service requests. Group dynamic encoder 1513 generates embeddings that reflect shared dining preferences, tracking interactions between diners, collaborative ordering behaviors, and adjustments made based on group feedback. For example, group dynamic encoder 1513 may identify common taste preferences across a party, ensuring that recommendations align with both individual and collective dining habits. Meal progression engine 1514 refines dining session embeddings by monitoring course timing sequences, identifying deviations from expected service pacing, and maintaining embeddings that represent the flow of a dining experience. In an embodiment, meal progression engine 1514 may adjust embeddings based on observed dining trends, such as prolonging meal pacing for celebratory occasions or expediting service in response to time-sensitive user interactions.

Culinary knowledge embeddings 1520 generate structured representations of ingredient relationships, dish compositions, and menu structures, ensuring that restaurant-specific data is integrated with broader culinary knowledge. Ingredient space manager 1521 structures embeddings for individual ingredients, tracking relationships between ingredient categories, substitutions, and regional availability. For example, ingredient space manager 1521 may maintain embeddings that associate substitute ingredients based on flavor profiles, enabling dynamic adjustments when a specific ingredient is unavailable. Dish composition engine 1522 processes embeddings for preparation methods, cooking techniques, portion sizes, and plating styles, ensuring that dish representations maintain contextual coherence. In an embodiment, dish composition engine 1522 may refine embeddings based on preparation variations, such as different cooking methods for the same dish across regional cuisines. Menu structure processor 1523 encodes relationships between menu items, structuring embeddings that reflect section placement, cross-course dependencies, and special item classifications. For example, menu structure processor 1523 may capture dependencies between prix fixe menu items, ensuring that selections align with predefined course combinations. In an embodiment, menu structure processor 1523 may track seasonal menu changes, adjusting embeddings dynamically to reflect the introduction of limited-time offerings or modifications to pricing structures. Cultural context encoder 1524 integrates embeddings for cuisine-specific influences, tracking regional variations in dish compositions, ingredient preferences, and presentation styles. In an embodiment, cultural context encoder 1524 may generate embeddings that align with dietary customs, ensuring that recommendations reflect cultural dining expectations, such as ingredient restrictions or preferred preparation styles. Pattern evolution tracker 1525 refines embeddings by maintaining representations of recurring trends in dining preferences, service interactions, and menu selections over time, ensuring that system 1500 adapts to evolving customer behaviors. For example, pattern evolution tracker 1525 may identify increasing demand for plant-based menu items and refine embeddings accordingly, ensuring that plant-based dining recommendations remain contextually relevant.

Preference evolution system 1530 generates embeddings that model individual and group-level dining preferences, ensuring that restaurant-specific system 1500 maintains continuity between historical patterns and real-time adjustments. Individual preference tracker 1531 structures embeddings for user-specific taste profiles, price sensitivity patterns, and evolving dietary considerations. For example, individual preference tracker 1531 may update embeddings based on changes in user ordering behavior, such as an increasing preference for low-carb options. Historical pattern analyzer 1532 tracks past dining interactions, refining embeddings based on preference consistency, frequency of selections, and recurring modifications. In an embodiment, historical pattern analyzer 1532 may generate trend embeddings that highlight persistent ordering behaviors, ensuring that personalized recommendations align with long-term user tendencies. Group preference manager 1533 processes shared preference embeddings, identifying overlapping taste profiles and resolving potential conflicts in group ordering behaviors. For example, group preference manager 1533 may balance conflicting dietary restrictions within a dining party by suggesting dishes that accommodate all preferences. Preference prediction engine 1534 generates forward-looking embeddings that anticipate future preference shifts, incorporating factors such as seasonal dining patterns, external influences, and past adaptations in user selections. In an embodiment, preference prediction engine 1534 may analyze historical ordering patterns to predict likelihoods of future selections, refining embeddings to align with anticipated user behavior.

Dining context fusion engine 1540 integrates outputs from dining session embedding generator 1510, culinary knowledge embeddings 1520, and preference evolution system 1530, ensuring that embeddings maintain coherence across different aspects of restaurant-specific system 1500. Session integration manager 1541 aligns real-time dining embeddings with historical dining trends, adjusting weight distributions to reflect the influence of immediate dining context. For example, session integration manager 1541 may assign higher weights to real-time dining preferences during active dining sessions while preserving long-term embeddings for historical trend analysis. Pattern correlation processor 1542 identifies relationships between dining session embeddings, culinary knowledge embeddings, and preference evolution embeddings, ensuring that structured representations account for both temporal and contextual dependencies. In an embodiment, pattern correlation processor 1542 may refine embeddings by detecting emerging dining trends, such as increased demand for specific cuisines based on seasonal preferences. Real-time update controller 1543 dynamically adjusts embeddings based on ongoing dining interactions, ensuring that changes in dining behavior, service flow, and user feedback are incorporated into system 1500. For example, real-time update controller 1543 may update preference embeddings in response to user modifications during a dining session, allowing the system to adapt to immediate user inputs. Output data 1502 is generated after embeddings have been processed and refined, ensuring that structured representations maintain consistency across dining sessions, menu structures, and preference evolutions. In an embodiment, output data 1502 may include structured embeddings that inform downstream processing tasks such as recommendation generation, dining session state tracking, or real-time service optimization.

In an embodiment, restaurant-specific system 1500 may incorporate machine learning models to generate, refine, and maintain embeddings related to dining sessions, culinary knowledge, and user preferences. These models may, for example, include transformer-based architectures, recurrent neural networks, or graph-based learning models, depending on computational resources and system objectives. Transformer-based models may be used to process sequential dining interactions, applying self-attention mechanisms to capture dependencies between past dining experiences and immediate session details. Recurrent neural networks, such as long short-term memory (LSTM) networks or gated recurrent units (GRUs), may be employed to track evolving dining preferences over time, identifying long-term patterns in user behavior. Graph-based neural networks may be utilized to model relationships between menu items, ingredient compositions, and dining establishments, ensuring that embeddings reflect structured relationships between different elements of system 1500.

Training of machine learning models within system 1500 may, for example, be performed using a combination of supervised, unsupervised, and reinforcement learning techniques. Supervised learning may be applied when labeled data is available, such as historical dining session records annotated with user feedback, service quality ratings, or ordering behaviors. Training data may include structured datasets containing visit histories, dining session logs, real-time service updates, and contextual embeddings generated from culinary knowledge bases. Unsupervised learning techniques, such as clustering or autoencoders, may be employed to extract latent structures from dining behavior data, identifying recurring patterns that inform embedding representations. For example, embeddings may be refined by clustering similar dining experiences based on menu selection trends, seating preferences, or service interaction patterns, enabling system 1500 to generalize recommendations across users with similar behaviors.

Reinforcement learning may, in an embodiment, be used to optimize adaptive embeddings by continuously updating model parameters based on real-time user interactions and feedback. A reinforcement learning agent may receive rewards for generating embeddings that improve recommendation accuracy, enhance dining session coherence, or optimize service flow efficiency. Training data for reinforcement learning may include sequential user feedback, dining selection modifications, service ratings, and real-time adjustments to menu selections. Model training may be conducted using distributed processing architectures, allowing embeddings to be updated asynchronously as new data becomes available. In an embodiment, transfer learning techniques may be applied, where a general-purpose model trained on large-scale restaurant datasets is fine-tuned using region-specific or cuisine-specific data, ensuring adaptability to different restaurant environments. Additionally, online learning may be used to dynamically refine embeddings in response to changing user behaviors, allowing system 1500 to continuously adapt to emerging dining trends and evolving customer preferences.

In an embodiment, data flows through restaurant-specific system 1500 beginning with input data 1501 entering dining session embedding generator 1510, where ordering patterns, service progress, and group dining dynamics are structured into embeddings. Course sequence processor 1511 encodes meal progression, ensuring embeddings capture transitions between courses and expected service pacing, while service state tracker 1512 updates embeddings to reflect real-time table status, server interactions, and order fulfillment. Group dynamic encoder 1513 refines embeddings based on shared preferences, tracking collaborative ordering behaviors and adjustments made during the dining session. Culinary knowledge embeddings 1520 generate structured representations of ingredient relationships, dish compositions, and menu structures, with ingredient space manager 1521 encoding ingredient compatibility and substitution mappings, dish composition engine 1522 refining embeddings for preparation methods and presentation styles, and menu structure processor 1523 encoding menu hierarchies and cross-course dependencies. Cultural context encoder 1524 aligns embeddings with cuisine-specific influences, while pattern evolution tracker 1525 monitors preference shifts and recurring trends. Preference evolution system 1530 maintains user-specific and group-level preference embeddings, with individual preference tracker 1531 updating embeddings based on real-time dining behaviors, historical pattern analyzer 1532 refining representations based on past selections, and group preference manager 1533 resolving preference conflicts. Preference prediction engine 1534 generates forward-looking embeddings to anticipate future selection trends. Dining context fusion engine 1540 integrates embeddings from dining session embedding generator 1510, culinary knowledge embeddings 1520, and preference evolution system 1530, ensuring coherence across multiple dimensions. Session integration manager 1541 aligns real-time dining embeddings with historical trends, pattern correlation processor 1542 identifies dependencies between structured representations, and real-time update controller 1543 dynamically adjusts embeddings to reflect changes in dining behavior. Output data 1502 is generated after embeddings have been processed and refined, ensuring that structured representations remain contextually relevant and temporally coherent for downstream processing.

FIG. 16 is a block diagram illustrating exemplary architecture of dynamic integration system 1600, in an embodiment. Dynamic integration system 1600 processes input data 1601 and generates output data 1602 by coordinating real-time state management, service flow optimization, dynamic adaptation, and integration validation.

Real-time state manager 1610 tracks active dining sessions, updating state representations as new information becomes available. In an embodiment, real-time state manager 1610 may process input from multiple sources, including user interactions, service staff updates, and external environmental conditions, ensuring that embeddings accurately reflect real-time dining dynamics. Active session controller 1611 maintains structured embeddings that reflect current session conditions, adjusting state representations based on ongoing user interactions, service updates, and preference modifications. For example, active session controller 1611 may update state embeddings when a customer modifies an order, changes a dining preference, or interacts with service staff regarding meal customization. State transition processor 1612 encodes state changes, ensuring that updates maintain coherence between immediate dining conditions and historical patterns. In an embodiment, state transition processor 1612 may generate embeddings that reflect changes in dining behaviors, such as a shift from fast-casual dining preferences to more elaborate multi-course meals, allowing system 1600 to refine future predictions. Coherence monitor 1613 validates state transitions by detecting inconsistencies and ensuring that adjustments align with recognized behavioral trends. For example, coherence monitor 1613 may reconcile conflicts between real-time session updates and long-term dining history, ensuring that sudden preference changes do not override previously established patterns unless explicitly confirmed by user behavior. Dynamic preference handler 1614 refines preference embeddings in real time, incorporating immediate feedback from diners, modifying taste profiles dynamically, and resolving discrepancies in group ordering behavior. In an embodiment, dynamic preference handler 1614 may adjust weight distributions in user preference embeddings based on session-specific influences, such as recommending spicier dishes after a user repeatedly selects heat-adjusted meal options.

Service flow controller 1620 manages order processing, resource allocation, and service timing adjustments, ensuring that system 1600 optimizes dining operations. In an embodiment, service flow controller 1620 may balance efficiency with personalized dining pacing, ensuring that structured embeddings reflect both logistical constraints and user expectations. Order processing engine 1621 maintains structured embeddings that track order sequences, dish preparation timing, and service pacing. For example, order processing engine 1621 may generate embeddings that represent interdependencies between multiple courses, ensuring that dishes are prepared and served in an optimal sequence to align with anticipated meal pacing. In an embodiment, order processing engine 1621 refines embeddings to reflect dependencies between multi-course meals, ensuring that service timing aligns with expected dining preferences. Resource allocation manager 1622 monitors service capacity, table availability, and staff workload, adjusting embeddings to ensure that resources are optimally distributed. For example, resource allocation manager 1622 may prioritize staff assignments based on demand, dynamically adjusting service flow embeddings to reduce wait times while maintaining optimal dining experiences. Service queue optimizer 1623 prioritizes service tasks based on session conditions, adjusting ordering and fulfillment sequences to minimize delays while maintaining coherence between user expectations and operational constraints. In an embodiment, service queue optimizer 1623 may refine embeddings by analyzing patterns in service delays, adjusting prioritization mechanisms to anticipate potential bottlenecks before they impact the dining experience.

Dynamic adaptation engine 1630 continuously refines embeddings by tracking behavioral trends, detecting emerging patterns, and adjusting processing priorities. In an embodiment, dynamic adaptation engine 1630 may integrate preference evolution models that adjust recommendations dynamically based on session-specific cues, ensuring that system 1600 adapts to shifts in user behavior. Pattern recognition processor 1631 identifies recurring user behaviors, generating embeddings that reflect dining tendencies, meal preferences, and session-level modifications. For example, pattern recognition processor 1631 may detect a recurring preference for specific cuisines based on seasonal dining behaviors, ensuring that adaptive recommendations align with evolving trends. Real-time learning component

1632 updates preference models by incorporating new user interactions, refining embeddings to improve responsiveness to evolving trends. In an embodiment, real-time learning component 1632 may adjust weight distributions between short-term and long-term embeddings, ensuring that adaptive responses prioritize immediate context while preserving historical insights. Adaptive response generator 1633 processes state modifications dynamically, adjusting system outputs to reflect session-specific changes, user feedback, and environmental influences. For example, adaptive response generator 1633 may refine recommendation embeddings mid-session in response to real-time feedback, such as suggesting alternative dish pairings after detecting dissatisfaction with a previously recommended selection. State evolution controller 1634 tracks long-term preference shifts, generating embeddings that maintain continuity across multiple dining sessions, service interactions, and behavioral patterns. In an embodiment, state evolution controller 1634 may incorporate reinforcement learning techniques that optimize embeddings over extended time frames, ensuring that preference models adapt gradually without overfitting to temporary fluctuations in user behavior.

Integration validation system 1640 ensures that embeddings processed within system 1600 remain coherent, consistent, and aligned with broader system operations. In an embodiment, integration validation system 1640 may compare newly generated embeddings against historical models, ensuring that refinements maintain compatibility with existing preference structures. Cross-component validator 1641 verifies embeddings across different subsystems, ensuring that state transitions and preference updates maintain structural integrity. For example, cross-component validator 1641 may reconcile conflicts between short-term dining session embeddings and long-term preference models, preventing sudden, inconsistent shifts in recommendation outputs. Performance monitor 1642 tracks processing latency, prediction accuracy, and service response times, adjusting embeddings to optimize system performance. In an embodiment, performance monitor 1642 refines embeddings by analyzing real-time user engagement metrics, ensuring that adaptive processing aligns with user expectations. For example, performance monitor 1642 may dynamically adjust weight distributions in preference embeddings to balance recommendation accuracy with real-time responsiveness. Error recovery controller 1643 identifies inconsistencies, resolves conflicts in state transitions, and restores embeddings to valid states when discrepancies arise. For example, error recovery controller 1643 may detect erroneous preference shifts due to external data noise, reverting affected embeddings to the most contextually relevant prior state. Cross-scale fusion engine 1650 aligns embeddings across different temporal resolutions, integrating multi-scale representations into structured outputs that maintain coherence across time scales. In an embodiment, cross-scale fusion engine 1650 may dynamically adjust weight distributions between short-term and long-term embeddings, refining structured representations to optimize preference tracking across multiple dining sessions. Fusion component 1651 dynamically adjusts weight distributions between embeddings, refining structured representations based on session conditions, historical influences, and real-time updates. Pattern integration system 1652 processes cross-pattern relationships, ensuring that embeddings incorporate structured dependencies between behavioral trends, service interactions, and preference modifications. For example, pattern integration system 1652 may identify co-occurring dining behaviors, refining embeddings to improve future meal recommendations based on established preference correlations. Output data 1602 is generated after embeddings have been processed, validated, and refined, ensuring that structured representations maintain contextual relevance and system-wide coherence. In an embodiment, output data 1602 may serve as input to downstream recommendation engines, session state managers, or adaptive preference models, ensuring that real-time and long-term insights remain seamlessly integrated across system 1600.

In an embodiment, dynamic integration system 1600 may incorporate machine learning models to refine state tracking, optimize service flow, and adapt embeddings based on real-time interactions. These models may, for example, include transformer-based architectures for sequence modeling, recurrent neural networks for preference evolution, and reinforcement learning frameworks for optimizing real-time adjustments. Transformer-based models may apply self-attention mechanisms to detect relationships between historical dining data and real-time session interactions, ensuring that embeddings reflect both long-term trends and immediate contextual changes. Recurrent neural networks, such as long short-term memory (LSTM) networks or gated recurrent units (GRUs), may track evolving preferences by analyzing sequential order histories and identifying user behavior patterns over time. Reinforcement learning models may optimize adaptive embeddings by dynamically updating system 1600's decision-making processes based on user engagement and session-specific feedback.

Training of machine learning models within system 1600 may, for example, be performed using a combination of supervised, unsupervised, and reinforcement learning techniques. Supervised learning may be applied when labeled data is available, such as historical dining session records annotated with user satisfaction ratings, meal timing preferences, or service adjustments. Training data may include structured datasets containing dining interactions, service progression logs, kitchen fulfillment times, and customer feedback, ensuring that models learn patterns from real-world dining behaviors. Unsupervised learning techniques, such as clustering or autoencoders, may be employed to extract latent structures from dining patterns, identifying recurring trends that inform state evolution embeddings. For example, embeddings may be refined by clustering similar meal pacing preferences across different dining sessions, allowing system 1600 to generalize timing optimizations based on session context.

Reinforcement learning may, in an embodiment, be used to optimize adaptive response generation by continuously updating preference models based on real-time user behavior. A reinforcement learning agent may receive rewards for minimizing service delays, improving dining session coherence, or refining recommendation accuracy. Training data for reinforcement learning may include sequential user feedback, service efficiency metrics, and session-specific modifications to orders or pacing, allowing the model to learn optimal adjustments dynamically. In an embodiment, transfer learning techniques may be applied, where a general-purpose reinforcement learning model trained on large-scale restaurant data is fine-tuned for specific dining environments, ensuring adaptability across different operational conditions. Additionally, online learning may be employed to refine embeddings in response to new user interactions, allowing system 1600 to continuously adapt to emerging trends, preference shifts, and evolving service expectations.

In an embodiment, data flows through dynamic integration system 1600 beginning with input data 1601 entering real-time state manager 1610, where active session controller 1611 maintains structured representations of ongoing dining interactions, adjusting embeddings to reflect real-time updates. State transition processor 1612 encodes modifications to dining session states, ensuring that transitions between ordering phases, service events, and preference updates remain coherent. Coherence monitor 1613 validates these transitions, detecting inconsistencies and resolving conflicts to maintain alignment with historical trends. Dynamic preference handler 1614 refines preference embeddings in response to immediate user feedback, adjusting taste profiles and modifying group dining representations as user selections evolve. Service flow controller 1620 processes order sequences through order processing engine 1621, optimizing dish preparation timing and ensuring that multi-course meals are paced according to contextual preferences. Resource allocation manager 1622 dynamically adjusts staffing and service distribution, optimizing resource embeddings to minimize delays while maintaining personalized dining experiences. Service queue optimizer 1623 prioritizes service tasks, refining structured representations to reflect table availability, workload balancing, and anticipated session timing adjustments. Dynamic adaptation engine 1630 tracks evolving dining behaviors, with pattern recognition processor 1631 identifying recurring trends and real-time learning component 1632 refining preference models based on immediate and historical data. Adaptive response generator 1633 modifies system outputs in real time, ensuring that responses remain aligned with session-specific conditions, while state evolution controller 1634 maintains long-term consistency across dining experiences. Integration validation system 1640 ensures coherence across all embeddings by verifying state transitions through cross-component validator 1641, optimizing computational efficiency with performance monitor 1642, and resolving inconsistencies via error recovery controller 1643. Cross-scale fusion engine 1650 aligns embeddings at multiple temporal resolutions, with fusion component 1651 adjusting weight distributions and pattern integration system 1652 ensuring dependencies between dining behaviors, service adjustments, and real-time modifications are preserved. Output data 1602 is generated once embeddings have been refined, validated, and structured, ensuring that downstream processing maintains coherence across dynamic updates, historical trends, and real-time dining interactions.

FIG. 17 is a block diagram illustrating exemplary architecture of expert knowledge system 1700, in an embodiment. Expert knowledge system 1700 processes input data 1701 and generates output data 1702 by integrating structured culinary knowledge, service expertise, dietary considerations, and beverage recommendations.

Culinary knowledge integration engine 1710 encodes structured representations of ingredient properties, cooking techniques, and dish preparation methodologies, ensuring that embeddings remain aligned with domain-specific knowledge. In an embodiment, culinary knowledge integration engine 1710 may refine structured representations by integrating multi-regional cooking traditions, allowing embeddings to capture variations in preparation techniques across different culinary cultures. Recipe processing system 1711 generates embeddings for dish compositions, tracking ingredient dependencies, preparation steps, and plating styles. For example, recipe processing system 1711 may structure embeddings to reflect dish variations, ensuring that the same base dish is encoded with different preparation techniques, such as grilled versus braised proteins. In an embodiment, recipe processing system 1711 refines embeddings by incorporating cooking durations, temperature profiles, and regional adaptations, ensuring that structured representations capture variations in preparation methods. Ingredient knowledge manager 1712 structures embeddings for ingredient properties, tracking relationships between ingredient families, seasonal availability, and substitution compatibility. For example, ingredient knowledge manager 1712 may adjust embeddings to prioritize substitutions that maintain textural or flavor consistency, ensuring that alternative ingredients align with the intended dish profile. Technique analysis engine 1713 processes embeddings related to cooking methodologies, ensuring that structured representations align with traditional and modern preparation techniques. In an embodiment, technique analysis engine 1713 may dynamically refine embeddings to incorporate sous-vide cooking, fermentation techniques, or molecular gastronomy methods, ensuring that evolving culinary techniques remain represented. Preparation knowledge system 1714 refines embeddings by integrating multi-step cooking sequences, kitchen workflow constraints, and ingredient transformation processes. For example, preparation knowledge system 1714 may track dependencies between preparation steps, ensuring that pre-processing steps such as marination or fermentation are represented in embeddings before final cooking stages. Ingredient relationship engine 1715 structures embeddings for ingredient interactions, ensuring that substitution mappings, allergen considerations, and flavor compatibility remain represented within system 1700. In an embodiment, ingredient relationship engine 1715 may refine embeddings by incorporating ingredient intensity levels, ensuring that substitutions do not disrupt overall dish balance.

Service expertise system 1720 generates structured embeddings related to service protocols, guest interactions, and cultural dining expectations. In an embodiment, service expertise system 1720 may process structured representations of front-of-house operations, ensuring that embeddings capture real-time service adjustments, such as menu modifications for large groups or personalized meal pacing based on prior dining experiences. Cultural protocol manager 1721 structures embeddings for etiquette, dining customs, and regional service preferences, ensuring that recommendations align with recognized hospitality standards. For example, cultural protocol manager 1721 may refine structured representations to ensure that service expectations differ from casual restaurant settings. Service timing controller 1722 refines structured representations of service pacing, tracking optimal time intervals for meal progression and adjusting embeddings based on session conditions. In an embodiment, service timing controller 1722 may modify timing embeddings dynamically, ensuring that multi-course meals maintain appropriate pacing between courses without unnecessary delays or rushed service. Guest interaction manager 1723 structures embeddings for service communication, ensuring that real-time interactions are incorporated into preference tracking and adaptive service adjustments. For example, guest interaction manager 1723 may refine embeddings based on detected guest preferences, ensuring that service recommendations align with prior dining experiences, such as automatically adjusting spice levels based on past feedback. Menu composition engine 1724 processes embeddings for dish relationships, course sequencing, and pairing recommendations, ensuring that structured representations align with traditional and contemporary dining structures. In an embodiment, menu composition engine 1724 may refine embeddings by integrating regional cuisine hierarchies, ensuring that structured representations distinguish between core menu offerings, chef's specials, and seasonal additions.

Dietary knowledge system 1730 maintains structured embeddings related to dietary constraints, nutritional content, and health-based meal planning. In an embodiment, dietary knowledge system 1730 may refine embeddings by incorporating real-time dietary trends, ensuring that structured representations remain adaptive to evolving health considerations, such as plant-based diets or intermittent fasting preferences. Restriction manager 1731 tracks embeddings for dietary exclusions, ensuring that structured representations reflect allergen considerations, religious dietary laws, and health-based restrictions. For example, restriction manager 1731 may dynamically adjust embeddings to prioritize allergen-free options when a user's dining history indicates a strong preference for gluten-free or nut-free meals. In an embodiment, restriction manager 1731 dynamically adjusts embeddings based on real-time user modifications, ensuring that evolving dietary preferences remain accurately represented. Nutritional analysis engine 1732 structures embeddings for macronutrient and micronutrient compositions, ensuring that meal recommendations maintain alignment with user dietary goals. For example, nutritional analysis engine 1732 may refine embeddings by incorporating caloric density adjustments, ensuring that structured representations differentiate between high-protein, low-carb, and balanced meal plans. Health profile coordinator 1733 structures embeddings for personalized meal planning, ensuring that preference evolution and health-based modifications remain integrated into downstream processing. In an embodiment, health profile coordinator 1733 may refine embeddings based on longitudinal health data, ensuring that structured representations incorporate gradual shifts in dietary preferences, such as transitioning from high-sodium to low-sodium diets based on cardiovascular health goals.

Wine and beverage knowledge system 1740 maintains structured representations of beverage pairings, regional drink preferences, and serving recommendations. In an embodiment, wine and beverage knowledge system 1740 may refine embeddings by integrating historical pairing data, ensuring that structured representations align with recognized pairing guidelines, such as emphasizing acidity balance in wine selection for rich or fatty dishes. Pairing engine 1741 generates embeddings that align beverages with menu selections, ensuring that structured representations capture relationships between dish compositions and drink profiles. For example, pairing engine 1741 may refine embeddings by incorporating regional beverage preferences, ensuring that recommendations align with traditional cuisine pairings, such as sake with Japanese dishes or amarone with Italian fare. Beverage profile manager 1742 tracks structured embeddings for drink characteristics, ensuring that contextual factors such as region, vintage, and production methods remain represented. In an embodiment, beverage profile manager 1742 may refine embeddings based on user-specific drink preferences, ensuring that structured representations dynamically adjust recommendations based on prior selections, such as favoring aged red wines for a user who frequently selects full-bodied options. Service protocol controller 1743 structures embeddings for beverage presentation, refining structured representations for optimal serving temperatures, glassware selection, and preparation techniques. For example, service protocol controller 1743 may refine embeddings by incorporating temperature dependencies, ensuring that cold beverages are recommended with lighter dishes while warm beverages are aligned with rich or complex flavors. Output data 1702 is generated after structured embeddings have been refined and validated, ensuring that expert knowledge system 1700 maintains domain-aligned representations that inform downstream processing tasks such as preference modeling, dining session optimization, and adaptive recommendation generation. In an embodiment, output data 1702 may serve as input to dynamic integration system 1600 or multi-scale embedding fusion engine 1900, ensuring that expert-driven embeddings maintain coherence across adaptive processing workflows.

In an embodiment, expert knowledge system 1700 may incorporate machine learning models to refine embeddings related to culinary expertise, service protocols, dietary considerations, and beverage pairings. These models may, for example, include transformer-based architectures for processing structured culinary knowledge, recurrent neural networks for modeling long-term dining preferences, and graph-based neural networks for mapping ingredient relationships and substitution compatibility. Transformer-based models may apply self-attention mechanisms to extract dependencies between preparation techniques, ingredient interactions, and dish compositions, ensuring that embeddings align with culinary best practices. Recurrent neural networks, such as long short-term memory (LSTM) networks or gated recurrent units (GRUs), may process sequential dining behavior data to model evolving taste preferences, tracking dietary transitions over time. Graph-based neural networks may structure relationships between ingredients, beverage pairings, and menu hierarchies, enabling system 1700 to refine embeddings by identifying optimal substitutions, complementary flavors, and dish compatibility patterns.

Training of machine learning models within system 1700 may, for example, be performed using a combination of supervised, unsupervised, and reinforcement learning techniques. Supervised learning may be applied when labeled datasets are available, such as annotated culinary databases containing ingredient properties, cooking techniques, and pairing recommendations. Training data may include structured recipe repositories, restaurant menu archives, expert reviews, and nutritional databases, ensuring that models learn contextually relevant patterns for refining structured embeddings. Unsupervised learning techniques, such as clustering or self-organizing maps, may be used to identify latent structures in ingredient compatibility, allowing system 1700 to refine embeddings by detecting previously unrecognized flavor affinities or preparation synergies. For example, clustering algorithms may identify groups of ingredients that frequently co-occur in different regional cuisines, enabling dynamic adjustments to embeddings that reflect culinary cross-compatibility.

Reinforcement learning may, in an embodiment, be used to optimize adaptive embeddings by continuously updating structured representations based on user interactions, expert validation, and real-time feedback. A reinforcement learning agent may, for example, receive rewards for improving recommendation accuracy, optimizing meal pairings, or enhancing user satisfaction through adaptive beverage suggestions. Training data for reinforcement learning may include sequential meal selections, beverage pairing feedback, and historical ordering patterns, ensuring that models adjust structured embeddings based on observed user behavior. In an embodiment, transfer learning techniques may be applied, where pre-trained models trained on broad culinary datasets are fine-tuned using specialized expert data, such as Michelin-starred restaurant menus or sommelier-approved wine pairing guides. Additionally, online learning may be employed to dynamically refine embeddings in response to emerging dietary trends, seasonal ingredient availability, or shifts in consumer dining preferences, ensuring that expert knowledge system 1700 remains adaptive to evolving culinary and service expectations.

In an embodiment, data flows through expert knowledge system 1700 beginning with input data 1701 entering culinary knowledge integration engine 1710, where recipe processing system 1711 structures embeddings for dish compositions, tracking ingredient dependencies, preparation sequences, and plating variations. Ingredient knowledge manager 1712 refines structured representations of ingredient properties, ensuring that seasonal availability, regional variations, and substitution compatibility remain encoded. Technique analysis engine 1713 processes embeddings related to cooking methodologies, integrating data from preparation knowledge system 1714, which refines structured representations based on multi-step workflows, kitchen efficiency constraints, and ingredient transformation processes. Ingredient relationship engine 1715 encodes dependencies between ingredients, adjusting embeddings to reflect allergen considerations, pairing compatibilities, and alternative ingredient selections. Service expertise system 1720 refines structured representations for hospitality operations, with cultural protocol manager 1721 structuring embeddings for etiquette standards, dining customs, and regional service variations. Service timing controller 1722 refines structured representations of meal pacing, ensuring that optimal service flow is maintained based on contextual dining conditions. Guest interaction manager 1723 encodes real-time service interactions into structured embeddings, integrating user feedback and service adjustments. Menu composition engine 1724 structures relationships between menu items, refining course sequencing, dish compatibility, and pairing recommendations. Dietary knowledge system 1730 processes structured representations related to dietary constraints, with restriction manager 1731 tracking allergen considerations, religious dietary laws, and personalized dietary modifications. Nutritional analysis engine 1732 refines embeddings based on macronutrient and micronutrient compositions, ensuring that meal recommendations align with user dietary goals. Health profile coordinator 1733 encodes structured representations for long-term dietary planning, adjusting embeddings to reflect evolving health preferences. Wine and beverage knowledge system 1740 refines beverage-related embeddings, with pairing engine 1741 generating structured representations that align drink selections with menu offerings, beverage profile manager 1742 refining contextual representations for region, vintage, and production methods, and service protocol controller 1743 structuring serving recommendations, including temperature, glassware selection, and preparation methods. Output data 1702 is generated after embeddings have been processed, refined, and validated, ensuring that structured representations maintain coherence across expert-driven culinary knowledge, service optimization, dietary modeling, and beverage recommendations.

Figure 18:
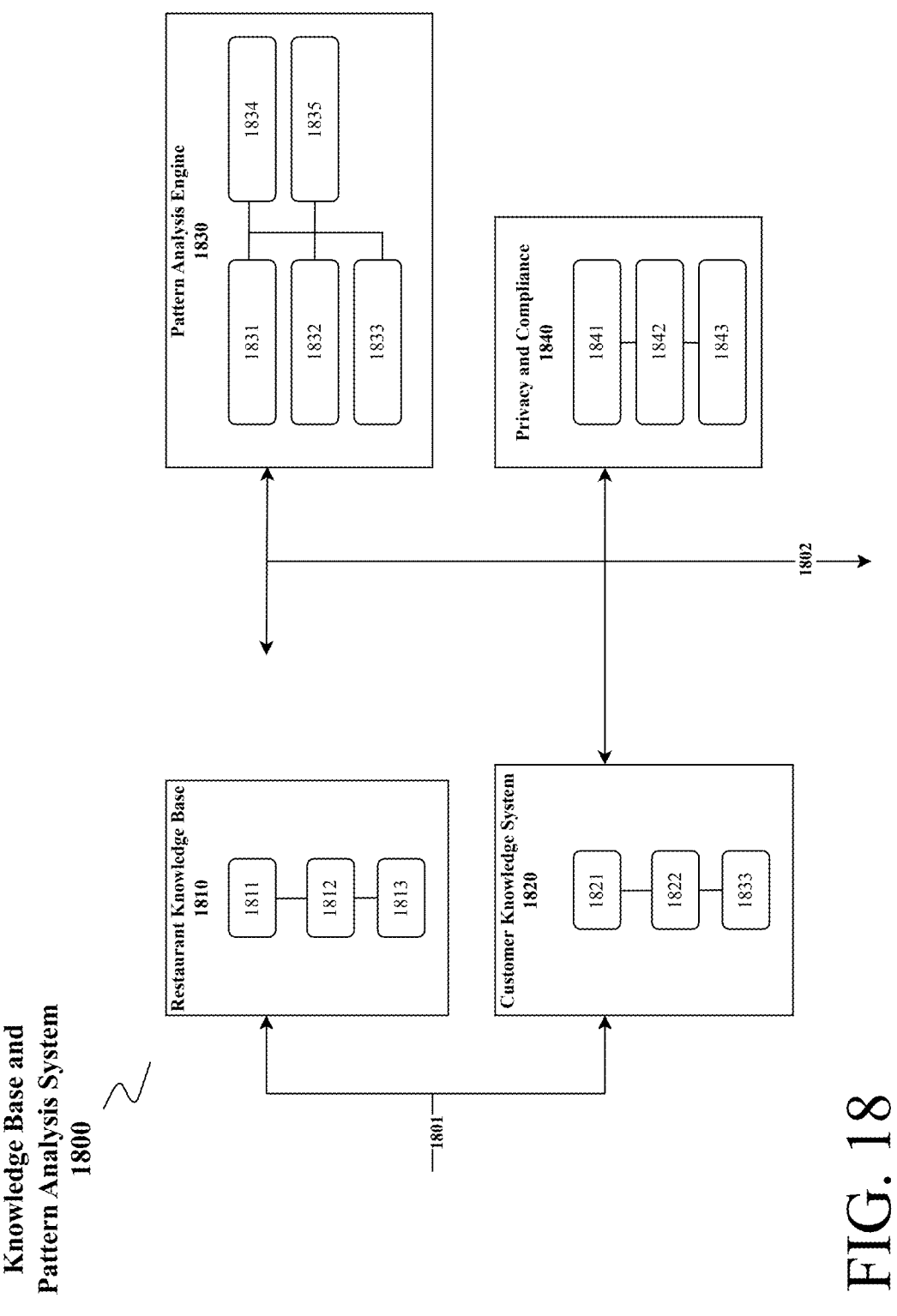
FIG. 18 is a block diagram illustrating exemplary architecture of knowledge base system.

FIG. 18 is a block diagram illustrating exemplary architecture of knowledge base system 1800, in an embodiment. Knowledge base system 1800 processes input data 1801 and generates output data 1802 by structuring, maintaining, and refining stored knowledge representations for dining-related contexts, including restaurant configurations, customer profiles, pattern analysis, and regulatory compliance.

Restaurant knowledge base 1810 structures embeddings for menu configurations, service protocols, and operational constraints, ensuring that dining-related knowledge remains structured and accessible. In an embodiment, restaurant knowledge base 1810 may refine embeddings dynamically to reflect real-time menu updates, ingredient substitutions, and evolving service policies. Menu database manager 1811 maintains structured representations of menu items, tracking dish compositions, ingredient dependencies, and pricing structures. For example, menu database manager 1811 may encode dish components at multiple levels of granularity, ensuring that substitutions, portion variations, and preparation modifications remain traceable within structured embeddings. In an embodiment, menu database manager 1811 refines embeddings to incorporate seasonal variations, limited-time offerings, and customer-driven menu adaptations, ensuring that structured representations remain responsive to evolving menu structures. Service protocol manager 1812 structures embeddings for front-of-house and back-of-house service operations, ensuring that operational workflows remain aligned with predefined service standards. For example, service protocol manager 1812 may refine embeddings based on customer interaction logs, adjusting structured representations to accommodate variations in service pacing, special requests, or table management strategies. Configuration controller 1813 structures embeddings for restaurant-specific operational settings, including table layouts, kitchen workflow constraints, and inventory management considerations, ensuring that structured representations reflect real-time and historical operational configurations. In an embodiment, configuration controller 1813 may adjust embeddings dynamically to account for staffing fluctuations, equipment availability, or external demand influences, ensuring that structured representations support adaptive resource management.

Customer knowledge system 1820 processes structured representations of guest profiles, dining habits, and behavioral insights, ensuring that system 1800 maintains adaptive and personalized knowledge structures. In an embodiment, customer knowledge system 1820 may refine structured representations dynamically to reflect user engagement trends, ensuring that guest preferences, ordering behaviors, and service feedback remain aligned with evolving customer interactions. Profile manager 1821 structures embeddings for individual and group dining histories, tracking preference evolution, ordering patterns, and service feedback. For example, profile manager 1821 may refine embeddings based on longitudinal ordering behaviors, ensuring that structured representations capture persistent dining habits, such as repeated selections of specific cuisines or beverage pairings. Visit pattern analyzer 1822 processes structured representations of guest interactions, ensuring that system 1800 identifies recurring dining behaviors, meal pacing preferences, and session-specific adjustments. In an embodiment, visit pattern analyzer 1822 refines structured representations by integrating frequency of visits, timing variations, and seasonal shifts in dining behavior, ensuring that structured embeddings maintain coherence across time-based dining trends. Preference evolution tracker 1823 structures embeddings for long-term preference shifts, refining structured representations based on historical meal selections, ingredient substitutions, and dynamic service adjustments. For example, preference evolution tracker 1823 may adjust embeddings when a user transitions from casual to fine dining preferences, ensuring that structured representations maintain alignment with shifting customer behaviors.

Pattern analysis engine 1830 processes structured representations for trend detection, cross-pattern correlation, and predictive modeling, ensuring that system 1800 maintains dynamically evolving knowledge representations. In an embodiment, pattern analysis engine 1830 may refine embeddings dynamically to incorporate real-time trend analysis, ensuring that structured representations remain responsive to emerging dining behaviors, menu modifications, and external market influences. Trend detection system 1831 structures embeddings for emerging dining behaviors, tracking shifts in meal selections, preference adaptations, and service interactions. For example, trend detection system 1831 may refine structured representations to highlight growing customer interest in plant-based menu options, ensuring that preference models adjust accordingly. Cross-pattern analyzer 1832 structures embeddings for relationships between preference trends, identifying contextual dependencies between individual dining histories, group ordering behaviors, and restaurant-level adaptations. In an embodiment, cross-pattern analyzer 1832 may refine embeddings based on co-occurrence patterns in menu selections, ensuring that structured representations highlight correlations between frequently ordered dishes. Insight generation engine 1833 refines structured representations by processing predictive models that align past dining behaviors with anticipated future preferences. For example, insight generation engine 1833 may adjust embeddings dynamically to optimize recommendation models, ensuring that structured representations support adaptive dining experiences based on predictive insights. Temporal pattern integrator 1834 refines structured representations by aligning dining history trends with seasonal variations, ensuring that structured embeddings maintain coherence across evolving time-based patterns. In an embodiment, temporal pattern integrator 1834 may adjust embeddings dynamically based on real-time event detection, ensuring that structured representations incorporate external influences such as holidays or regional dining trends. Context pattern analyzer 1835 structures embeddings for cross-context relationships, ensuring that pattern recognition remains adaptive to dynamic shifts in customer behaviors, menu modifications, and service interactions. For example, context pattern analyzer 1835 may refine structured representations by integrating behavioral analytics with menu optimization models, ensuring that structured embeddings capture complex dependencies between customer engagement and restaurant offerings.

Privacy and compliance system 1840 structures embeddings for regulatory alignment, ensuring that system 1800 maintains compliance with data protection standards, industry-specific guidelines, and user privacy preferences. In an embodiment, privacy and compliance system 1840 may refine structured representations dynamically to accommodate regulatory updates, ensuring that structured embeddings align with evolving data security requirements. Data protection manager 1841 structures embeddings for access control, encryption policies, and anonymization protocols, ensuring that structured representations align with security requirements. For example, data protection manager 1841 may refine structured representations to incorporate hierarchical access control, ensuring that data permissions align with user roles and operational constraints. Anonymization engine 1842 refines structured representations by processing embeddings that support real-time data masking, differential privacy applications, and structured identity protection techniques. In an embodiment, anonymization engine 1842 may refine structured embeddings based on privacy-preserving machine learning techniques, ensuring that system 1800 maintains compliance with anonymization standards while preserving the utility of structured representations. Compliance controller 1843 structures embeddings for regulatory adherence, tracking legal frameworks, policy updates, and industry-specific operational guidelines. For example, compliance controller 1843 may refine structured representations dynamically to accommodate jurisdiction-specific data protection laws, ensuring that structured embeddings remain aligned with multi-regional regulatory requirements. Output data 1802 is generated after embeddings have been processed, refined, and validated, ensuring that structured representations maintain coherence across restaurant operations, customer insights, pattern analysis, and regulatory alignment. In an embodiment, output data 1802 may serve as input to downstream processing subsystems, ensuring that structured embeddings support decision-making frameworks related to preference modeling, operational efficiency, and personalized recommendation generation.

In an embodiment, knowledge base system 1800 may incorporate machine learning models to structure, refine, and maintain embeddings related to restaurant operations, customer insights, pattern analysis, and compliance management. These models may, for example, include transformer-based architectures for processing structured restaurant data, recurrent neural networks for modeling long-term customer behavior trends, and graph-based neural networks for structuring relationships between menu items, dining preferences, and operational constraints. Transformer-based models may apply self-attention mechanisms to detect dependencies between historical dining data, real-time customer interactions, and menu configurations, ensuring that embeddings remain adaptable to evolving patterns. Recurrent neural networks, such as long short-term memory (LSTM) networks or gated recurrent units (GRUs), may process sequential dining behavior data to model evolving guest preferences, tracking long-term dietary trends, frequency of restaurant visits, and order modifications over time. Graph-based neural networks may structure relationships between ingredients, menu structures, and customer ordering behavior, enabling system 1800 to refine embeddings by identifying optimal ingredient substitutions, frequently co-ordered dishes, and evolving menu-item associations.

Training of machine learning models within system 1800 may, for example, be performed using a combination of supervised, unsupervised, and reinforcement learning techniques. Supervised learning may be applied when labeled datasets are available, such as annotated restaurant operation logs containing service protocols, menu changes, and customer feedback ratings. Training data may include structured restaurant databases, historical sales records, real-time service adjustments, and customer reviews, ensuring that models learn patterns for refining structured embeddings. Unsupervised learning techniques, such as clustering or dimensionality reduction, may be used to extract latent structures in customer behavior, allowing system 1800 to refine embeddings by detecting recurring trends in meal preferences, seasonal ordering patterns, and service quality interactions. For example, clustering algorithms may identify groups of diners who frequently order similar dishes, enabling system 1800 to generalize structured embeddings for preference-based recommendation generation.

Reinforcement learning may, in an embodiment, be used to optimize adaptive embeddings by continuously updating structured representations based on customer interactions, operational efficiency, and feedback mechanisms. A reinforcement learning agent may, for example, receive rewards for optimizing menu placement strategies, improving customer satisfaction through personalized recommendations, or enhancing operational workflows by balancing kitchen load distribution. Training data for reinforcement learning may include sequential meal selection logs, service efficiency metrics, and customer feedback trends, ensuring that models dynamically adjust structured embeddings based on observed behavior patterns. In an embodiment, transfer learning techniques may be applied, where pre-trained models trained on broad restaurant operation datasets are fine-tuned using specialized data from individual restaurant locations, ensuring adaptability to region-specific dining behaviors, regulatory constraints, and service expectations. Additionally, online learning may be employed to refine embeddings in response to emerging menu trends, changes in ingredient availability, or shifts in regulatory requirements, ensuring that knowledge base system 1800 remains responsive to evolving restaurant operations and customer needs.

In an embodiment, data flows through knowledge base system 1800 beginning with input data 1801 entering restaurant knowledge base 1810, where menu database manager 1811 structures embeddings for menu items, tracking ingredient compositions, pricing variations, and seasonal adjustments. Service protocol manager 1812 processes structured representations of front-of-house and back-of-house operations, ensuring that embeddings reflect workflow optimizations, service pacing adjustments, and customer interaction protocols. Configuration controller 1813 refines structured embeddings by integrating real-time operational constraints, including table arrangements, kitchen resource availability, and adaptive inventory management strategies. Customer knowledge system 1820 structures embeddings for guest preferences, with profile manager 1821 refining structured representations based on historical ordering behavior, dining session feedback, and personalization adjustments. Visit pattern analyzer 1822 processes structured embeddings for recurring guest interactions, identifying trends in dining frequency, meal pacing, and group ordering dynamics. Preference evolution tracker 1823 refines structured representations for long-term preference modeling, ensuring that embeddings remain adaptive to gradual shifts in customer taste preferences and dietary modifications. Pattern analysis engine 1830 structures embeddings for trend detection, with trend detection system 1831 refining structured representations of emerging dining behaviors, cross-pattern analyzer 1832 identifying correlations between preference trends, and insight generation engine 1833 structuring embeddings for predictive modeling and restaurant-wide preference forecasting. Temporal pattern integrator 1834 processes structured representations of time-based preference evolution, ensuring that seasonal and event-driven ordering behaviors remain embedded in system 1800. Context pattern analyzer 1835 refines structured embeddings for multi-context preference modeling, ensuring that cross-context dependencies between customer behaviors, menu modifications, and service adjustments remain aligned. Privacy and compliance system 1840 ensures that structured representations remain aligned with regulatory requirements, with data protection manager 1841 refining structured embeddings for security policies, anonymization engine 1842 structuring representations for data masking and privacy-preserving transformations, and compliance controller 1843 processing structured embeddings for regulatory adherence. Output data 1802 is generated after structured embeddings have been processed, refined, and validated, ensuring that system 1800 maintains coherence across restaurant knowledge, customer behavior tracking, trend analysis, and compliance management.

Figure 19:
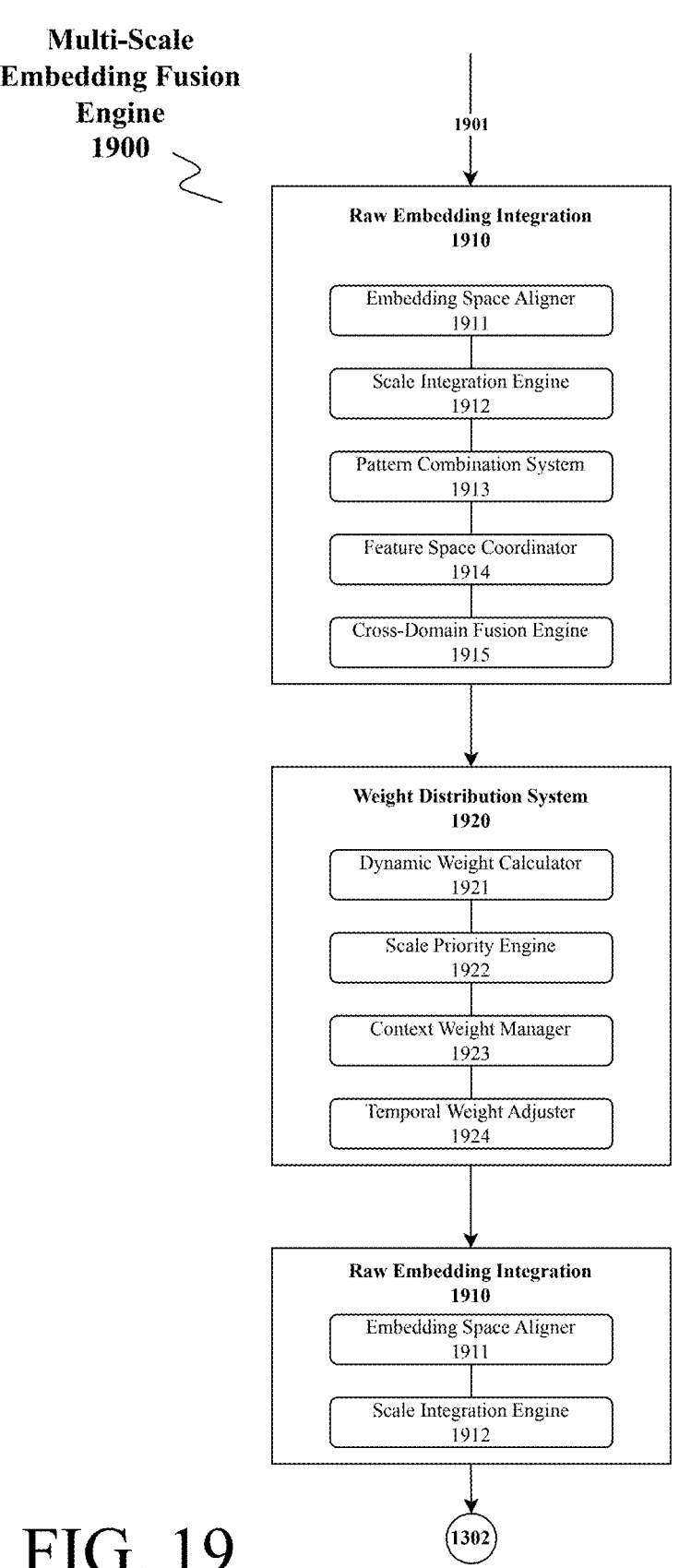
FIG. 19 is a block diagram illustrating exemplary architecture of multi-scale fusion engine.

FIG. 19 is a block diagram illustrating exemplary architecture of multi-scale fusion engine 1900, in an embodiment.

Multi-scale fusion engine 1900 processes input data 1901 and generates output data 1902 by integrating embeddings from multiple sources, aligning temporal and contextual representations, and refining structured outputs to maintain coherence across varying time scales.

Raw embedding integration subsystem 1910 structures input embeddings from system-wide sources, ensuring that structured representations remain aligned for downstream processing. In an embodiment, raw embedding integration subsystem 1910 may receive embeddings from temporal processing engines, contextual modeling components, and real-time dining interactions, ensuring that heterogeneous data sources contribute to a unified representation. Embedding space aligner 1911 refines embeddings by applying transformation functions that map heterogeneous representations into a unified vector space, ensuring that structured embeddings retain compatibility across temporal, contextual, and entity-based embeddings. For example, embedding space aligner 1911 may normalize vector magnitudes across input sources, ensuring that embeddings derived from historical dining behaviors do not dominate real-time preference updates. Scale integration engine 1912 processes structured embeddings by adjusting weight distributions for different time scales, refining structured outputs to emphasize relevant short-term, mid-term, or long-term representations. In an embodiment, scale integration engine 1912 may assign higher weight to real-time embeddings during active dining sessions while incorporating long-term trend embeddings to maintain continuity between past and present behaviors. Pattern combination system 1913 structures embeddings for cross-pattern integration, ensuring that co-occurring behavioral trends, dining preferences, and historical service patterns remain embedded in system 1900. For example, pattern combination system 1913 may refine embeddings by detecting correlations between recurring menu selections and user engagement trends, adjusting structured outputs to reflect underlying behavioral relationships. Feature space coordinator 1914 structures embeddings for attribute alignment, ensuring that structured representations maintain coherence between extracted features, user-specific preferences, and system-driven contextual refinements. In an embodiment, feature space coordinator 1914 may align embeddings related to ingredient preferences, preparation techniques, and dining session characteristics, ensuring that structured representations remain adaptable to diverse culinary and service contexts. Cross-domain fusion engine 1915 processes structured embeddings by aligning contextual representations across different subsystems, ensuring that structured outputs integrate real-time dining behaviors, long-term customer trends, and operational knowledge. For example, cross-domain fusion engine 1915 may reconcile discrepancies between historical preference models and recent modifications in ordering behavior, ensuring that structured outputs reflect a dynamically evolving user profile.

Weight distribution system 1920 processes structured embeddings by assigning relevance scores to different input representations, ensuring that structured outputs maintain optimized weight distributions for dynamic decision-making. In an embodiment, weight distribution system 1920 may continuously update weight parameters based on detected shifts in dining preferences, ensuring that structured embeddings remain contextually relevant. Dynamic weight calculator 1921 structures embeddings by adjusting weight parameters based on detected preference evolution, real-time service interactions, and system-driven adjustments. For example, dynamic weight calculator 1921 may refine embeddings by assigning higher priority to recently selected dishes while maintaining background weighting for long-term preference stability. Scale priority engine 1922 refines structured representations by prioritizing embeddings based on session conditions, ensuring that short-term dining behaviors are appropriately weighted against long-term trend analysis. In an embodiment, scale priority engine 1922 may apply adaptive weighting based on dining context, assigning greater importance to immediate feedback in interactive dining experiences while relying on established preferences for long-term meal planning. Context weight manager 1923 processes structured embeddings for real-time preference modeling, ensuring that structured outputs maintain coherence between customer-specific dining behaviors and system-wide optimization strategies. For example, context weight manager 1923 may refine embeddings by dynamically adjusting weight distributions for dietary constraints, modifying structured representations to prioritize allergen-free or health-conscious meal options when necessary. Temporal weight adjuster 1924 refines structured embeddings by balancing immediate dining session embeddings with historical behavior models, ensuring that structured representations remain adaptable to evolving preference patterns. In an embodiment, temporal weight adjuster 1924 may modify weight assignments dynamically, shifting emphasis from long-term ordering history to real-time modifications in session-based recommendations.

Validation and output subsystem 1930 structures processed embeddings for final output refinement, ensuring that structured representations maintain consistency, coherence, and system-wide alignment. In an embodiment, validation and output subsystem 1930 may employ statistical validation techniques to detect anomalies in fused embeddings, ensuring that structured outputs maintain logical consistency across dining interactions. Coherence validator 1931 structures embeddings by detecting inconsistencies in fused representations, ensuring that structured outputs maintain alignment between historical trends and real-time adjustments. For example, coherence validator 1931 may refine structured embeddings by reconciling conflicts between evolving user preferences and past selection history, ensuring that adaptive recommendations remain personalized while maintaining alignment with established trends. Output generation engine 1932 processes structured embeddings for downstream decision-making, ensuring that structured representations maintain compatibility with preference modeling, recommendation engines, and real-time adaptation subsystems. In an embodiment, output generation engine 1932 may refine structured outputs based on operational constraints, ensuring that dynamically generated meal recommendations align with restaurant availability, service pacing, and real-time kitchen workload adjustments. Output data 1902 is generated after structured embeddings have been processed, refined, and validated, ensuring that multi-scale fusion engine 1900 maintains coherence across integrated embeddings, cross-scale representations, and system-wide decision-making processes. For example, output data 1902 may serve as an input to real-time dining assistants, service optimization models, or culinary adaptation engines, ensuring that structured outputs remain actionable and contextually relevant within the broader dining experience.

In an embodiment, multi-scale fusion engine 1900 may incorporate machine learning models to optimize the integration of embeddings across different time scales, contextual dimensions, and preference structures. These models may, for example, include transformer-based architectures for attention-based fusion, recurrent neural networks for sequential pattern alignment, and graph-based neural networks for cross-domain representation learning. Transformer-based models may apply multi-head attention mechanisms to dynamically adjust weighting distributions across short-term, mid-term, and long-term embeddings, ensuring that system 1900 maintains balanced integration of real-time dining interactions and historical behavioral trends. Recurrent neural networks, such as long short-term memory (LSTM) networks or gated recurrent units (GRUs), may process sequential embeddings to capture dependencies between preference evolution, order modifications, and service interactions over time. Graph-based neural networks may structure relationships between embeddings from different subsystems, ensuring that dining session representations remain contextually linked to menu structures, restaurant operations, and customer-specific adaptations.

Training of machine learning models within system 1900 may, for example, be performed using a combination of supervised, unsupervised, and reinforcement learning techniques. Supervised learning may be applied when labeled datasets are available, such as historical dining logs annotated with user satisfaction scores, meal pacing preferences, and order modifications. Training data may include structured representations of dining sessions, ingredient selections, service timing logs, and customer feedback responses, ensuring that models learn optimal fusion strategies for structured embeddings. Unsupervised learning techniques, such as contrastive learning or clustering, may be used to identify latent structures in preference evolution, enabling system 1900 to refine embeddings by detecting recurring behavioral trends, emerging ordering habits, and cross-session dependencies. For example, clustering algorithms may segment user profiles based on ordering frequency, ingredient preferences, or historical service requests, ensuring that system 1900 generalizes structured embeddings effectively across diverse dining behaviors.

Reinforcement learning may, in an embodiment, be used to optimize adaptive weighting distributions within fusion models, allowing system 1900 to continuously refine structured embeddings based on real-time interactions. A reinforcement learning agent may, for example, receive rewards for improving alignment between user preferences and dynamically generated recommendations, ensuring that weight distributions remain optimized for personalized dining experiences. Training data for reinforcement learning may include real-time order adjustments, sequential dining history embeddings, and session-specific modifications, allowing system 1900 to learn adaptive fusion strategies that prioritize session relevance while maintaining long-term coherence. In an embodiment, transfer learning techniques may be applied, where pre-trained fusion models trained on large-scale restaurant interaction datasets are fine-tuned using region-specific dining behaviors, cuisine-specific adaptation models, or operational constraints related to real-time service availability. Additionally, online learning may be employed to refine structured embeddings continuously, ensuring that system 1900 remains responsive to shifts in preference evolution, menu modifications, and external influences such as seasonal dining trends or new ingredient availability.

In an embodiment, data flows through multi-scale fusion engine 1900 beginning with input data 1901 entering raw embedding integration subsystem 1910, where embedding space aligner 1911 processes structured embeddings from multiple sources, mapping heterogeneous representations into a unified vector space. Scale integration engine 1912 refines structured embeddings by dynamically adjusting weight distributions across short-term, mid-term, and long-term representations, ensuring that fused embeddings emphasize temporally relevant features. Pattern combination system 1913 processes structured embeddings to detect co-occurring trends, refining structured outputs to preserve relationships between behavioral patterns, dining preferences, and service interactions. Feature space coordinator 1914 structures embeddings by aligning extracted attributes, ensuring that contextual dependencies between preference evolution, menu modifications, and real-time service data remain embedded within system 1900. Cross-domain fusion engine 1915 integrates structured embeddings across subsystems, refining representations that incorporate real-time dining behaviors, operational constraints, and historical user preferences. Weight distribution system 1920 structures embeddings by optimizing relevance scores, with dynamic weight calculator 1921 refining weight distributions based on detected preference evolution and system-driven real-time adjustments. Scale priority engine 1922 structures embeddings by prioritizing input representations based on session conditions, ensuring that dynamically weighted embeddings maintain contextual alignment. Context weight manager 1923 refines structured embeddings for real-time preference modeling, ensuring that weight assignments reflect dining behaviors, system-driven constraints, and service pacing requirements. Temporal weight adjuster 1924 balances short-term and long-term embeddings, ensuring that structured representations remain adaptable to preference shifts over multiple dining sessions. Validation and output subsystem 1930 processes fused embeddings for final validation, with coherence validator 1931 refining structured outputs by detecting inconsistencies in fused representations and output generation engine 1932 structuring validated embeddings for downstream decision-making. Output data 1902 is generated after embeddings have been processed, refined, and validated, ensuring that structured representations maintain coherence across multi-scale preference fusion, real-time adaptation, and system-wide decision modeling.

Figure 20:
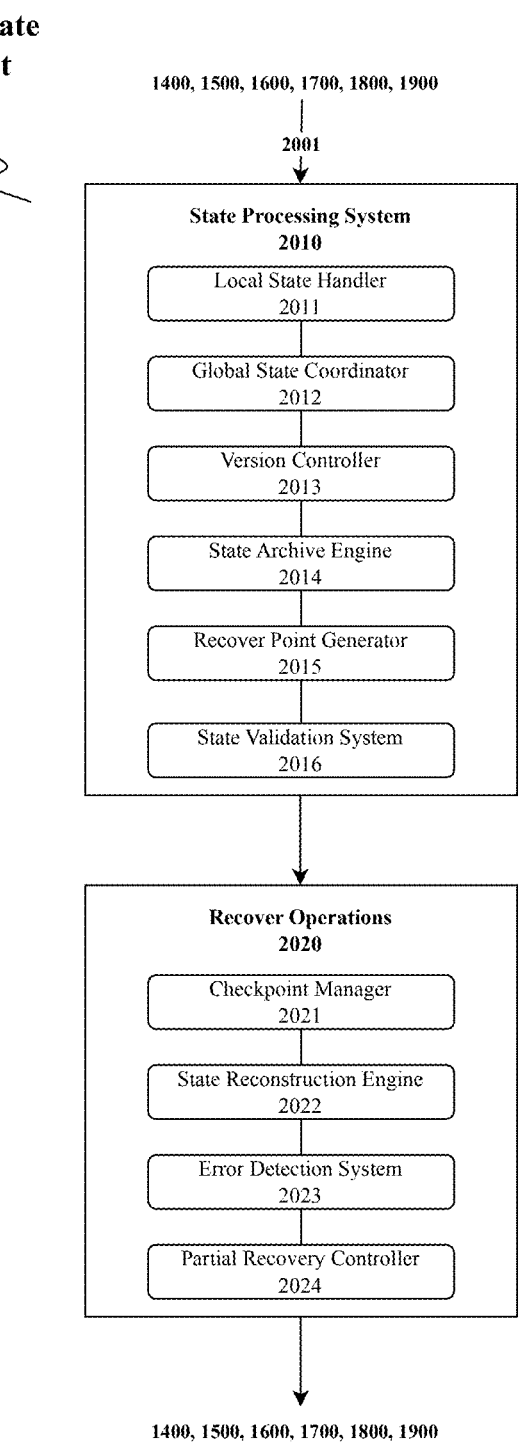
FIG. 20 is a block diagram illustrating exemplary architecture of embedding state management.

FIG. 20 is a block diagram illustrating exemplary architecture of embedding state management 2000, in an embodiment. Embedding state management 2000 processes input data 2001 and generates output data 2002 by maintaining, updating, and validating embeddings across system components, ensuring consistency and coherence between historical and real-time representations.

State processing subsystem 2010 structures embeddings for system-wide tracking, with local state handler 2011 maintaining structured representations for short-term state transitions, ensuring that embeddings remain aligned with immediate dining interactions and service modifications. In an embodiment, local state handler 2011 may update embeddings dynamically as user preferences, table statuses, and menu selections change within an active dining session, ensuring that structured representations reflect real-time conditions while preserving historical dependencies. Global state coordinator 2012 refines structured embeddings by synchronizing representations across subsystems, ensuring that real-time updates remain consistent with long-term historical trends. For example, global state coordinator 2012 may process structured representations from multiple data sources, ensuring that adjustments made in short-term preference models remain compatible with established dining behavior trends and system-driven adaptations. Version controller 2013 processes structured embeddings by maintaining versioned state records, ensuring that embeddings retain retrievable historical snapshots for validation, auditing, or rollback operations. In an embodiment, version controller 2013 may refine structured representations by generating incremental checkpoints, allowing system 2000 to revert to prior embedding states in response to unexpected modifications, erroneous updates, or user-requested rollbacks. State archive engine 2014 structures embeddings by tracking long-term system states, refining structured representations that store preference evolution, ordering behaviors, and operational adjustments. For example, state archive engine 2014 may refine embeddings to capture trends in dining preferences over extended time periods, ensuring that structured representations remain accessible for long-term predictive modeling and adaptive recommendation strategies.

Recovery point generator 2015 processes structured embeddings for checkpoint generation, ensuring that system 2000 maintains stable recovery states for adaptive system correction. In an embodiment, recovery point generator 2015 may structure embeddings dynamically based on system-defined intervals, generating rollback points that allow embeddings to be restored to previously validated states in response to inconsistencies or operational failures. State validation subsystem 2016 structures embeddings by applying consistency checks across integrated embeddings, ensuring that system-wide representations maintain alignment between real-time modifications and historical stability. For example, state validation subsystem 2016 may refine structured embeddings by detecting deviations in dining behavior models, validating whether recent preference shifts align with historical trends or indicate anomalies that require corrective adjustments.

Recovery operations subsystem 2020 structures embeddings for system resilience, ensuring that structured representations maintain coherence across error detection, recovery, and validation. In an embodiment, recovery operations subsystem 2020 may dynamically refine structured embeddings based on operational demands, ensuring that real-time recovery processes remain optimized for active dining sessions, long-term system adaptation, and service-driven modifications. Checkpoint manager 2021 structures embeddings for session-based recovery, ensuring that structured representations provide rollback points in response to detected inconsistencies. For example, checkpoint manager 2021 may generate recovery states at key transition points within a dining session, such as before and after major preference modifications, ensuring that structured representations can be restored to optimal states if anomalies are detected. State reconstruction engine 2022 processes structured embeddings by rebuilding lost or corrupted representations, ensuring that structured outputs remain accurate in response to real-time system corrections. In an embodiment, state reconstruction engine 2022 may refine structured embeddings by incorporating verified historical states, ensuring that recovered embeddings maintain consistency with long-term system-driven knowledge.

Error detection system 2023 structures embeddings for anomaly detection, ensuring that structured outputs remain aligned with system-wide consistency constraints. For example, error detection system 2023 may process structured representations for unexpected behavioral deviations, detecting whether rapid shifts in user preferences or service interactions indicate potential inconsistencies in embedding states. Partial recovery controller 2024 processes structured embeddings by refining restoration strategies, ensuring that real-time state adjustments maintain alignment with system-driven operational constraints. In an embodiment, partial recovery controller 2024 may apply selective rollback strategies, allowing structured embeddings to recover only specific inconsistencies while maintaining valid portions of real-time updates, ensuring that adaptive system modifications remain optimized. Output data 2002 is generated after structured embeddings have been processed, refined, and validated, ensuring that embedding state management 2000 maintains system-wide consistency, multi-scale coherence, and long-term adaptation for structured embeddings. For example, output data 2002 may serve as input for real-time preference updates, recommendation adjustments, and service-driven adaptations, ensuring that structured embeddings support continuous system-wide optimization.

In an embodiment, embedding state management 2000 may incorporate machine learning models to refine state tracking, detect inconsistencies, and optimize recovery processes. These models may, for example, include transformer-based architectures for analyzing state transitions, recurrent neural networks for modeling preference evolution, and anomaly detection models for identifying inconsistencies in real-time embedding updates. Transformer-based models may apply self-attention mechanisms to compare current state embeddings with historical records, ensuring that updates remain aligned with established behavioral trends. Recurrent neural networks, such as long short-term memory (LSTM) networks or gated recurrent units (GRUs), may process sequential embeddings to model long-term dining preference evolution, tracking gradual shifts in ordering behavior and real-time modifications. Anomaly detection models may analyze embedding inconsistencies by detecting statistical deviations in preference structures, ensuring that erroneous updates or system-driven modifications are identified and corrected dynamically.

Training of machine learning models within system 2000 may, for example, be performed using a combination of supervised, unsupervised, and reinforcement learning techniques. Supervised learning may be applied when labeled datasets are available, such as historical embedding records annotated with system-validated states, detected anomalies, and recovery outcomes. Training data may include structured logs of past state transitions, preference adjustments, and rollback operations, ensuring that models learn patterns for refining embedding consistency across real-time and historical data. Unsupervised learning techniques, such as clustering or autoencoders, may be used to identify latent structures in state transitions, allowing system 2000 to detect unexpected modifications or inconsistencies in structured embeddings. For example, clustering models may segment embeddings into stable and unstable states, ensuring that system 2000 prioritizes stabilization of dynamically fluctuating embeddings.

Reinforcement learning may, in an embodiment, be used to optimize embedding recovery strategies by continuously refining corrective adjustments based on system-wide performance metrics. A reinforcement learning agent may, for example, receive rewards for successfully restoring embedding states while minimizing disruptions to active system processes. Training data for reinforcement learning may include sequential embedding rollback records, system correction logs, and state transition histories, ensuring that models learn optimal strategies for embedding stabilization. In an embodiment, transfer learning techniques may be applied, where pre-trained models trained on large-scale state management datasets are fine-tuned using restaurant-specific or user-specific embedding histories, ensuring that system 2000 remains adaptable across varying operational conditions. Additionally, online learning may be employed to refine structured embeddings continuously, ensuring that system 2000 remains responsive to emerging anomalies, real-time preference modifications, and dynamically evolving state transitions.

In an embodiment, data flows through embedding state management 2000 beginning with input data 2001 received from core embedding framework 1400, restaurant-specific system 1500, dynamic integration system 1600, expert knowledge system 1700, knowledge base system 1800, and multi-scale fusion engine 1900. State processing subsystem 2010 structures received embeddings by passing short-term representations to local state handler 2011, ensuring that immediate updates from real-time dining interactions and adaptive service modifications remain tracked. Global state coordinator 2012 refines embeddings by synchronizing structured representations across multiple subsystems, ensuring that updates remain aligned with long-term preference models and operational records. Version controller 2013 maintains versioned records of state transitions, ensuring that structured embeddings remain retrievable for auditing, validation, or rollback operations when inconsistencies are detected. State archive engine 2014 structures embeddings by storing long-term historical data, ensuring that preference evolution, ordering behaviors, and service adaptations remain available for trend-based refinements. Recovery point generator 2015 processes structured embeddings for checkpoint creation, ensuring that embedding recovery states remain accessible for adaptive system correction. State validation subsystem 2016 ensures that embeddings received from system 1400 through 1900 maintain consistency by applying coherence checks that reconcile historical and real-time updates. Recovery operations subsystem 2020 processes structured embeddings by detecting anomalies, executing correction procedures, and restoring validated states. Checkpoint manager 2021 generates structured rollback points for embedding recovery, with state reconstruction engine 2022 refining lost or corrupted embeddings by restoring validated representations from archived records. Error detection system 2023 processes structured embeddings by identifying inconsistencies in received input, ensuring that real-time adjustments do not disrupt system-wide coherence. Partial recovery controller 2024 refines structured embeddings by dynamically selecting recovery strategies, ensuring that real-time embedding restoration remains optimized for active dining sessions and operational conditions. Output data 2002 is generated after embeddings have been processed, refined, and validated, ensuring that structured representations remain synchronized across system 1400 through 1900 while maintaining long-term stability for adaptive preference modeling, dining session optimization, and system-wide service refinement.

FIG. 21 is a method diagram illustrating embedding generation and management of multi-scale temporal processing system with culinary context embeddings 1300, in an embodiment. Input data 1401 is received and processed by embedding space controller 1410, where vector space manager 1411 structures base embeddings to represent temporal, contextual, and domain-specific data while maintaining compatibility across system components 2101. Cross-domain coordinator 1412 aligns embeddings from different data sources, ensuring that structured representations from temporal embedding generator 1420, context integration engine 1430, and external knowledge sources remain interoperable by adjusting vector scaling, normalizing feature distributions, and mapping relationships between independent embedding spaces 2102. Synchronization engine 1413 updates embedding parameters by incorporating new contextual information while maintaining alignment with previously stored embeddings in state archive engine 2014, ensuring that structured representations reflect both real-time data and historical trends 2103.

State transition engine 1415 refines structured embeddings by tracking preference evolution, behavioral modifications, and dynamic system-driven adjustments, ensuring that embeddings reflect adaptive modifications such as shifts in ordering preferences, seasonal ingredient substitutions, or evolving dietary trends 2104. Temporal embedding generator 1420 generates structured multi-scale temporal embeddings, applying different time-scale processors to encode immediate dining preferences, short-term behavioral patterns, and long-term dining habits, ensuring that structured representations remain relevant across varying time scales 2105. Context integration engine 1430 enhances embeddings by structuring entity relationships, interaction sequences, and domain-based constraints, ensuring that structured representations maintain coherence between individual diner preferences, group dining behaviors, and restaurant-specific operational rules 2106.

Transformer processing system 1440 applies attention mechanisms to refine structured embeddings, detecting dependencies between past dining behavior, real-time modifications, and predicted future preferences by dynamically adjusting weight distributions and contextual relationships between embedded representations 2107. Multi-scale fusion engine 1900 integrates structured embeddings by aligning weight distributions across different temporal and contextual dimensions, validating embedding consistency, and ensuring that short-term session data remains aligned with long-term historical trends, preserving coherence across preference evolution models 2108. Output data 1402 is generated after embeddings have been processed, refined, and validated, ensuring that structured representations remain adaptive to real-time user interactions while maintaining system-wide consistency across embedded knowledge, dining session adjustments, and historical behavioral patterns 2109.

FIG. 22 is a method diagram illustrating restaurant-specific embedding processing of multi-scale temporal processing system with culinary context embeddings 1300, in an embodiment. Dining session embedding generator 1510 receives input data 1501 and structures embeddings to encode real-time dining interactions, ensuring that ordering patterns, service progress, and group dining dynamics remain aligned with multi-scale temporal processing models 2201. Course sequence processor 1511 refines structured embeddings for meal progression, encoding dish sequences, expected service timing, and course pairings while adjusting embeddings based on session-specific deviations and historical ordering behaviors, ensuring that structured representations reflect both immediate dining experiences and long-term dining habits 2202.

Service state tracker 1512 processes structured embeddings by updating representations of table status, order fulfillment, and service interactions, ensuring that structured embeddings remain responsive to real-time service modifications while maintaining alignment with historical dining session states 2203. Group dynamic encoder 1513 refines structured embeddings by tracking shared dining preferences, interaction sequences, and collaborative ordering behaviors, ensuring that structured representations evolve dynamically across multiple dining sessions while incorporating real-time adjustments 2204. Meal progression engine 1514 structures embeddings by monitoring course timing sequences, aligning structured representations with real-time service pacing while refining embeddings based on detected patterns in long-term dining behavior 2205.

Culinary knowledge embeddings 1520 process structured representations of ingredient relationships, dish compositions, and menu structures across multiple time scales, ensuring that structured embeddings remain integrated with long-term preference evolution models and historical ingredient substitution patterns 2206. Dish composition engine 1522 refines structured embeddings for preparation methods, portion sizes, and plating styles while ensuring that structured representations remain aligned with immediate dining preferences and established culinary trends 2207. Menu structure processor 1523 structures embeddings for course relationships, pricing hierarchies, and menu flow, refining structured representations based on short-term menu modifications, seasonal changes, and long-term restaurant adaptation strategies 2208. Output data 1502 is generated after structured embeddings have been processed, refined, and validated, ensuring that restaurant-specific embeddings maintain coherence across real-time interactions, historical dining trends, and predictive modeling for future dining preferences 2209.

FIG. 23 is a method diagram illustrating culinary knowledge embedding processing of multi-scale temporal processing system with culinary context embeddings 1300, in an embodiment. Ingredient knowledge manager 1712 receives input data 1701 and structures embeddings for ingredient properties, ensuring that ingredient hierarchies, relationships, and classification structures remain aligned with culinary context models 2301. Ingredient relationship engine 1715 refines structured embeddings by encoding substitution mappings, allergen considerations, and ingredient compatibility, ensuring that structured representations maintain coherence across culinary knowledge models and dining preferences 2302.

Dish composition engine 1722 processes structured embeddings for preparation techniques, cooking methods, and plating styles, ensuring that structured representations remain aligned with both historical dish records and real-time dining modifications 2303. Menu structure processor 1523 structures embeddings for course relationships, dish placements, and menu hierarchy representations, refining structured outputs based on seasonal adaptations, regional modifications, and restaurant-specific menu adjustments 2304. Cultural context encoder 1524 processes structured embeddings for cuisine-specific influences, ensuring that structured representations remain aligned with culinary traditions, regional flavor profiles, and dining customs 2305.

Pattern evolution tracker 1525 refines structured embeddings by processing long-term adaptations in culinary trends, identifying changes in ingredient preferences, dish selections, and regional dining shifts 2306. Transformer processing system 1440 applies attention-based refinement to structured embeddings, detecting dependencies between historical culinary models, ingredient evolution, and emerging dish compositions 2307. Multi-scale fusion engine 1900 integrates structured embeddings by aligning weight distributions across culinary embeddings, ensuring that structured representations remain balanced between traditional knowledge and evolving dining preferences 2308. Output data 1702 is generated after embeddings have been processed, refined, and validated, ensuring that structured representations maintain coherence across ingredient knowledge, dish composition models, and long-term culinary adaptation strategies 2309.

FIG. 24 is a method diagram illustrating real-time dining state management of multi-scale temporal processing system with culinary context embeddings 1300, in an embodiment. Active session controller 1611 receives input data

1601 and structures embeddings for real-time dining session tracking, ensuring that structured representations reflect current user interactions, table status updates, and order modifications 2401. Dynamic preference handler 1614 processes structured embeddings by updating user preference models based on real-time feedback, refining structured representations to incorporate meal selections, dining behavior changes, and immediate modifications to service requests 2402.

Service flow controller 1620 structures embeddings for order processing, resource allocation, and staff coordination, ensuring that structured representations maintain alignment between table availability, service timing, and real-time operational constraints 2403. Resource allocation manager 1622 processes structured embeddings by dynamically adjusting service distribution, refining structured outputs to optimize waiter assignments, kitchen task prioritization, and real-time dining load balancing 2404. Service queue optimizer 1623 refines structured embeddings for table service progression, ensuring that structured representations dynamically adjust based on course delivery timing, customer wait times, and staff workload balancing 2405.

Pattern recognition processor 1631 structures embeddings by detecting recurring dining behavior trends, refining structured representations for preference evolution, meal pacing adjustments, and service interaction modeling 2406. Adaptive response generator 1633 processes structured embeddings by generating system-driven modifications to service recommendations, ensuring that structured representations align with user expectations, real-time table conditions, and meal progression dynamics 2407. Cross-scale fusion engine 1650 integrates structured embeddings by aligning weight distributions across temporal representations, ensuring that structured outputs maintain coherence between short-term dining session tracking and long-term customer preference modeling 2408. Output data 1602 is generated after embeddings have been processed, refined, and validated, ensuring that structured representations maintain alignment with real-time dining state updates, service modifications, and preference evolution models 2409.

FIG. 25 is a method diagram illustrating embedding-based recommendation generation of multi-scale temporal processing system with culinary context embeddings 1300, in an embodiment. Multi-scale fusion engine 1900 receives input data 1901 and structures embeddings for multi-scale temporal fusion, ensuring that representations integrate short-term dining session data, mid-term behavioral trends, and long-term customer preferences 2501. Cross-domain fusion engine 1915 refines structured embeddings by aligning context-aware dining behaviors with temporal representations, ensuring that embeddings maintain coherence across real-time interactions and historical preference models 2502.

Context weight manager 1923 structures embeddings for context-temporal integration, refining weight distributions based on user preferences, session-based dining modifications, and operational service adjustments 2503. Temporal weight adjuster 1924 processes structured embeddings by balancing immediate dining session embeddings with historical behavior models, ensuring that structured representations remain adaptable to evolving preference patterns 2504. Dynamic weight calculator 1921 refines structured embeddings by adjusting weight parameters in response to detected preference shifts, ensuring that structured outputs remain optimized for recommendation generation 2505.

Scale priority engine 1922 structures embeddings for recommendation ranking, ensuring that structured representations prioritize relevant meal suggestions based on real-time dining behaviors, past selections, and external contextual factors 2506. Adaptive response generator 1633 processes structured embeddings by refining real-time adjustments to recommendation outputs, ensuring that structured representations dynamically modify weight distributions in response to user feedback 2507. Coherence validator 1931 validates structured embeddings by detecting inconsistencies in fused representations, ensuring that system-driven recommendations align with short-term, mid-term, and long-term preference models 2508. Output data 1902 is generated after embeddings have been processed, refined, and validated, ensuring that structured representations maintain coherence across adaptive recommendation outputs, historical dining patterns, and real-time session-based modifications 2509.

FIG. 26 is a method diagram illustrating pattern recognition and learning of multi-scale temporal processing system with culinary context embeddings 1300, in an embodiment. Pattern recognition processor 1631 receives input data 1601 and structures embeddings for pattern embedding extraction, ensuring that representations capture recurring trends in dining behaviors, ordering preferences, and service interactions 2601. Cross-pattern analyzer 1832 processes structured embeddings by identifying relationships between detected patterns, ensuring that representations reflect dependencies between short-term dining interactions, historical user behaviors, and operational adaptations 2602.

Temporal pattern integrator 1834 structures embeddings by aligning time-based behavioral patterns, refining structured outputs to ensure consistency between seasonal dining trends, real-time meal selections, and long-term user preferences 2603. Context pattern analyzer 1835 processes structured embeddings for cross-pattern correlation, ensuring that structured representations integrate multi-domain relationships between menu modifications, service adjustments, and preference evolution 2604. Online learning system 1632 refines structured embeddings by dynamically updating pattern models based on real-time user interactions, ensuring that structured representations adapt continuously as new behavioral data becomes available 2605.

Insight generation engine 1833 structures embeddings for adaptive learning, refining structured representations to optimize decision-making for future meal recommendations, service pacing adjustments, and operational optimizations 2606. Adaptive response generator 1633 processes structured embeddings by dynamically modifying weight distributions in response to detected pattern evolution, ensuring that structured outputs remain aligned with user-specific behavioral trends 2607. Performance monitor 1642 validates structured embeddings by assessing prediction accuracy, response timing, and real-time engagement metrics, ensuring that structured representations maintain reliability for adaptive learning processes 2608. Output data 1602 is generated after embeddings have been processed, refined, and validated, ensuring that structured representations maintain coherence across dynamic pattern recognition models, online learning adaptations, and system-driven behavioral forecasting 2609.

FIG. 27 is a method diagram illustrating embedding state recovery and validation of multi-scale temporal processing system with culinary context embeddings 1300, in an embodiment. State validation subsystem 2016 receives input data 2001 and structures embeddings for state consistency verification, ensuring that structured representations align with historical and real-time embedding states 2701. Error detection system 2023 processes structured embeddings by identifying inconsistencies, detecting anomalies in embedding updates, and flagging discrepancies that require corrective actions 2702.

Recovery point generator 2015 structures embeddings by generating checkpoint states, ensuring that rollback points remain available for restoring validated embedding representations when inconsistencies are detected 2703. Checkpoint manager 2021 processes structured embeddings by retrieving stored recovery points, ensuring that system-driven corrections maintain alignment with previously validated embedding states 2704. State reconstruction engine 2022 structures embeddings by rebuilding lost or corrupted representations, ensuring that restored structured outputs remain contextually aligned with both immediate system modifications and historical preference trends 2705.

Partial recovery controller 2024 refines structured embeddings by selectively restoring only affected portions of the embedding state, ensuring that system-driven corrections maintain real-time coherence without disrupting stable representations 2706. Cross-scale fusion engine 1650 integrates structured embeddings by aligning recovered states with existing multi-scale temporal models, ensuring that structured representations maintain continuity across past and present data 2707. Coherence validator 1931 verifies structured embeddings by applying consistency checks across recovered states, ensuring that realigned representations maintain logical integrity within system 2000 2708. Output data 2002 is generated after embeddings have been processed, validated, and restored, ensuring that structured representations maintain alignment across error detection processes, embedding state recovery mechanisms, and long-term consistency models 2709.

FIG. 28 is a method diagram illustrating service-adaptive embedding refinement of multi-scale temporal processing system with culinary context embeddings 1300, in an embodiment. Service state tracker 1512 receives input data 1501 and structures embeddings for real-time service tracking, ensuring that representations reflect table status updates, dining session progression, and staff interactions 2801. Dynamic preference handler 1614 processes structured embeddings by adjusting user preference models in response to real-time service modifications, ensuring that structured representations adapt to evolving dining behaviors 2802.

Service queue optimizer 1623 refines structured embeddings by dynamically adjusting service priorities, modifying order sequencing, and optimizing meal pacing based on real-time dining session conditions 2803. Resource allocation manager 1622 processes structured embeddings by structuring real-time service flow adjustments, ensuring that representations optimize waiter assignments, kitchen resource distribution, and table management strategies 2804. Adaptive response generator 1633 structures embeddings for system-driven service modifications, refining structured representations to ensure that real-time service interventions align with guest preferences, operational constraints, and historical dining behaviors 2805.

Pattern recognition processor 1631 processes structured embeddings by detecting recurring service adaptation patterns, ensuring that structured outputs capture long-term optimization trends in meal pacing, order fulfillment, and guest service interactions 2806. Cross-scale fusion engine 1650 integrates structured embeddings by aligning service-adaptive weight distributions across temporal scales, ensuring that structured adjustments reflect both immediate adjustments and long-term service adaptations 2807. Coherence validator 1931 refines structured embeddings by verifying that real-time service refinements maintain alignment with preference models, dining session states, and system-wide service optimization models 2808. Output data 1502 is generated after embeddings have been processed, refined, and validated, ensuring that structured representations maintain alignment with real-time service refinements, guest experience enhancements, and operational efficiency improvements 2809.

FIG. 29 is a method diagram illustrating dynamic embedding integration of multi-scale temporal processing system with culinary context embeddings 1300, in an embodiment. Embedding space aligner 1911 receives input data 1901 and structures embeddings for multi-source synchronization, ensuring that representations from diverse data sources maintain compatibility across temporal, contextual, and entity-based embeddings 2901. Cross-domain fusion engine 1915 processes structured embeddings by aligning heterogeneous representations from dining preferences, real-time service interactions, and operational adjustments, ensuring that structured outputs remain interoperable across multiple subsystems 2902.

Scale integration engine 1912 structures embeddings by dynamically prioritizing different temporal scales, ensuring that structured representations reflect short-term session tracking, mid-term behavioral trends, and long-term preference evolution 2903. Feature space coordinator 1914 processes structured embeddings by aligning extracted features across contextual dimensions, ensuring that preference-driven attributes, service interactions, and dining history remain coherently structured 2904. Context weight manager 1923 refines structured embeddings by dynamically adjusting weight distributions based on detected shifts in user behavior, operational constraints, and real-time modifications to session dynamics 2905.

Temporal weight adjuster 1924 processes structured embeddings by balancing immediate dining session representations with historical behavior models, ensuring that structured outputs remain adaptable to evolving dining patterns 2906. Coherence validator 1931 verifies structured embeddings by ensuring that real-time integration of multi-source embeddings maintains logical consistency, preventing conflicts between dynamically fused representations 2907. Multi-scale fusion engine 1900 integrates structured embeddings by finalizing weight distributions across aligned representations, ensuring that structured outputs maintain coherence between historical preference evolution and real-time dining state modifications 2908. Output data 1902 is generated after embeddings have been processed, refined, and validated, ensuring that structured representations remain synchronized across adaptive preference models, system-wide decision-making processes, and real-time recommendation engines 2909.

In a non-limiting use case example of multi-scale temporal processing system with culinary context embeddings 1300, a restaurant recommendation platform utilizes system 1300 to generate personalized meal suggestions for a returning diner. A user accesses a dining application integrated with system 1300, triggering a request for structured embeddings related to past meal selections, ingredient preferences, dietary restrictions, and contextual factors such as time of day and location. This request is processed by customer knowledge system 1820, which retrieves structured embeddings from profile manager 1821, refining representations based on user history, explicit preferences, and inferred dietary trends.

Visit pattern analyzer 1822 processes historical dining data, identifying recurring patterns such as a preference for seafood dishes on weekends or a tendency to order lighter meals at lunchtime. Preference evolution tracker 1823 refines embeddings further by detecting gradual changes in dining habits, such as an increased preference for plant-based options. Multi-scale fusion engine 1900 integrates these embeddings, balancing short-term session data with long-term behavioral patterns to ensure recommendation outputs remain dynamically aligned with user preferences.

As the user interacts with the menu, context weight manager 1923 adjusts structured embeddings in real time, ensuring that recommendations remain contextually relevant even as the user explores different meal categories. Temporal weight adjuster 1924 modifies the priority of recommendations based on session timing, suggesting lighter meals for midday dining and richer dishes for evening reservations. If the user modifies preferences mid-session-such as specifying a gluten-free requirement or requesting spicier dish options-adaptive response generator 1633 dynamically adjusts embeddings to reflect these changes, refining subsequent recommendations.

Before output data 1902 is generated, coherence validator 1931 applies consistency checks to verify that final recommendations align with user history, session data, and evolving preference models. The dining application then presents an optimized list of meal suggestions, tailored to the user's taste preferences, historical ordering patterns, dietary restrictions, and real-time contextual modifications.

By leveraging real-time and historical embeddings, system 1300 ensures that meal recommendations remain personalized, adaptive, and responsive to both short-term session behaviors and long-term dining evolution. This enhances customer engagement, streamlines decision-making, and improves order accuracy, benefiting both the diner and the restaurant.

In another non-limiting use case example of multi-scale temporal processing system with culinary context embeddings 1300, a group of four diners at a restaurant uses a shared digital menu to select meals collaboratively. Each diner's ordering preferences, dietary restrictions, and meal history are processed through group dynamic encoder 1513, which structures embeddings for shared preference modeling. This subsystem identifies overlapping taste preferences, such as a mutual preference for Italian cuisine while recognizing individual variations in dietary restrictions or ingredient preferences.

Individual preference tracker 1531 structures embeddings for each diner's past selections, capturing meal modifications, favorite ingredients, and previous dietary specifications. For example, one diner prefers dairy-free options, another avoids seafood, while the remaining two prioritize high-protein meals. Preference evolution tracker 1823 refines structured embeddings by detecting historical group ordering behaviors, ensuring that meal recommendations balance individual constraints while preserving group-wide satisfaction.

As diners interact with the digital menu, service state tracker 1512 updates structured embeddings in real time, ensuring that group selections remain coherent as preferences are adjusted. For example, if two diners order a dish with a shared ingredient, the system suggests compatible side dishes or adjustments that maintain overall meal balance. Context pattern analyzer 1835 processes structured embeddings to identify common elements across diner preferences, refining recommendations that accommodate all participants without conflicting with dietary restrictions.

When the group modifies selections—such as substituting a seafood entrée for a vegetarian alternative—adaptive response generator 1633 dynamically updates structured embeddings, ensuring that system-driven adjustments maintain group coherence while optimizing meal variety. Multi-scale fusion engine 1900 integrates short-term session data with historical ordering patterns, refining structured embeddings to balance group ordering tendencies with personalized adjustments.

Before confirming the final meal selections, coherence validator 1931 ensures that structured representations align with group-wide preferences, preventing conflicts between individual constraints and shared meal choices. Once validation is complete, output data 1502 is generated, presenting an optimized group order that reflects individual dietary considerations, collective taste preferences, and dynamic modifications made during the selection process.

By leveraging multi-scale preference tracking, group dynamic modeling, and real-time adaptive responses, system 1300 ensures seamless group dining coordination, reducing decision fatigue, enhancing meal satisfaction, and optimizing restaurant efficiency by streamlining collaborative ordering.

In another non-limiting use case example of multi-scale temporal processing system with culinary context embeddings 1300, a high-end restaurant uses system 1300 to optimize service flow and pacing across multiple active dining sessions. As customers place orders, system 1300 processes real-time service updates using service state tracker 1512, which structures embeddings for table status, order sequencing, and staff workload distribution. Service queue optimizer 1623 refines structured embeddings to ensure that meal preparation and delivery remain aligned with expected pacing models, preventing situations where dishes arrive too quickly or with excessive delays.

As servers update order fulfillment statuses, resource allocation manager 1622 dynamically structures embeddings to ensure that waiter assignments, kitchen workload balancing, and table turnover efficiency remain optimized. For example, if a particular waiter is handling multiple tables simultaneously, system 1300 may reprioritize meal delivery timing to reduce service bottlenecks and prevent excessive delays in specific sections of the restaurant.

Pattern recognition processor 1631 refines structured embeddings by detecting recurring service pacing trends, ensuring that real-time adjustments remain informed by past operational efficiencies and historical meal pacing preferences. If a returning customer has previously indicated a preference for leisurely dining experiences, adaptive response generator 1633 modifies pacing models, ensuring that service interactions remain aligned with the customer's established dining habits.

As meal progression continues, multi-scale fusion engine 1900 integrates structured embeddings from both short-term session data and long-term preference models, ensuring that adaptive refinements maintain coherence between real-time service pacing and historical customer expectations. Coherence validator 1931 applies consistency checks before generating output data 1602, ensuring that structured recommendations for service timing, order prioritization, and staff allocation remain aligned with operational goals and customer satisfaction metrics.

By automating service pacing optimization through structured embedding refinements, system 1300 enhances restaurant efficiency, minimizes service delays, and ensures a seamless dining experience that adapts to both real-time conditions and long-term diner expectations.

In another non-limiting use case example of multi-scale temporal processing system with culinary context embeddings 1300, a restaurant chain uses system 1300 to dynamically adapt menu offerings based on real-time ingredient availability while ensuring that meal recommendations remain consistent with customer preferences. Ingredient knowledge manager 1712 receives supply chain updates, structuring embeddings to reflect current inventory levels, ingredient substitutions, and sourcing constraints.

When an ingredient becomes unavailable—such as a seasonal seafood option being out of stock—ingredient relationship engine 1715 refines structured embeddings by generating contextually relevant substitutions, ensuring that alternative recommendations remain aligned with dish composition models and flavor profiles. For example, if fresh scallops are unavailable, system 1300 adjusts structured embeddings to recommend similar dishes featuring shrimp or another texturally comparable seafood option.

Menu structure processor 1523 dynamically structures embeddings to ensure that modifications to ingredient availability do not disrupt menu section balance, course progression, or pricing hierarchies. If multiple substitutions impact a prix fixe menu, multi-scale fusion engine 1900 integrates structured embeddings across menu configurations, ensuring that alternative dish recommendations remain aligned with culinary knowledge embeddings and user preference models.

Context weight manager 1923 dynamically refines structured embeddings based on past user behavior, ensuring that real-time ingredient substitutions do not introduce unwanted dietary conflicts or preference misalignments. For example, if a user has historically avoided red meat, system 1300 does not automatically suggest a beef-based alternative for an unavailable poultry dish. Instead, context pattern analyzer 1835 refines structured embeddings to recommend plant-based or seafood-based options that align more closely with user-specific dining history.

Before finalizing menu updates, coherence validator 1931 ensures that real-time ingredient modifications remain logically consistent with long-term menu structures and restaurant-defined meal configurations. Output data 1702 is then generated, ensuring that modified menu structures preserve meal integrity, maintain customer satisfaction, and dynamically adjust to external ingredient constraints.

By automating ingredient-based menu adaptation through structured embeddings, system 1300 allows restaurants to respond dynamically to supply chain changes, optimize meal recommendations, and maintain continuity in customer satisfaction without requiring manual intervention from staff.

Other use case scenarios of multi-scale temporal processing system with culinary context embeddings 1300 should be recognized by one skilled in the art to be non-limiting in nature and applicable across a wide range of dining, service, and operational contexts. In an embodiment, system 1300 may be implemented in food delivery platforms to refine meal recommendations based on ordering history, real-time restaurant inventory, and customer location data. System 1300 may also enhance hotel and resort dining experiences, structuring embeddings to adapt meal offerings to guest preferences across multiple dining venues while dynamically adjusting service pacing for special events or room service logistics. In another embodiment, system 1300 may optimize airline and cruise ship meal planning, ensuring that structured embeddings align with long-term dietary tracking, travel-specific meal preferences, and constrained ingredient availability due to extended storage limitations. Additionally, system 1300 may be deployed in corporate dining facilities, hospital food services, or assisted living environments, where structured embeddings optimize meal personalization based on health-based dietary tracking, physician-recommended meal plans, and patient-specific nutritional restrictions. Other implementations may include interactive chef-guided meal planning platforms, where structured embeddings assist in adapting recipes based on ingredient constraints, preparation time, and user-selected dietary preferences. These and other applications should be understood as non-limiting, and system 1300 may be applied in any environment where structured embeddings enhance real-time decision-making, multi-scale preference tracking, and adaptive meal recommendations.

All aspects described herein should be considered illustrative, and system 1300 should not be limited solely to the disclosed examples but should be understood to apply broadly to contexts recognized by one skilled in the art.

Exemplary Computing Environment

Figure 30:
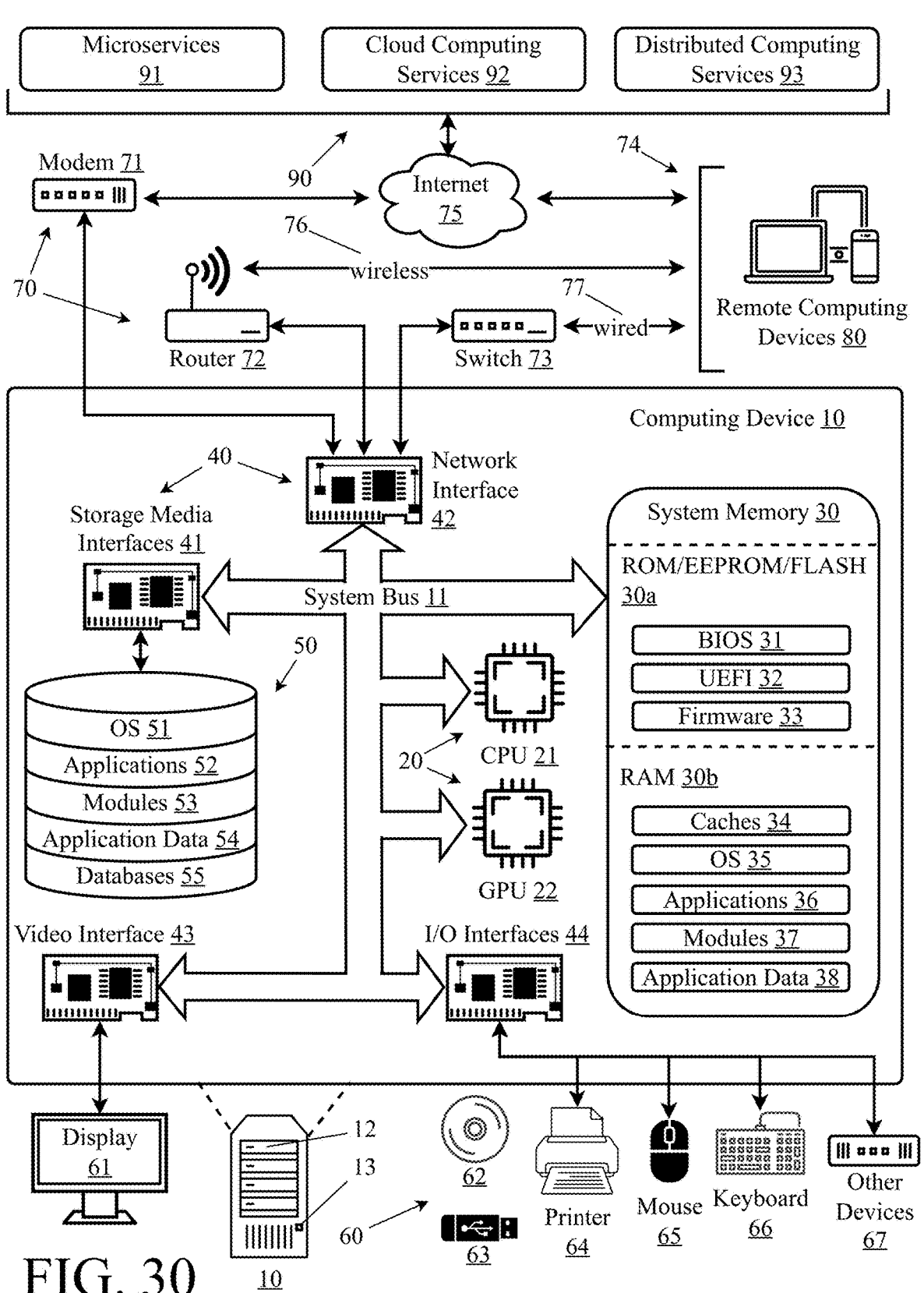
FIG. 30 illustrates an exemplary computing environment on which an embodiment described herein may be implemented.

FIG. 30 illustrates an exemplary computing environment on which an embodiment described herein may be implemented, in full or in part. This exemplary computing environment describes computer-related components and processes supporting enabling disclosure of computer-implemented embodiments. Inclusion in this exemplary computing environment of well-known processes and computer components, if any, is not a suggestion or admission that any embodiment is no more than an aggregation of such processes or components. Rather, implementation of an embodiment using processes and components described in this exemplary computing environment will involve programming or configuration of such processes and components resulting in a machine specially programmed or configured for such implementation. The exemplary computing environment described herein is only one example of such an environment and other configurations of the components and processes are possible, including other relationships between and among components, and/or absence of some processes or components described. Further, the exemplary computing environment described herein is not intended to suggest any limitation as to the scope of use or functionality of any embodiment implemented, in whole or in part, on components or processes described herein.

The exemplary computing environment described herein comprises a computing device 10 (further comprising a system bus 11, one or more processors 20, a system memory 30, one or more interfaces 40, one or more non-volatile data storage devices 50), external peripherals and accessories 60, external communication devices 70, remote computing devices 80, and cloud-based services 90.

System bus 11 couples the various system components, coordinating operation of and data transmission between those various system components. System bus 11 represents one or more of any type or combination of types of wired or wireless bus structures including, but not limited to, memory busses or memory controllers, point-to-point connections, switching fabrics, peripheral busses, accelerated graphics ports, and local busses using any of a variety of bus architectures. By way of example, such architectures include, but are not limited to, Industry Standard Architecture (ISA) busses, Micro Channel Architecture (MCA) busses, Enhanced ISA (EISA) busses, Video Electronics Standards Association (VESA) local busses, a Peripheral Component Interconnects (PCI) busses also known as a Mezzanine busses, or any selection of, or combination of, such busses. Depending on the specific physical implementation, one or more of the processors 20, system memory 30 and other components of the computing device 10 can be physically co-located or integrated into a single physical component, such as on a single chip. In such a case, some or all of system bus 11 can be electrical pathways within a single chip structure.

Computing device may further comprise externally-accessible data input and storage devices 12 such as compact disc read-only memory (CD-ROM) drives, digital versatile discs (DVD), or other optical disc storage for reading and/or writing optical discs 62; magnetic cassettes, magnetic tape, magnetic disk storage, or other magnetic storage devices; or any other medium which can be used to store the desired content and which can be accessed by the computing device 10. Computing device may further comprise externally-accessible data ports or connections 12 such as serial ports, parallel ports, universal serial bus (USB) ports, and infrared ports and/or transmitter/receivers. Computing device may further comprise hardware for wireless communication with external devices such as IEEE 1394 ("Firewire") interfaces, IEEE 802.11 wireless interfaces, BLUETOOTH® wireless interfaces, and so forth. Such ports and interfaces may be used to connect any number of external peripherals and accessories 60 such as visual displays, monitors, and touch-sensitive screens 61, USB solid state memory data storage drives (commonly known as "flash drives" or "thumb drives") 63, printers 64, pointers and manipulators such as mice 65, keyboards 66, and other devices 67 such as joysticks and gaming pads, touchpads, additional displays and monitors, and external hard drives (whether solid state or disc-based), microphones, speakers, cameras, and optical scanners.

Processors 20 are logic circuitry capable of receiving programming instructions and processing (or executing) those instructions to perform computer operations such as retrieving data, storing data, and performing mathematical calculations. Processors 20 are not limited by the materials from which they are formed or the processing mechanisms employed therein, but are typically comprised of semiconductor materials into which many transistors are formed together into logic gates on a chip (i.e., an integrated circuit or IC). The term processor includes any device capable of receiving and processing instructions including, but not limited to, processors operating on the basis of quantum computing, optical computing, mechanical computing (e.g., using nanotechnology entities to transfer data), and so forth. Depending on configuration, computing device 10 may comprise more than one processor. For example, computing device 10 may comprise one or more central processing units (CPUs) 21, each of which itself has multiple processors or multiple processing cores, each capable of independently or semi-independently processing programming instructions based on technologies like complex instruction set computer (CISC) or reduced instruction set computer (RISC). Further, computing device 10 may comprise one or more specialized processors such as a graphics processing unit (GPU) 22 configured to accelerate processing of computer graphics and images via a large array of specialized processing cores arranged in parallel. Further computing device 10 may be comprised of one or more specialized processes such as Intelligent Processing Units, field-programmable gate arrays or application-specific integrated circuits for specific tasks or types of tasks. The term processor may further include: neural processing units (NPUs) or neural computing units optimized for machine learning and artificial intelligence workloads using specialized architectures and data paths; tensor processing units (TPUs) designed to efficiently perform matrix multiplication and convolution operations used heavily in neural networks and deep learning applications; application-specific integrated circuits (ASICs) implementing custom logic for domain-specific tasks; application-specific instruction set processors (ASIPs) with instruction sets tailored for particular applications; field-programmable gate arrays (FPGAs) providing reconfigurable logic fabric that can be customized for specific processing tasks; processors operating on emerging computing paradigms such as quantum computing, optical computing, mechanical computing (e.g., using nanotechnology entities to transfer data), and so forth. Depending on configuration, computing device 10 may comprise one or more of any of the above types of processors in order to efficiently handle a variety of general purpose and specialized computing tasks. The specific processor configuration may be selected based on performance, power, cost, or other design constraints relevant to the intended application of computing device 10.

System memory 30 is processor-accessible data storage in the form of volatile and/or nonvolatile memory. System memory 30 may be either or both of two types: non-volatile memory and volatile memory. Non-volatile memory 30a is not erased when power to the memory is removed, and includes memory types such as read only memory (ROM), electronically-erasable programmable memory (EEPROM), and rewritable solid state memory (commonly known as "flash memory"). Non-volatile memory 30a is typically used for long-term storage of a basic input/output system (BIOS) 31, containing the basic instructions, typically loaded during computer startup, for transfer of information between components within computing device, or a unified extensible firmware interface (UEFI), which is a modern replacement for BIOS that supports larger hard drives, faster boot times, more security features, and provides native support for graphics and mouse cursors. Non-volatile memory 30a may also be used to store firmware comprising a complete operating system 35 and applications 36 for operating computer-controlled devices. The firmware approach is often used for purpose-specific computer-controlled devices such as appliances and Internet-of-Things (IoT) devices where processing power and data storage space is limited. Volatile memory 30b is erased when power to the memory is removed and is typically used for short-term storage of data for processing. Volatile memory 30b includes memory types such as random-access memory (RAM), and is normally the primary operating memory into which the operating system 35, applications 36, program modules 37, and application data 38 are loaded for execution by processors 20. Volatile memory 30b is generally faster than non-volatile memory 30a due to its electrical characteristics and is directly accessible to processors 20 for processing of instructions and data storage and retrieval. Volatile memory 30b may comprise one or more smaller cache memories which operate at a higher clock speed and are typically placed on the same IC as the processors to improve performance.

There are several types of computer memory, each with its own characteristics and use cases. System memory 30 may be configured in one or more of the several types described herein, including high bandwidth memory (HBM) and advanced packaging technologies like chip-on-wafer-on-substrate (CoWoS). Static random access memory (SRAM) provides fast, low-latency memory used for cache memory in processors, but is more expensive and consumes more power compared to dynamic random access memory (DRAM). SRAM retains data as long as power is supplied. DRAM is the main memory in most computer systems and is slower than SRAM but cheaper and more dense. DRAM requires periodic refresh to retain data. NAND flash is a type of non-volatile memory used for storage in solid state drives (SSDs) and mobile devices and provides high density and lower cost per bit compared to DRAM with the trade-off of slower write speeds and limited write endurance. HBM is an emerging memory technology that provides high bandwidth and low power consumption which stacks multiple DRAM dies vertically, connected by through-silicon vias (TSVs). HBM offers much higher bandwidth (up to 1 TB/s) compared to traditional DRAM and may be used in high-performance graphics cards, AI accelerators, and edge computing devices. Advanced packaging and CoWoS are technologies that enable the integration of multiple chips or dies into a single package. CoWoS is a 2.5D packaging technology that interconnects multiple dies side-by-side on a silicon interposer and allows for higher bandwidth, lower latency, and reduced power consumption compared to traditional PCB-based packaging. This technology enables the integration of heterogeneous dies (e.g., CPU, GPU, HBM) in a single package and may be used in high-performance computing, AI accelerators, and edge computing devices.

Interfaces 40 may include, but are not limited to, storage media interfaces 41, network interfaces 42, display interfaces 43, and input/output interfaces 44. Storage media interface 41 provides the necessary hardware interface for loading data from non-volatile data storage devices 50 into system memory 30 and storage data from system memory 30 to non-volatile data storage device 50. Network interface 42 provides the necessary hardware interface for computing device 10 to communicate with remote computing devices 80 and cloud-based services 90 via one or more external communication devices 70. Display interface 43 allows for connection of displays 61, monitors, touchscreens, and other visual input/output devices. Display interface 43 may include a graphics card for processing graphics-intensive calculations and for handling demanding display requirements. Typically, a graphics card includes a graphics processing unit (GPU) and video RAM (VRAM) to accelerate display of graphics. In some high-performance computing systems, multiple GPUs may be connected using NVLink bridges, which provide high-bandwidth, low-latency interconnects between GPUs. NVLink bridges enable faster data transfer between GPUs, allowing for more efficient parallel processing and improved performance in applications such as machine learning, scientific simulations, and graphics rendering. One or more input/output (I/O) interfaces 44 provide the necessary support for communications between computing device 10 and any external peripherals and accessories 60. For wireless communications, the necessary radio-frequency hardware and firmware may be connected to I/O interface 44 or may be integrated into I/O interface 44. Network interface 42 may support various communication standards and protocols, such as Ethernet and Small Form-Factor Pluggable (SFP). Ethernet is a widely used wired networking technology that enables local area network (LAN) communication. Ethernet interfaces typically use RJ45 connectors and support data rates ranging from 10 Mbps to 100 Gbps, with common speeds being 100 Mbps, 1 Gbps, 10 Gbps, 25 Gbps, 40 Gbps, and 100 Gbps. Ethernet is known for its reliability, low latency, and cost-effectiveness, making it a popular choice for home, office, and data center networks. SFP is a compact, hot-pluggable transceiver used for both telecommunication and data communications applications. SFP interfaces provide a modular and flexible solution for connecting network devices, such as switches and routers, to fiber optic or copper networking cables. SFP transceivers support various data rates, ranging from 100 Mbps to 100 Gbps, and can be easily replaced or upgraded without the need to replace the entire network interface card. This modularity allows for network scalability and adaptability to different network requirements and fiber types, such as single-mode or multi-mode fiber.

Non-volatile data storage devices 50 are typically used for long-term storage of data. Data on non-volatile data storage devices 50 is not erased when power to the non-volatile data storage devices 50 is removed. Non-volatile data storage devices 50 may be implemented using any technology for non-volatile storage of content including, but not limited to, CD-ROM drives, digital versatile discs (DVD), or other optical disc storage; magnetic cassettes, magnetic tape, magnetic disc storage, or other magnetic storage devices; solid state memory technologies such as EEPROM or flash memory; or other memory technology or any other medium which can be used to store data without requiring power to retain the data after it is written. Non-volatile data storage devices 50 may be non-removable from computing device 10 as in the case of internal hard drives, removable from computing device 10 as in the case of external USB hard drives, or a combination thereof, but computing device will typically comprise one or more internal, non-removable hard drives using either magnetic disc or solid state memory technology. Non-volatile data storage devices 50 may be implemented using various technologies, including hard disk drives (HDDs) and solid-state drives (SSDs). HDDs use spinning magnetic platters and read/write heads to store and retrieve data, while SSDs use NAND flash memory. SSDs offer faster read/write speeds, lower latency, and better durability due to the lack of moving parts, while HDDs typically provide higher storage capacities and lower cost per gigabyte. NAND flash memory comes in different types, such as Single-Level Cell (SLC), Multi-Level Cell (MLC), Triple-Level Cell (TLC), and Quad-Level Cell (QLC), each with trade-offs between performance, endurance, and cost. Storage devices connect to the computing device 10 through various interfaces, such as SATA, NVMe, and PCIe. SATA is the traditional interface for HDDs and SATA SSDs, while NVMe (Non-Volatile Memory Express) is a newer, high-performance protocol designed for SSDs connected via PCIe. PCIe SSDs offer the highest performance due to the direct connection to the PCIe bus, bypassing the limitations of the SATA interface. Other storage form factors include M.2 SSDs, which are compact storage devices that connect directly to the motherboard using the M.2 slot, supporting both SATA and NVMe interfaces. Additionally, technologies like Intel Optane memory combine 3D XPoint technology with NAND flash to provide high-performance storage and caching solutions. Non-volatile data storage devices 50 may be non-removable from computing device 10, as in the case of internal hard drives, removable from computing device 10, as in the case of external USB hard drives, or a combination thereof. However, computing devices will typically comprise one or more internal, non-removable hard drives using either magnetic disc or solid-state memory technology. Non-volatile data storage devices 50 may store any type of data including, but not limited to, an operating system 51 for providing low-level and mid-level functionality of computing device 10, applications 52 for providing high-level functionality of computing device 10, program modules 53 such as containerized programs or applications, or other modular content or modular programming, application data 54, and databases 55 such as relational databases, non-relational databases, object oriented databases, NoSQL databases, vector databases, knowledge graph databases, key-value databases, document oriented data stores, and graph databases.

Applications (also known as computer software or software applications) are sets of programming instructions designed to perform specific tasks or provide specific functionality on a computer or other computing devices. Applications are typically written in high-level programming languages such as C, C++, Scala, Erlang, GoLang, Java, Scala, Rust, and Python, which are then either interpreted at runtime or compiled into low-level, binary, processor-executable instructions operable on processors 20. Applications may be containerized so that they can be run on any computer hardware running any known operating system. Containerization of computer software is a method of packaging and deploying applications along with their operating system dependencies into self-contained, isolated units known as containers. Containers provide a lightweight and consistent runtime environment that allows applications to run reliably across different computing environments, such as development, testing, and production systems facilitated by specifications such as containerd.

The memories and non-volatile data storage devices described herein do not include communication media. Communication media are means of transmission of information such as modulated electromagnetic waves or modulated data signals configured to transmit, not store, information. By way of example, and not limitation, communication media includes wired communications such as sound signals transmitted to a speaker via a speaker wire, and wireless communications such as acoustic waves, radio frequency (RF) transmissions, infrared emissions, and other wireless media.

External communication devices 70 are devices that facilitate communications between computing device and either remote computing devices 80, or cloud-based services 90, or both. External communication devices 70 include, but are not limited to, data modems 71 which facilitate data transmission between computing device and the Internet 75 via a common carrier such as a telephone company or internet service provider (ISP), routers 72 which facilitate data transmission between computing device and other devices, and switches 73 which provide direct data communications between devices on a network or optical transmitters (e.g., lasers). Here, modem 71 is shown connecting computing device 10 to both remote computing devices 80 and cloud-based services 90 via the Internet 75. While modem 71, router 72, and switch 73 are shown here as being connected to network interface 42, many different network configurations using external communication devices 70 are possible. Using external communication devices 70, networks may be configured as local area networks (LANs) for a single location, building, or campus, wide area networks (WANs) comprising data networks that extend over a larger geographical area, and virtual private networks (VPNs) which can be of any size but connect computers via encrypted communications over public networks such as the Internet 75. As just one exemplary network configuration, network interface 42 may be connected to switch 73 which is connected to router 72 which is connected to modem 71 which provides access for computing device 10 to the Internet 75. Further, any combination of wired 77 or wireless 76 communications between and among computing device 10, external communication devices 70, remote computing devices 80, and cloud-based services 90 may be used. Remote computing devices 80, for example, may communicate with computing device through a variety of communication channels 74 such as through switch 73 via a wired 77 connection, through router 72 via a wireless connection 76, or through modem 71 via the Internet 75. Furthermore, while not shown here, other hardware that is specifically designed for servers or networking functions may be employed. For example, secure socket layer (SSL) acceleration cards can be used to offload SSL encryption computations, and transmission control protocol/internet protocol (TCP/IP) offload hardware and/or packet classifiers on network interfaces 42 may be installed and used at server devices or intermediate networking equipment (e.g., for deep packet inspection).

In a networked environment, certain components of computing device 10 may be fully or partially implemented on remote computing devices 80 or cloud-based services 90. Data stored in non-volatile data storage device 50 may be received from, shared with, duplicated on, or offloaded to a non-volatile data storage device on one or more remote computing devices 80 or in a cloud computing service 92. Processing by processors 20 may be received from, shared with, duplicated on, or offloaded to processors of one or more remote computing devices 80 or in a distributed computing service 93. By way of example, data may reside on a cloud computing service 92, but may be usable or otherwise accessible for use by computing device 10. Also, certain processing subtasks may be sent to a microservice 91 for processing with the result being transmitted to computing device 10 for incorporation into a larger processing task. Also, while components and processes of the exemplary computing environment are illustrated herein as discrete units (e.g., OS 51 being stored on non-volatile data storage device 51 and loaded into system memory 35 for use) such processes and components may reside or be processed at various times in different components of computing device 10, remote computing devices 80, and/or cloud-based services 90. Also, certain processing subtasks may be sent to a microservice 91 for processing with the result being transmitted to computing device 10 for incorporation into a larger processing task. Infrastructure as Code (IaaC) tools like Terraform can be used to manage and provision computing resources across multiple cloud providers or hyperscalers. This allows for workload balancing based on factors such as cost, performance, and availability. For example, Terraform can be used to automatically provision and scale resources on AWS spot instances during periods of high demand, such as for surge rendering tasks, to take advantage of lower costs while maintaining the required performance levels. In the context of rendering, tools like Blender can be used for object rendering of specific elements, such as a car, bike, or house. These elements can be approximated and roughed in using techniques like bounding box approximation or low-poly modeling to reduce the computational resources required for initial rendering passes. The rendered elements can then be integrated into the larger scene or environment as needed, with the option to replace the approximated elements with higher-fidelity models as the rendering process progresses.

In an implementation, the disclosed systems and methods may utilize, at least in part, containerization techniques to execute one or more processes and/or steps disclosed herein. Containerization is a lightweight and efficient virtualization technique that allows you to package and run applications and their dependencies in isolated environments called containers. One of the most popular containerization platforms is containerd, which is widely used in software development and deployment. Containerization, particularly with open-source technologies like containerd and container orchestration systems like Kubernetes, is a common approach for deploying and managing applications. Containers are created from images, which are lightweight, standalone, and executable packages that include application code, libraries, dependencies, and runtime. Images are often built from a containerfile or similar, which contains instructions for assembling the image. Containerfiles are configuration files that specify how to build a container image. Systems like Kubernetes natively support containerd as a container runtime. They include commands for installing dependencies, copying files, setting environment variables, and defining runtime configurations. Container images can be stored in repositories, which can be public or private. Organizations often set up private registries for security and version control using tools such as Harbor, JFrog Artifactory and Bintray, GitLab Container Registry, or other container registries. Containers can communicate with each other and the external world through networking. Containerd provides a default network namespace, but can be used with custom network plugins. Containers within the same network can communicate using container names or IP addresses.

Remote computing devices 80 are any computing devices not part of computing device 10. Remote computing devices 80 include, but are not limited to, personal computers, server computers, thin clients, thick clients, personal digital assistants (PDAs), mobile telephones, watches, tablet computers, laptop computers, multiprocessor systems, microprocessor based systems, set-top boxes, programmable consumer electronics, video game machines, game consoles, portable or handheld gaming units, network terminals, desktop personal computers (PCs), minicomputers, mainframe computers, network nodes, virtual reality or augmented reality devices and wearables, and distributed or multi-processing computing environments. While remote computing devices 80 are shown for clarity as being separate from cloud-based services 90, cloud-based services 90 are implemented on collections of networked remote computing devices 80.

Cloud-based services 90 are Internet-accessible services implemented on collections of networked remote computing devices 80. Cloud-based services are typically accessed via application programming interfaces (APIs) which are software interfaces which provide access to computing services within the cloud-based service via API calls, which are pre-defined protocols for requesting a computing service and receiving the results of that computing service. While cloud-based services may comprise any type of computer processing or storage, three common categories of cloud-based services 90 are serverless logic apps, microservices 91, cloud computing services 92, and distributed computing services 93.

Microservices 91 are collections of small, loosely coupled, and independently deployable computing services. Each microservice represents a specific computing functionality and runs as a separate process or container. Microservices promote the decomposition of complex applications into smaller, manageable services that can be developed, deployed, and scaled independently. These services communicate with each other through well-defined application programming interfaces (APIs), typically using lightweight protocols like HTTP, protobuffers, gRPC or message queues such as Kafka. Microservices 91 can be combined to perform more complex or distributed processing tasks. In an embodiment, Kubernetes clusters with containerized resources are used for operational packaging of system.

Cloud computing services 92 are delivery of computing resources and services over the Internet 75 from a remote location. Cloud computing services 92 provide additional computer hardware and storage on as-needed or subscription basis. Cloud computing services 92 can provide large amounts of scalable data storage, access to sophisticated software and powerful server-based processing, or entire computing infrastructures and platforms. For example, cloud computing services can provide virtualized computing resources such as virtual machines, storage, and networks, platforms for developing, running, and managing applications without the complexity of infrastructure management, and complete software applications over public or private networks or the Internet on a subscription or alternative licensing basis, or consumption or ad-hoc marketplace basis, or combination thereof.

Distributed computing services 93 provide large-scale processing using multiple interconnected computers or nodes to solve computational problems or perform tasks collectively. In distributed computing, the processing and storage capabilities of multiple machines are leveraged to work together as a unified system. Distributed computing services are designed to address problems that cannot be efficiently solved by a single computer or that require large-scale computational power or support for highly dynamic compute, transport or storage resource variance or uncertainty over time requiring scaling up and down of constituent system resources. These services enable parallel processing, fault tolerance, and scalability by distributing tasks across multiple nodes.

Although described above as a physical device, computing device 10 can be a virtual computing device, in which case the functionality of the physical components herein described, such as processors 20, system memory 30, network interfaces 40, NVLink or other GPU-to-GPU high bandwidth communications links and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where computing device 10 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. Thus, computing device 10 may be either a physical computing device or a virtualized computing device within which computer-executable instructions can be executed in a manner consistent with their execution by a physical computing device. Similarly, terms referring to physical components of the computing device, as utilized herein, mean either those physical components or virtualizations thereof performing the same or equivalent functions.

The skilled person will be aware of a range of possible modifications of the various aspects described above. Accordingly, the present invention is defined by the claims and their equivalents.

What is claimed is:

1. A computer system comprising a hardware memory, wherein the computer system is configured to execute software instructions stored on nontransitory machine-readable storage media that cause the computer system to:
    operate a temporal embedding generator to:
        receive dining input data comprising immediate dining context data and historical dining context data; and
        generate temporal embeddings for from the dining input data;

operate a temporal processing engine comprising a short-term processor, a medium-term processor, and a long-term processor to:

process the dining input data using the temporal embeddings at multiple time scales simultaneously to generate temporal outputs based on the temporal embeddings, wherein:

the short-term processor analyzes real-time events and generates temporal outputs for real-time dining behaviors;

the medium-term processor analyzes data over recent timeframes and generates temporal outputs for evolving trends in dining behavior; and the long-term processor analyzes extended historical data and generates temporal outputs for persistent patterns in dining behavior;

operate a context integration engine to:

receive the dining input data with the temporal embeddings;

extract dining context features from the dining input data, the dining context features comprising domain, entity, and interaction-specific contextual information about dining behavior;

generate dining context representations for different dining context types including individual diner preferences and group dining dynamics; and operate a fusion engine to:

generate a unified dining representation by integrating the temporal outputs from the temporal processing engine with the dining context representations from the context integration engine by aligning the real-time dining behaviors, evolving trends in dining behavior, and persistent patterns in dining behavior with the domain, entity, and interaction-specific contextual information based on the temporal embeddings; and generate dining recommendations based on the unified dining representation.

2. The computer system of claim 1, wherein the computer system is further configured to:

utilize culinary embeddings comprising both hierarchical ingredient embeddings and dish embeddings to generate the dining context representations.

3. The computer system of claim 2, wherein the culinary embeddings encode both cuisine-specific preparation methods and cultural significance metadata to inform the dining recommendations.

4. The computer system of claim 1, wherein the computer system is further configured to:

process both individual diner and group dining preferences and dynamics through parallel attention mechanisms to generate the dining context representations.

5. The computer system of claim 1, wherein the computer system is further configured to:

dynamically adjust weights between temporal embeddings and culinary embeddings based on current dining session progression.

6. The computer system of claim 1, wherein temporal coherence of the unified dining representation is maintained by tracking both current dining session states and historical preference evolution states across the multiple time scales.

7. The computer system of claim 2, wherein the dining recommendations are generated using parallel transformer networks that simultaneously process the temporal embeddings and culinary embeddings while maintaining context coherence.

8. A computer-implemented method comprising the steps of:

using a temporal embedding generator operating on a computer system to perform the steps of:

receiving dining input data comprising immediate dining context data and historical dining context data;

generating temporal embeddings from the dining input data; and using a temporal processing engine comprising a short-term processor, a medium-term processor, and a long-term processor operating on the computer system to perform the steps of:

processing the dining input data using the temporal embeddings at multiple time scales simultaneously to generate temporal outputs based on the temporal embeddings, wherein:

the short-term processor analyzes real-time events and generates temporal outputs for real-time dining behaviors;

the medium-term processor analyzes data over recent timeframes and generates temporal outputs for evolving trends in dining behavior; and the long-term processor analyzes extended historical data and generates temporal outputs for persistent patterns in dining behavior;

using a context integration engine operating on the computer system to perform the steps of:

receiving the dining input data with the temporal embeddings;

extracting dining context features from the dining input data, the dining context features comprising domain, entity, and interaction-specific contextual information about dining behavior;

generating dining context representations for different dining context types including individual diner preferences and group dining dynamics; and using a fusion engine operating on the computer system to perform the steps of:

generating a unified dining representation by integrating the temporal outputs from the temporal processing engine with the dining context representations from the context integration engine by aligning the real-time dining behaviors, evolving trends in dining behavior, and persistent patterns in dining behavior with the domain, entity, and interaction-specific contextual information based on the temporal embeddings; and generating dining recommendations based on the unified dining representation.

9. The method of claim 8, further comprising the step of utilizing culinary embeddings comprising both hierarchical ingredient embeddings and dish embeddings to generate the dining context representations.

10. The method of claim 9, wherein the culinary embeddings encode both cuisine-specific preparation methods and cultural significance metadata to inform the dining recommendations.

11. The method of claim 8, further comprising the step of processing both individual diner and group dining preferences and dynamics through parallel attention mechanisms to generate the dining context representations.

12. The method of claim 8, further comprising the steps of dynamically adjusting weights between temporal embeddings and culinary embeddings based on current dining session progression.

13. The method of claim 8, wherein temporal coherence of the unified dining representation is maintained by tracking both current dining session states and historical preference evolution states across the multiple time scales.

14. The method of claim 9, wherein the dining recommendations are generated using parallel transformer networks that simultaneously process the temporal embeddings and culinary embeddings while maintaining context coherence.

* * * * *